US006915014B1

(12) United States Patent
Honma et al.

(10) Patent No.: US 6,915,014 B1
(45) Date of Patent: Jul. 5, 2005

(54) IMAGE PROCESSING APPARATUS AND METHOD

(75) Inventors: Hideo Honma, Tokyo (JP); Hisashi Ishikawa, Saitama-ken (JP); Nobutaka Miyake, Kawasaki (JP); Yoshitake Nagashima, Chigasaki (JP); Takashi Saito, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/715,116

(22) Filed: Nov. 20, 2000

Related U.S. Application Data

(62) Division of application No. 08/280,584, filed on Jul. 26, 1994, now Pat. No. 6,198,848, which is a continuation of application No. 07/738,562, filed on Jul. 31, 1991, now abandoned.

(30) Foreign Application Priority Data

| Jul. 31, 1990 | (JP) | 2-201102 |
| Jul. 31, 1990 | (JP) | 2-201103 |
| Jul. 31, 1990 | (JP) | 2-201106 |
| Jul. 31, 1990 | (JP) | 2-201108 |
| Jul. 31, 1990 | (JP) | 2-201109 |

(51) Int. Cl.$^7$ .............................................. G06K 9/36
(52) U.S. Cl. ...................... 382/239; 382/232; 382/246; 382/250
(58) Field of Search ................................. 382/232, 246, 382/250, 253, 239; 358/539; 341/65, 67; 375/240.01, 240.02, 240.05, 240.04

(56) References Cited

U.S. PATENT DOCUMENTS

| 4,047,221 A | * | 9/1977 | Yasuda et al. ............... 358/136 |
| 4,319,267 A | * | 3/1982 | Mitsuya et al. ................ 358/75 |
| 4,581,638 A |   | 4/1986 | Chiariglione et al. ....... 358/135 |

(Continued)

FOREIGN PATENT DOCUMENTS

| EP | 0 353 028 | 1/1990 | ............ H04N/1/21 |
| EP | 0 380 081 | 8/1990 | ............ H03M/7/30 |
| EP | 0 390 421 | 10/1990 | ............ H04N/3/15 |
| JP | 55109088 | * 8/1980 | ............ H04N/9/02 |
| JP | 63-23479 | 1/1988 | ............ H04N/1/40 |
| JP | 2-100487 | 4/1990 | .......... H04N/7/133 |
| JP | 2-141088 | 5/1990 | .......... H04N/7/133 |
| JP | 02206971 | * 8/1990 | .......... H04N/1/415 |
| JP | 3-3479 | 1/1991 | .......... H04N/1/415 |
| JP | 3-16491 | 1/1991 | .......... H04N/7/137 |

OTHER PUBLICATIONS

"International Standard For Color Photographic Coding", Hiroshi Yasuda, The Journal of the Institute Of Image Electronics Engineers of Japan, vol. 18, No. 6, pp. 398–407, 1989.

"Optimal Scalar Quantization Of The Farcor Coefficients For Speech Coding", by Saoudi et al., Electronics, 1988, Conference Proceeding On Area Communication, EURO 8$^{th}$ European Conference, pp. 32–35.

(Continued)

Primary Examiner—Anh Hong Do
(74) Attorney, Agent, or Firm—Fitzpatrick, Cella, Harper & Scinto

(57) ABSTRACT

An image processing apparatus in which the amount of data bits for each of plural block units is controlled to be the same for all block units, so as to facilitate location of each block unit in coded image data without necessarily decoding the entire image. Pixel image data which is formable into plural block units is input for each block unit, and the input image data is orthogonally transformed. The orthogonally-transformed image data is quantized, and variable-length coding is performed on the quantized image data so as to generate variable-length code. The amount of variable length code in each block unit is controlled to be no more than a predetermined amount of data bits, with the predetermined amount being the same for each block unit.

5 Claims, 43 Drawing Sheets

U.S. PATENT DOCUMENTS

| | | | | |
|---|---|---|---|---|
| 4,788,598 A | * | 11/1988 | Ochi et al. | 358/260 |
| 4,791,680 A | | 12/1988 | Yokoe et al. | 382/56 |
| 4,920,426 A | | 4/1990 | Hatori | 382/239 |
| 4,929,946 A | | 5/1990 | O'Brien et al. | 345/600 |
| 4,953,214 A | | 8/1990 | Takeguchi et al. | 381/31 |
| 4,972,260 A | | 11/1990 | Fujikawa | 375/240.03 |
| 4,975,872 A | | 12/1990 | Zaiki | 365/49 |
| 4,984,076 A | * | 1/1991 | Watanabe et al. | 358/133 |
| 5,006,931 A | | 4/1991 | Shiroto | 358/133 |
| 5,025,482 A | | 6/1991 | Murakami | 382/239 |
| 5,041,916 A | * | 8/1991 | Yoshida et al. | 358/433 |
| 5,051,840 A | * | 9/1991 | Watanabe et al. | 387/56 |
| 5,079,621 A | | 1/1992 | Daly et al. | 558/133 |
| 5,089,889 A | | 2/1992 | Sugiyama | 375/240.12 |
| 5,101,280 A | | 3/1992 | Moronaga | 382/239 |
| 5,126,842 A | | 6/1992 | Andrews et al. | 382/239 |
| 5,184,229 A | | 2/1993 | Saito | 382/239 |
| 5,327,502 A | | 7/1994 | Katata et al. | 382/239 |
| 5,337,087 A | | 8/1994 | Mishima | 348/405 |
| 5,341,441 A | * | 8/1994 | Maeda et al. | 382/253 |
| 5,517,583 A | | 5/1996 | Horiuchi et al. | 382/239 |
| 5,764,806 A | | 6/1998 | Horiuchi et al. | 382/239 |
| 5,832,129 A | | 11/1998 | Horiuchi et al. | 382/248 |
| 5,861,921 A | * | 1/1999 | Shimizu et al. | 375/240.04 |
| 6,269,192 B1 | * | 7/2001 | Sodagar et al. | 382/240 |

* cited by examiner

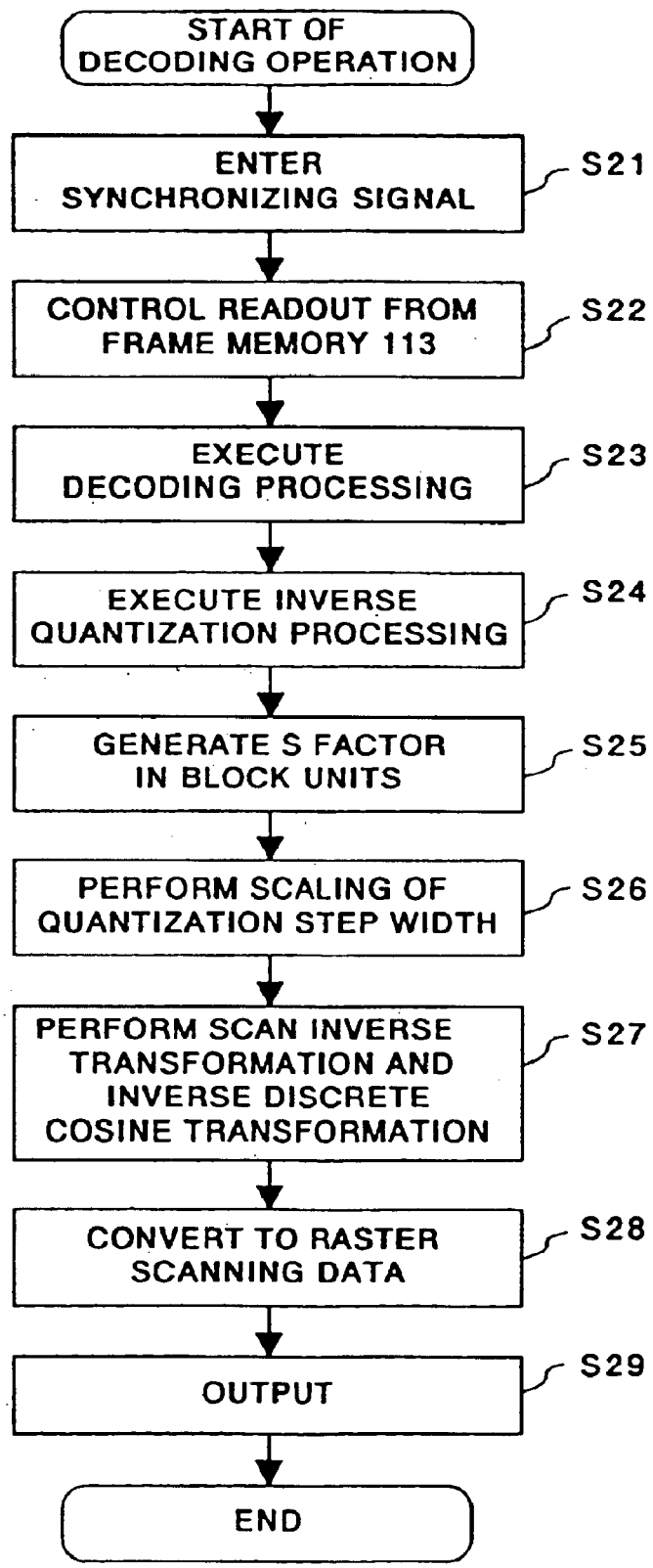
F I G. 3B

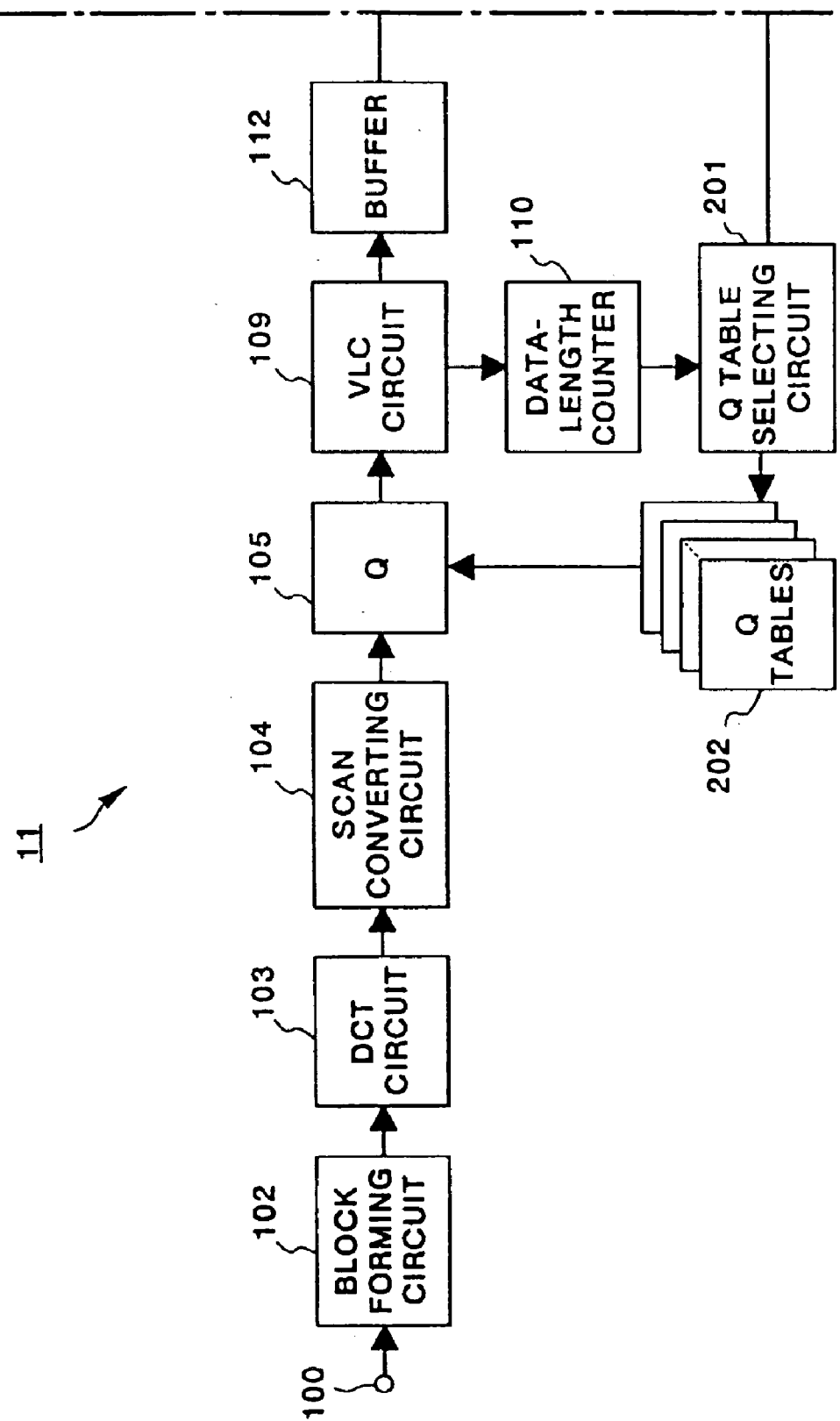
F I G. 4A

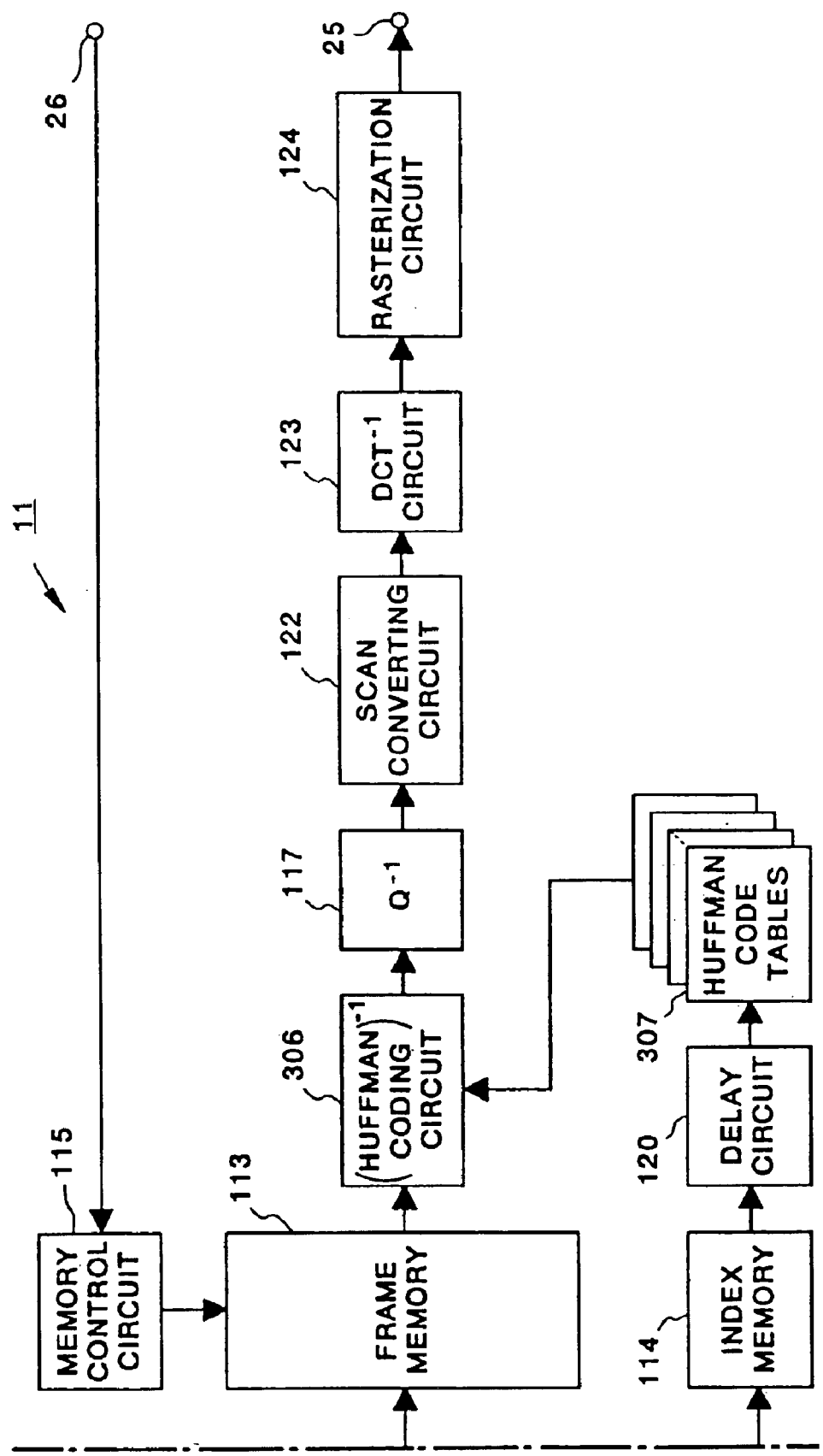
F I G. 5B

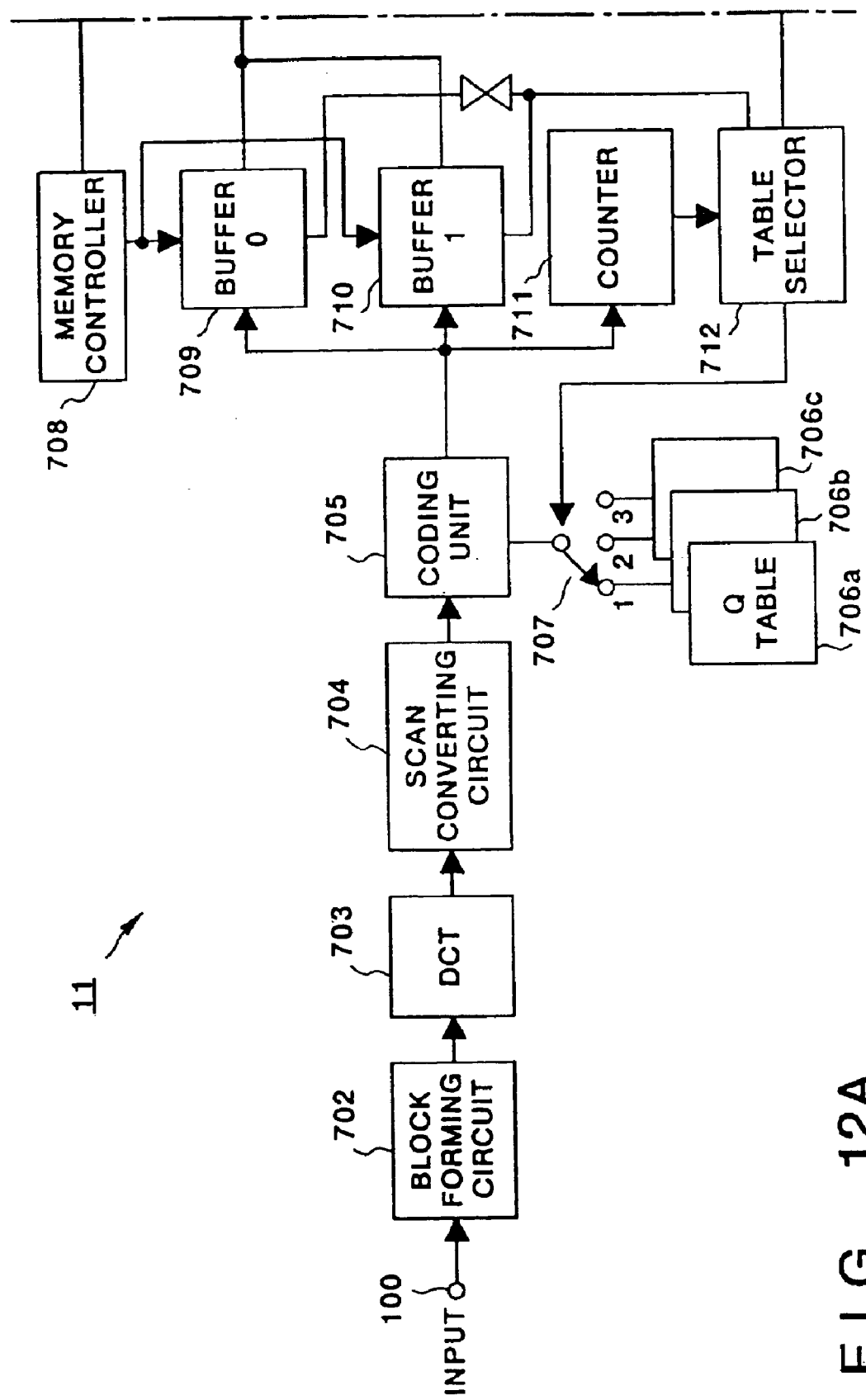
F I G. 12A

```
16  11  10  16   24   40   51   61
12  12  14  19   26   58   60   55
14  13  16  24   40   57   69   56
14  17  22  29   51   87   80   62
18  22  37  56   68  109  103   77
24  35  55  64   81  104  113   92
49  64  78  87  103  121  120  101
72  92  95  98  112  100  103   99
```
FIG. 13
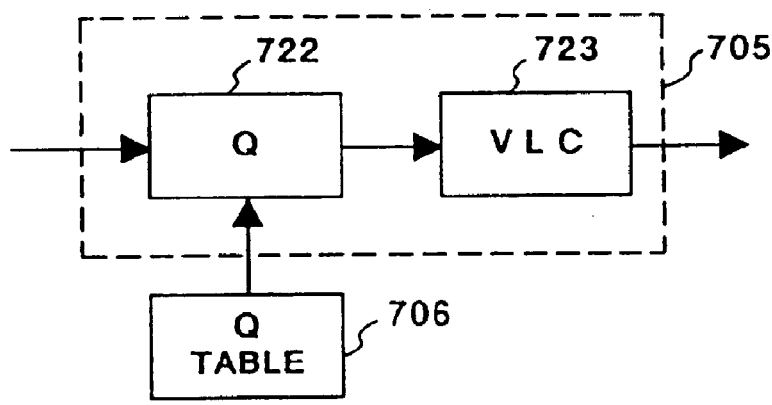
FIG. 14
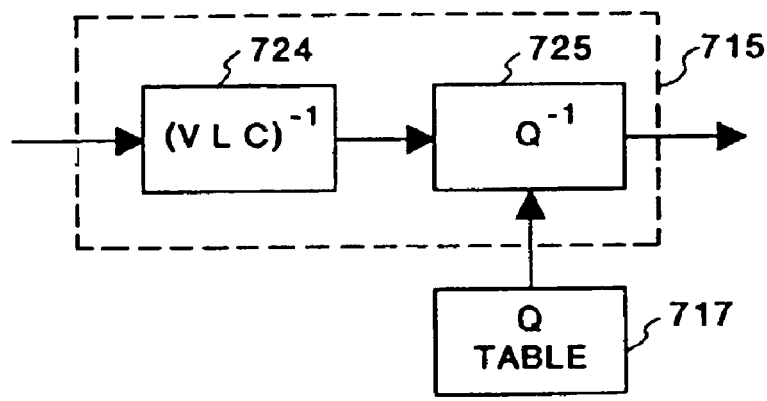
FIG. 15

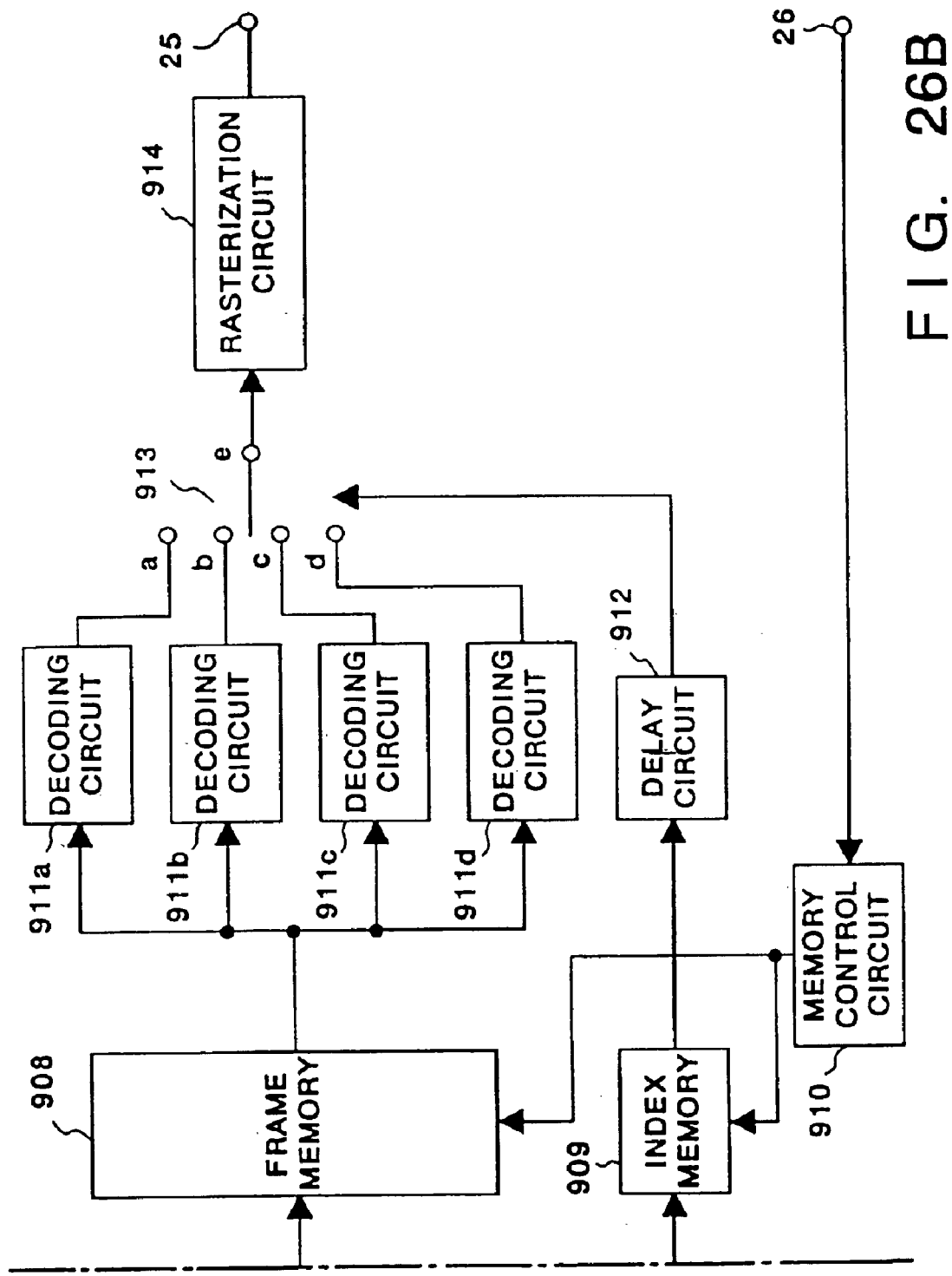
F I G. 26B

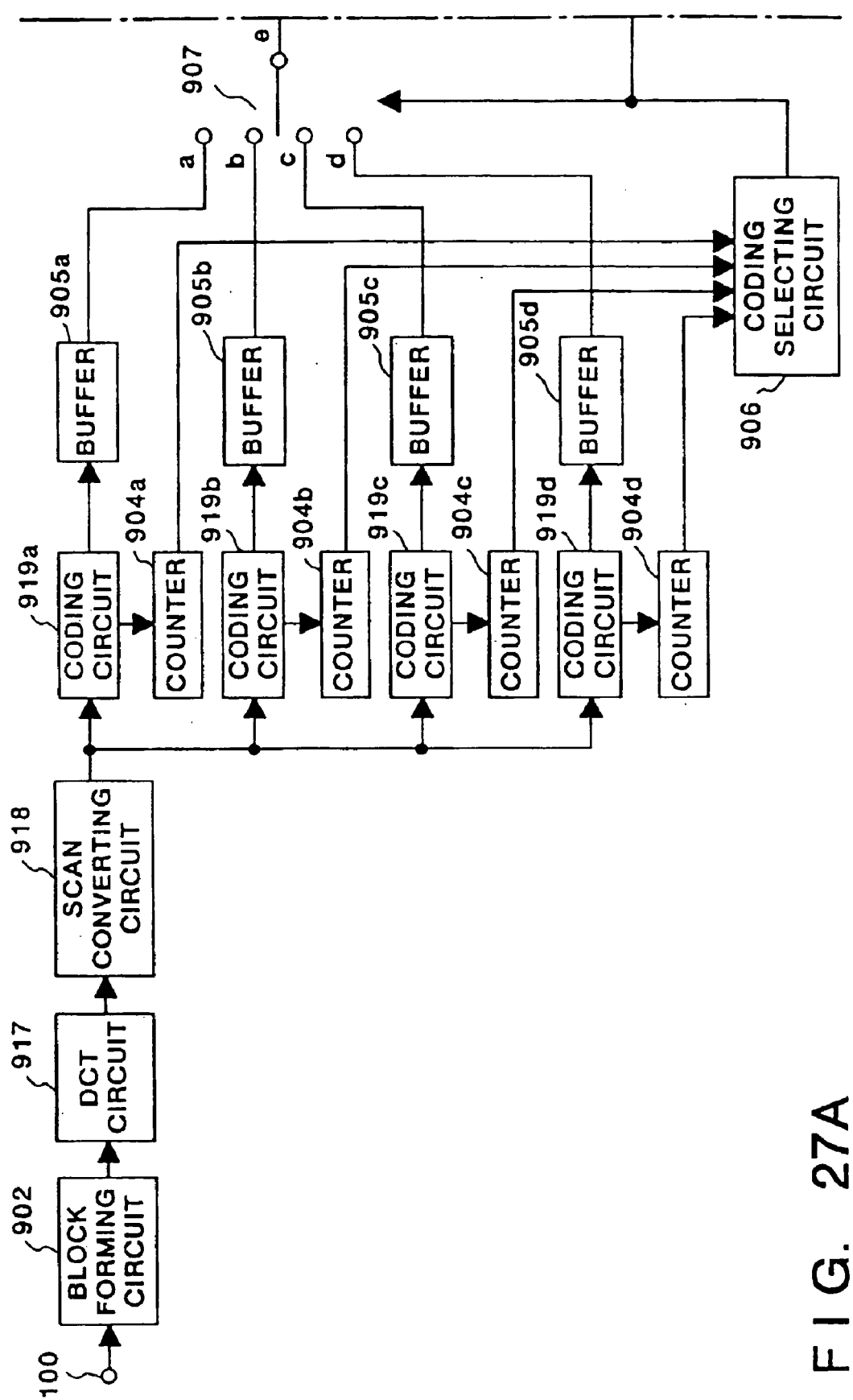
F I G. 27A

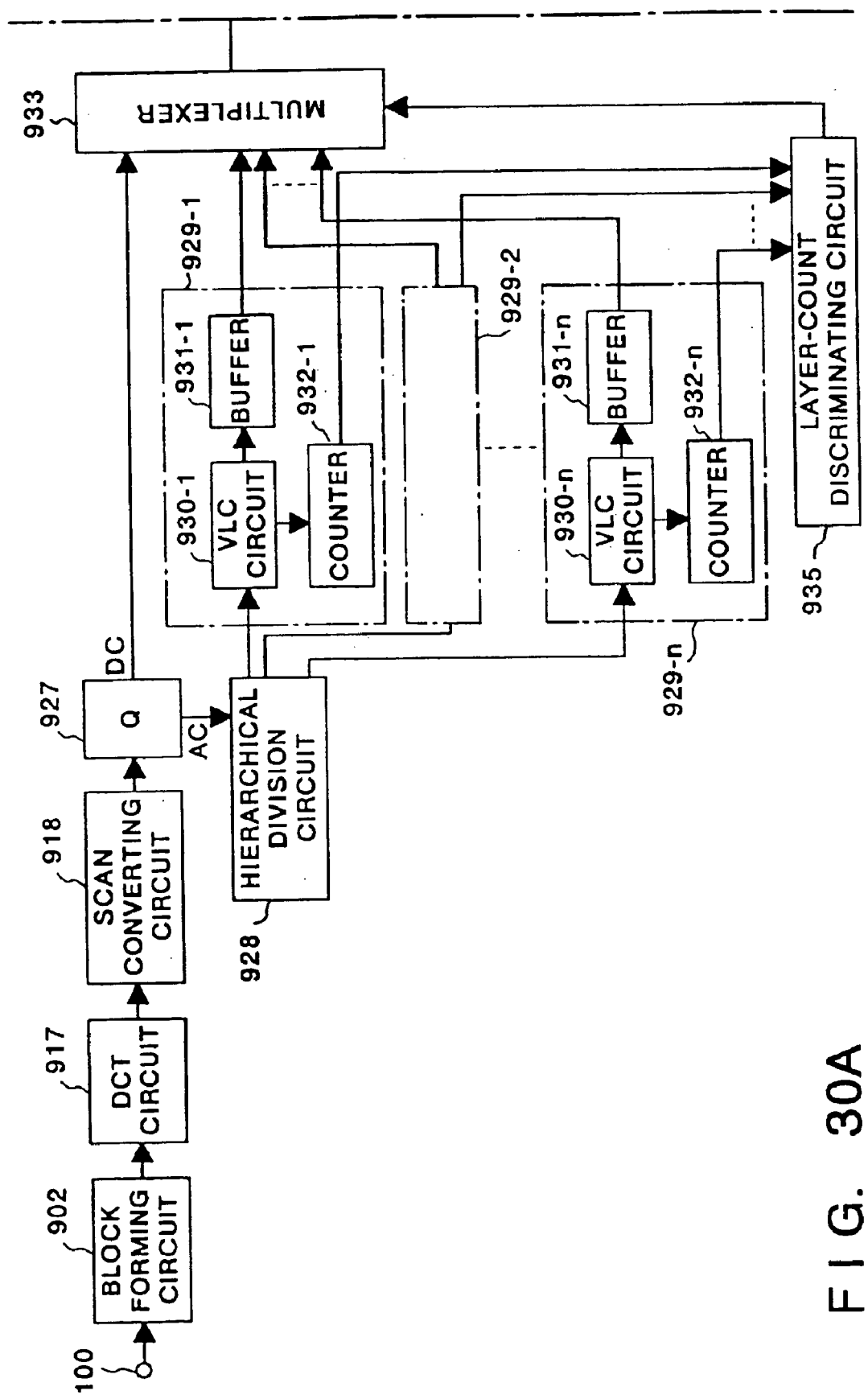
F I G. 30A

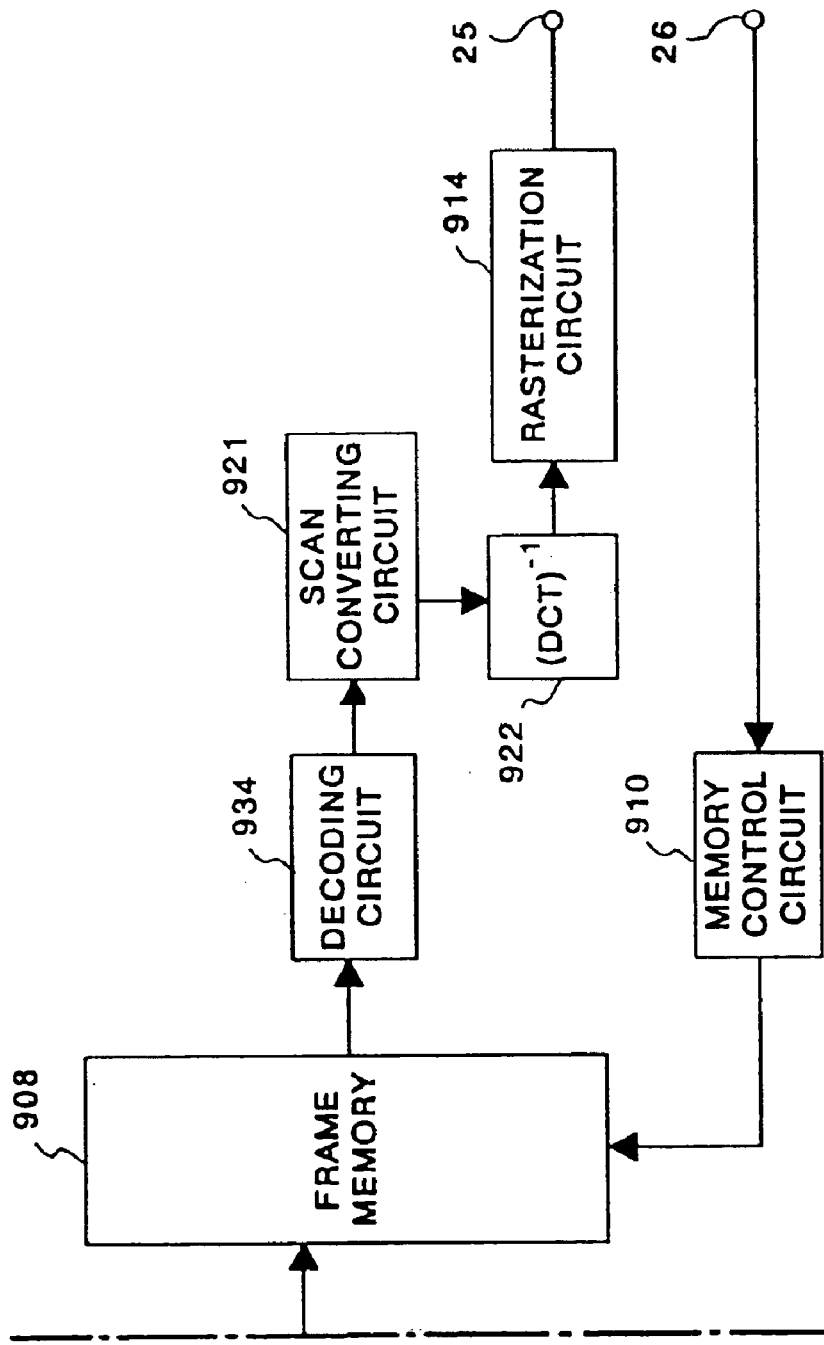
F I G. 30B

IMAGE PROCESSING APPARATUS AND METHOD

This application is a divisional of U.S. patent application Ser. No. 08/280,584, filed Jul. 26, 1994 which issued as U.S. Pat. No. 6,198,848 on Mar. 6, 2001, which was a continuation of application Ser. No. 07/738,562, filed Jul. 31, 1991, abandoned.

BACKGROUND OF THE INVENTION

1. Field of the Invention

This invention relates to an apparatus and method for image processing and, more particularly, to an image processing apparatus and method for compressing and storing data indicative of a full-color image, such as a photograph having tones (colors), upon partitioning the data into blocks.

2. The Prior Art

The memory capacity necessary for storing a full color image (hereinafter referred to as an "image") such as a photograph in a memory is given by (number of pixels)×(number of tone bits). As a typical example, a color image composed of 1024 lines (vertical)×1280 lines (horizontal)×24 bits per pixel (eight bits for each of the colors R, B and G) is equivalent to 30 megabytes of data. An enormous memory capacity would be required to store such a high-quality color image.

For this reason, a variety of methods of compressing the amount of information have been proposed. Attempts have been made to reduce the required memory capacity by first compressing image information and then storing the compressed information in memory, and subsequently expanding the information when it is read out of the memory to obtain the original image information.

FIG. 32 is a block diagram of an image storing circuit proposed by the JPEG (Joint Photographic Experts Group) of the CCITT/ISO as a method of achieving international standardization of color still-picture coding. The circuit of FIG. 32 is based upon a coding method [see "International Standard for Color Photographic Coding", Hiroshi Yasuda, The Journal of the Institute of Image Electronics Engineers of Japan, Vol. 18, No. 6, pp. 398–407, 1989 (in Japanese)] of a baseline system which combines a discrete cosine transformation (hereinafter referred to as "DCT") and variable length coding (hereinafter referred to as "VLC").

As shown in FIG. 32, pixel data entered from an input terminal 1101 is cut into an 8×8 pixel block in a block forming circuit 1102, the data is subjected to a cosine transformation by a DCT circuit 1103, and the transformation coefficients are supplied to a quantization unit 1105. In accordance with quantization-step information supplied by a quantization table 1106, the quantization unit 1105 subjects the transformation coefficients to linear quantization. Of the quantized transformation coefficients, a DC (direct current) coefficient is applied to a predictive coding circuit [hereinafter referred to as a "DPCM" (differential pulse-coded modulation) circuit 1401, which obtains the differential (a prediction error) between this DC coefficient and the DC component of the preceding block. The difference is applied to a one-dimensional Huffman coding circuit 1402.

FIG. 33 is a detailed block diagram showing the DPCM 1401. In the DPCM 1401, the quantized DC coefficient from the quantization unit 1105 is applied to a delay circuit 1501 and a subtracter 1502. The delay circuit 1501 applies a delay equivalent to the time needed for the discrete cosine transformation circuit to operate on one block, namely 8×8 pixels. Accordingly, the delay circuit 1501 supplies the subtracter 1502 with the DC coefficient of the preceding block. As a result, the subtracter 54 outputs the differential (prediction error) between the current DC coefficient and that of the preceding block. (In this predictive coding, the value of the preceding block is used as the prediction value, and therefore the predicting unit is constituted by the delay circuit, as set forth above.)

In accordance with a DC Huffman code table 1403, the one-dimensional Huffman coding circuit 1402 applies variable-length coding to the prediction error signal supplied by the DPCM 1401 and supplies a DC Huffman code a multiplexer 1410.

An AC (alternating current) coefficient (a coefficient other than the DC coefficient) quantized by the quantization unit 1105 is zigzag-scanned in order from coefficients of lower order as shown in FIG. 34 by means of a scan converting circuit 1404, and the output of the scan converting circuit 1404 is applied to a non-zero coefficient detector circuit 1405. The latter determines whether the quantized AC coefficient is "0" or not. If the AC coefficient is "0", a count-up signal is supplied to a run-length counter 1406, thereby incrementing the counter.

If the coefficient is other than "0", however, a reset signal is applied to the run-length counter 1406 to reset the counter, and the coefficient is split into a group number SSSS and annexed bits, as shown in FIG. 37, by a grouping circuit 1407. The group number SSSS is supplied to a two-dimensional Huffman coding circuit 1408, and the annexed bits are supplied to the multiplexer 1410.

The run-length counter 1406 counts a run length of "0" and supplies the two-dimensional Huffman coding circuit 1408 with the number NNNN of "0"s between non-zero coefficients other than "0". In accordance with the AC Huffman code table 1409, the two-dimensional Huffman coding circuit 1408 applies variable-length coding to the "0" run length NNNN and the non-zero coefficient group number SSSS and supplies the multiplexer 1410 with an AC Huffman code.

The multiplexer 1410 multiplexes the DC Huffman code, AC Huffman code and annexed bits of one block (8×8 input pixels) and outputs compressed image data from its output terminal 1411.

Accordingly, the compressed data outputted by the output terminal 1411 is stored in a memory, and at read-out the data is expanded by a reverse operation, thereby making it possible to reduce memory capacity.

In the example of the prior art described above, however, variable length coding (VLC) is used in the coding units (the one-dimensional Huffman coding circuit 1402 and two-dimensional Huffman coding circuit 1408). Consequently, the code length (information quantity) of one block of the DCT is not constant, and the correspondence between the memory addresses and the blocks is complicated. Executing the combining of images, such as the overlapping of images as shown in FIG. 35 and the partial overlaying of images as shown in FIG. 36, is very difficult to perform in memory.

In the frame memory of a page printer, this difficulty leads to a problem of a complicated correspondence between a frame address and block position on a page.

Further, in the example of the prior art described above, DPCM is used in the DC coefficient after DCT. Consequently, in a case where there is a partial block overlay, decoding must be performed retroactively back to the block at which the prediction value of DPCM is reset (namely the block at which an operation between blocks has not been performed). In addition, overlaying of the DC coefficient must be performed up to the block at which the next DPCM is reset, in such a manner that the overlaying will not cause the prediction value at the time of coding to differ from that at the time of decoding. This complicates the processing procedure for combining images in memory and prolongs the necessary computation time, thereby making it even more difficult to combine images in memory.

SUMMARY OF THE INVENTION

It is a purpose of the present invention to provide an image processing apparatus and method which make it possible to combine compressed images in memory.

According to the present invention, the foregoing object is attained by providing an image processing apparatus comprising orthogonal transformation means for orthogonally transforming inputted data in block units, quantizing means for quantizing the data orthogonally transformed by the orthogonal transformation means, coding means for variable-length coding the data quantizing by the quantizing means, and control means for controlling the quantity of the coded data output from the coding means to be less than a predetermined quantity in block units.

According to the other aspect of the present invention, the foregoing object is attained by providing an image processing method comprising the steps of an orthogonal transformation step of orthogonally transforming inputted data in block units, a quantizing step of quantizing the data orthogonally transformed at the orthogonal transformation step, and a coding step of variable-length coding the data quantizing at the quantizing step by performing control in such a manner that the information quantity of the data becomes a predetermined quantity in block units.

In accordance with the present invention as described above, the orthogonal transformation means subjects the inputted data to an orthogonal transformation in block units, the quantizing means quantizes the data orthogonally transformed by the orthogonal transformation means, and the coding means subjects the data quantized by the quantizing means to variable-length coding. In the coding means, the control means executes control in such a manner that the quantity of the coded data output from the coding means is less than a predetermined quantity.

The invention is particularly advantageous since memory control is greatly facilitated and it becomes possible to combine compressed image data in a frame memory.

It is another purpose of the present invention to provide an image processing apparatus and method in which optimum quantization conforming to output characteristics and human visual characteristics is selected, whereby band-compensated excellent compression can be carried out up to the threshold frequency.

According to the present invention, the foregoing object is attained by providing an image processing apparatus for controlling the data quantity of every block to be less than a predetermined value when inputted data is coded, comprising transformation means for orthogonally transforming the inputted data in block units, quantizing means for quantizing the data orthogonally transformed by the transformation means, scanning means for scanning the data quantized by the quantizing means, coding means for performing variable-length coding based upon the data scanned by the scanning means, counting means for counting quantity of coded data generated by the coding means, comparing means for comparing the code quantity counted by the counting means and a predetermined quantity for every block, and changeover means for changing over quantization conditions of the quantizing means based upon results of comparison performed by the comparing means.

According to the other aspect of the present invention, the foregoing object is attained by providing an image processing method for controlling data quantity of every block to be less than a predetermined value when inputted data is coded, comprising the steps of a transforming step of orthogonally transforming the inputted data in block units, a quantizing step of quantizing the data orthogonally transformed at the transforming step, a scanning step of scanning the data quantized at the quantizing step, a coding step of performing variable-length coding based upon the data scanned at the scanning step, a counting step of counting quantity generated when variable-length coding is performed at the coding step, a comparing step of comparing the data quantity counted at the counting step and a predetermined quantity for every block, and a changeover step of changing over quantization conditions of the quantizing step based upon results of comparison performed at the comparing step.

In accordance with the present invention as described above, the transformation means subjects the inputted data to an orthogonal transformation in block units, the quantizing means quantizes the data orthogonally transformed by the transformation means, the scanning means scans the data quantized by the quantizing means, the coding means performs variable-length coding based upon the data scanned by the scanning means, the counting means counts quantity of coded data generated by the coding means, the comparing means compares the code quantity counted by the counting means and a predetermined quantity for every block, and the changeover means for changes over quantization conditions of the quantizing means based upon results of comparison performed by the comparing means.

The invention is particularly advantageous since optimum quantization conforming to output characteristics and human visual characteristics is selected, whereby band-assured excellent compression can be carried out up to the threshold frequency.

It is another purpose of the present invention to provide an imaging processing apparatus and method in which memory management is facilitated and a degradation in picture quality held to a minimum by using a plurality of quantization tables and compressing data to a desired amount.

According to the present invention, the foregoing object is attained by providing an image processing apparatus having a plurality of quantization tables for quantizing image data in block units comprising quantizing means for quantizing the image data in block units based upon any of the quantization tables, counting means for counting data quantity of the quantized image data quantized by the quantizing means in block units, and selecting means for selecting a quantization table in dependence upon the result of counting performed by the counting means.

In a preferred embodiment, the selecting means is adapted to select quantization tables in a direction in which the data quantity is decreased or increased.

In another preferred embodiment, the selecting means includes memory means for storing an index of the selected quantization table.

According to the other aspect of the present invention, the foregoing object is attained by providing an image processing method using a plurality of quantization tables for quantizing image data in block units comprising the steps of a quantizing step of quantizing the image data in block units based upon the quantization tables, a counting step of counting data quantity of the quantized image data quantized at the quantizing step, and a selecting step of selecting a quantization table in dependence upon the result of counting performed at the counting step.

In accordance with the present invention as described above, the image data in block units is quantized based upon the quantization tables, and the data quantity of the quantized coded image data is counted. A quantization table is selected in dependence upon the result of counting, and data is quantized to the desired data quantity.

The invention is particularly advantageous since memory management is facilitated and a degradation in picture quality is held to a minimum by using a plurality of quantization tables and compressing data to a desired amount.

It is another purpose of the present invention to provide an imaging processing apparatus and method whereby images can be edited and treated with ease.

According to the present invention, the foregoing object is attained by providing an image processing apparatus comprising input means for inputting image data, coding means for subjecting the image data inputted by the input means to a plurality of coding processing operations which differ from one another, and selecting means for selecting one result from among the results of the plurality of coding processing operations obtained by the coding means.

According to the other aspect of the present invention, the foregoing object is attained by providing an image processing method comprising the steps of an input step of inputting image data, a coding step of subjecting the image data inputted at the input step to a plurality of coding processing operations which differ from one another, and a selecting step of selecting one result from among the results of the plurality of coding processing operations obtained at the coding step.

In accordance with the present invention as described above, the input means inputs the image data, the coding means subjects the image data inputted by the input means to a plurality of coding processing operations which differ from one another, and the selecting means selects one result from among the results of the plurality of coding processing operations obtained by the coding means.

The invention is particularly advantageous since an image processing apparatus featuring easy editing and treating of data can be realized.

It is another purpose of the present invention to provide an image processing apparatus and method whereby it is possible to combine compressed images in memory.

According to the present invention, the foregoing object is attained by providing an image processing apparatus comprising orthogonal transformation means for orthogonally transforming input image data in block units, coding means for quantizing the data orthogonally transformed by the orthogonal transformation means, and coding a quantized transformation coefficient to generate variable-length coded data of which quantity is less than a predetermined quantity in block units and memory means for storing the data, which has been coded by the coding means, wherein data stored in the memory means is capable of being read out in block units.

According to the other aspect of the present invention, the foregoing object is attained by providing an image processing method comprising the steps of an orthogonal transformation step of orthogonally transforming input image data in block units, a coding step of quantizing the data orthogonally transformed at the orthogonal transformation step, and coding a quantized transformation coefficient to generate variable-length coded data of which is less than a predetermined quantity in block units, a storing step of storing the data, which has been coded at the coding step and a reading step of reading data, which has been stored at the storing step, in block units.

In accordance with the present invention as described above, one block of compressed data can be stored within the predetermined quantity (S) and coding of the predetermined quantity (S) is possible irrespective of the fact that variable-length coding is possible. As a result, operation in such that accessing of the memory means is performed in units of the predetermined quantity (S).

The invention is particularly advantageous since one block of compressed data can be stored within bits of the predetermined quantity irrespective of the fact that variable-length coding is used, and image processing becomes possible solely in S bits. Accessing of the memory means also is performed in units of S bits, memory control is greatly facilitated, and it becomes possible to combine image-processed data in the memory means. In addition, since the processing units are made a fixed length in block units, the time required for image processing is rendered substantially constant for every block. Therefore, there is no need for a buffer for rendering constant the transmission rate of data after the decoding necessary for such image processing as, e.g., variable-length coding. This makes possible a great simplification in hardware.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3B is a flowchart for describing a decoding operation in accordance with the first embodiment;

FIGS. 4A and 4B are block diagrams illustrating the construction of the image memory unit in accordance with a second embodiment of the present invention;

FIGS. 5A and 5B are block diagrams illustrating the construction of the image memory unit in accordance with a third embodiment of the present invention;

FIGS. 12A and 12B are block diagrams illustrating the construction of the image memory unit in accordance with a seventh embodiment of the present invention;

FIG. 13 is a diagram showing the contents of a quantization table illustrated in FIG. 12;

FIG. 14 is a block diagram illustrating the construction of coding unit shown in FIG. 12;

FIG. 15 is a block diagram illustrating the construction of decoding unit shown in FIG. 12;

FIGS. 26A and 26B are block diagrams illustrating the construction of the image memory unit in accordance with an 11th embodiment of the present invention;

FIGS. 27A and 27B are block diagrams illustrating the construction of the image memory unit in accordance with a 12th embodiment of the present invention;

FIGS. 30A and 30B are block diagrams illustrating the construction of the image memory unit in accordance with a 13th embodiment of the present invention;

DESCRIPTION OF THE PREFERRED EMBODIMENTS

Preferred embodiments of the present invention will now be described in detail in accordance with the accompanying drawings.

[General Construction of the Apparatus]

Figure 1:
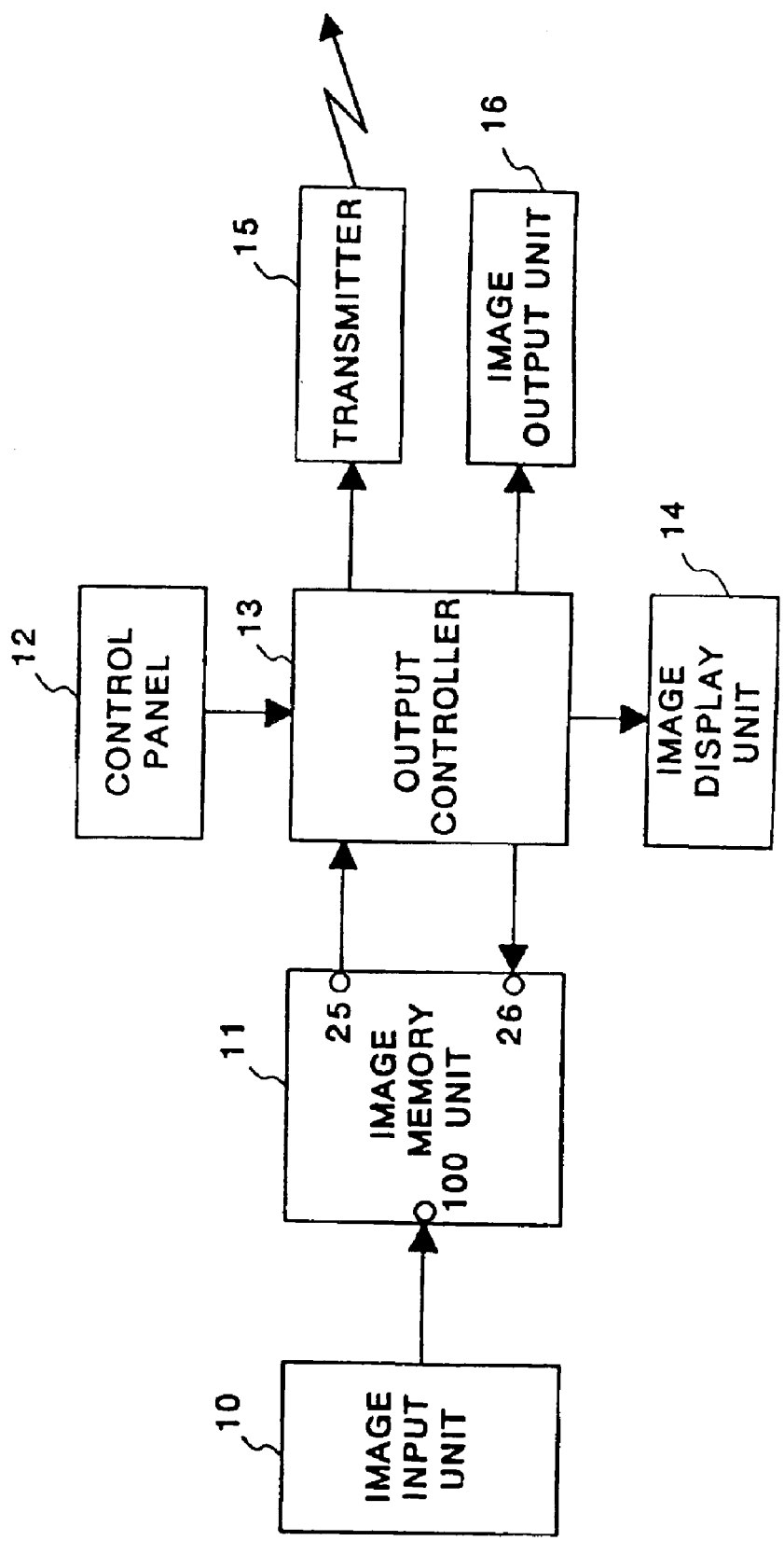
FIG. 1 is a block diagram illustrating the overall construction of an image processing apparatus which is a typical embodiment of the present invention.

FIG. 1 is a block diagram illustrating the overall construction of an image processing apparatus used in 13 embodiments described below.

As shown in FIG. 1, the apparatus includes an image input unit 10 constituted by an image reader such as an image scanner which includes a CCD sensor, or an interface of an external item of equipment such as a host computer, an SV camera or a video camera, etc. Image data inputted from the image input unit 10 is supplied to an input terminal 100 of an image memory unit 11 illustrated in FIG. 2, FIGS. 4 through 6, FIGS. 10 through 12, FIG. 17, FIGS. 21, 22, FIGS. 26, 27 and FIG. 30. The apparatus further includes a control panel 12 which an operator uses to designate an output destination of the image data, and an output controller 13. The control panel 12 is for selecting the output destination of the image data, and the output controller 13 outputs a synchronizing signal for memory read-but. The synchronizing signal is, e.g., an ITOP signal from the output controller, which together with an image output unit 16 constructs a printer engine.

The image memory unit 11 has an output terminal 25 and an input terminal 26 for the synchronizing signal of the image memory unit. The apparatus is further provided with an image display unit such as a display device. Numeral 15 denotes a transmitting unit for transmitting the image data via a public line or LAN (local area network). The image output unit 16 is, for example, a laser beam printer which irradiates a photosensitive body with a laser beam to form a latent image and then converts the latent image into a visible image. The image output unit 16 can be an ink-jet printer, a thermal printer or a dot printer, etc.

[First Embodiment]

The operation of a first embodiment will now be described.

Figure 2A:
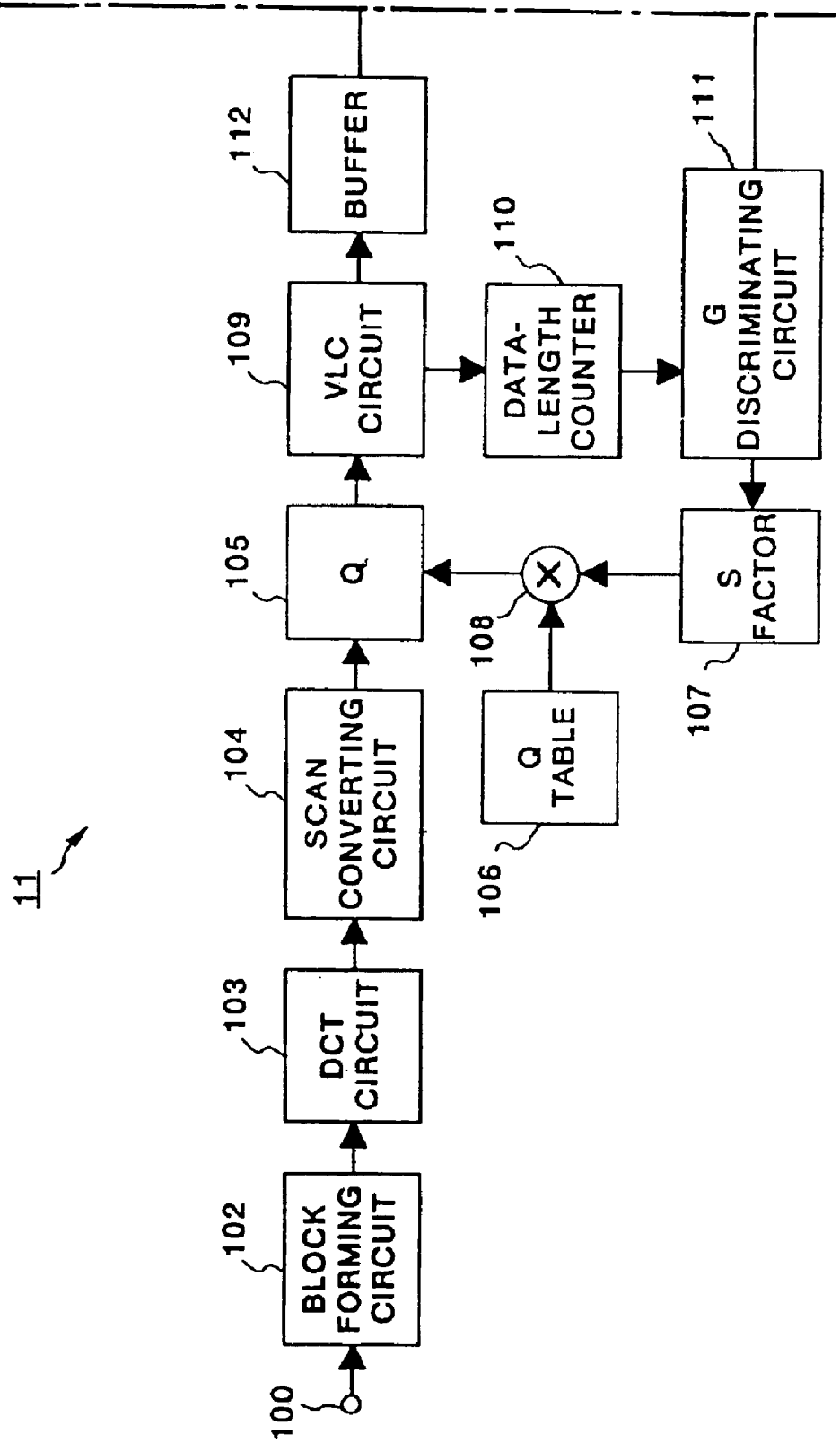
FIGS. 2A and 2B are block diagrams illustrating the construction of an image memory unit in accordance with a first embodiment of the present invention.
Figure 2B:
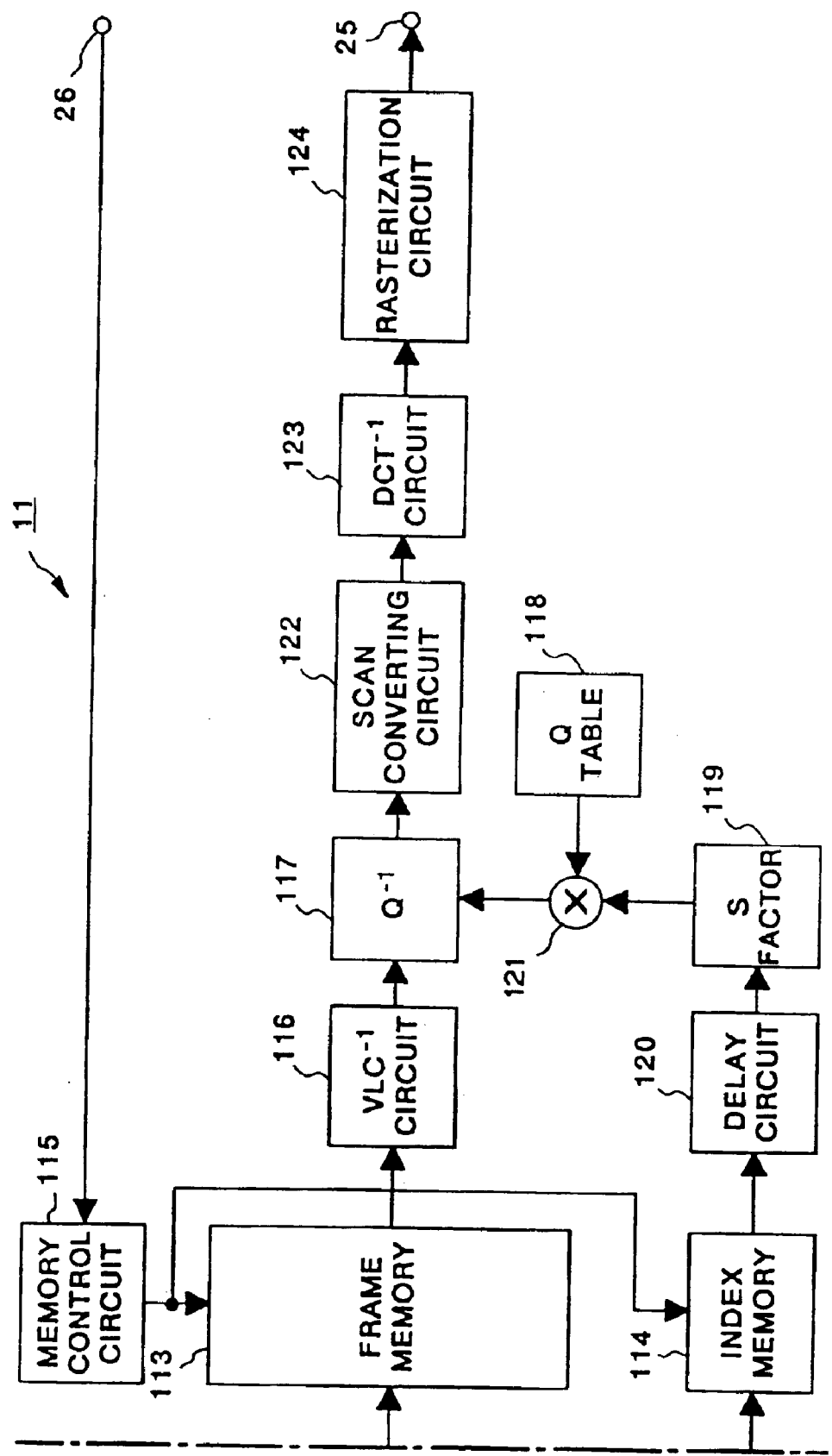

FIG. 2 is a block diagram showing the detailed construction of the image memory unit 11 of FIG. 1 according to the first embodiment of the invention.

Figure 34:
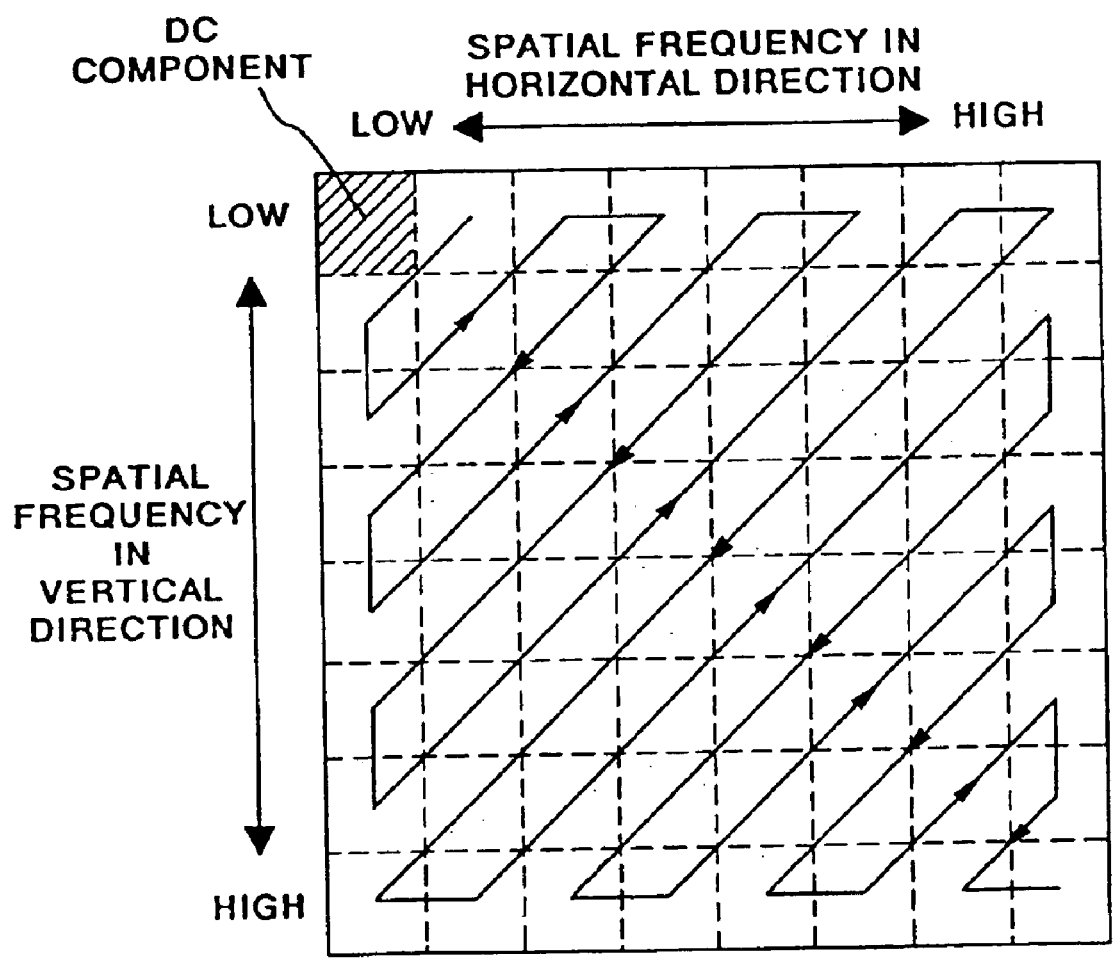
FIG. 34 is a diagram for describing a scanning method of coefficients of orthogonal transformation.
Figure 35:
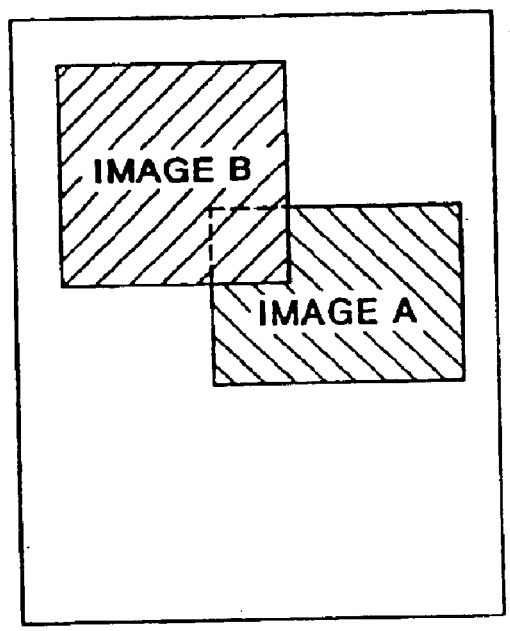
FIGS. 35, 36 are diagrams showing examples of image combination such as the overlapping of images and partial transcription of images.
Figure 36:
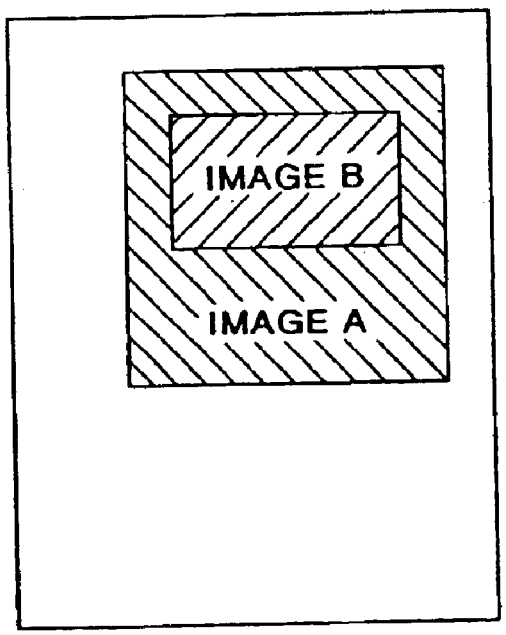
Figure 37:
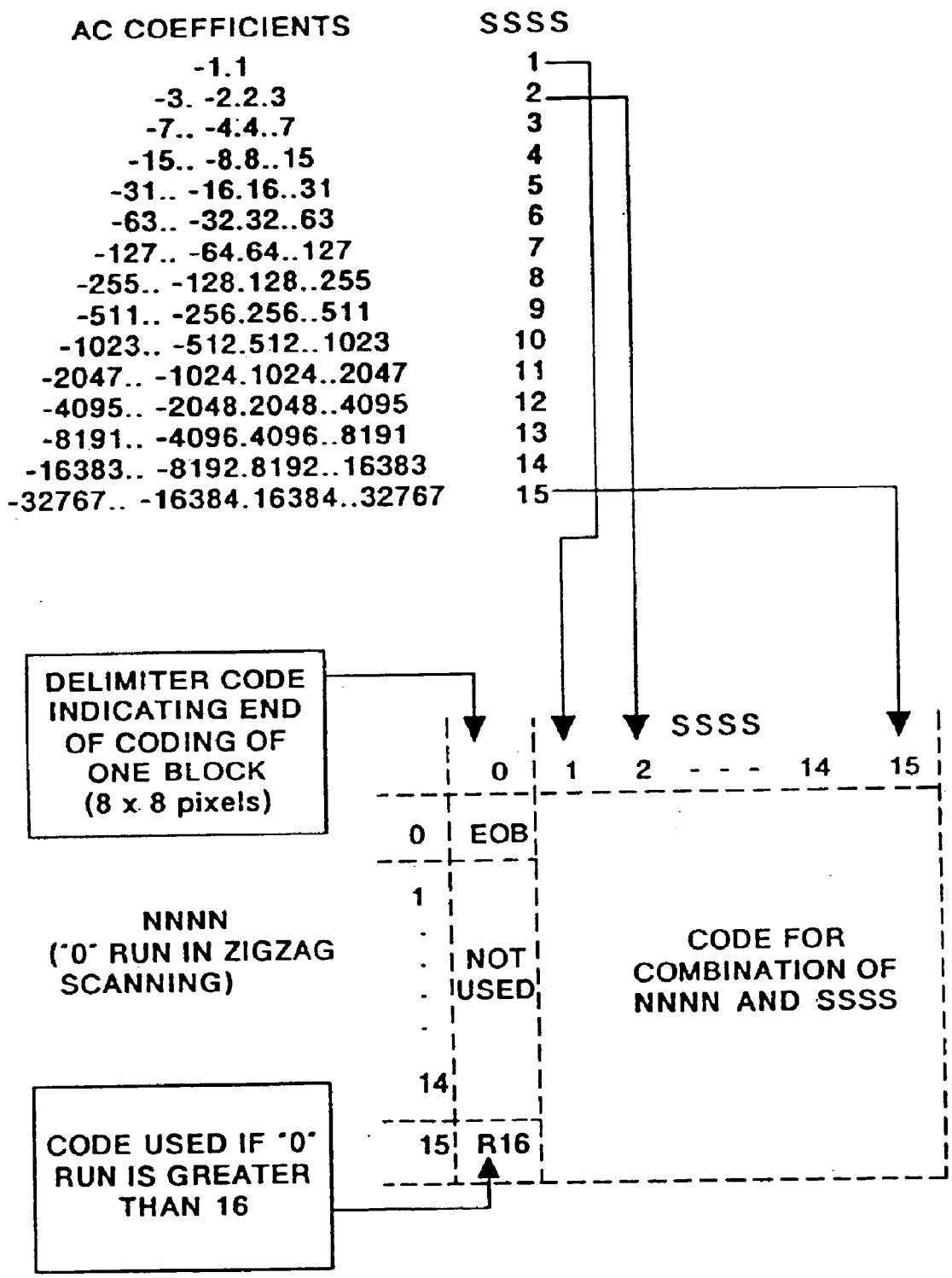
FIG. 37 is a diagram for describing two-dimensional Huffman encoding of AC coefficients by JPEG baseline system.

As shown in FIG. 2, the image memory unit 11 has an input terminal 100 for image data, and a block forming circuit 102 which forms the input data from the input terminal 100 into blocks of, say, 8×8 pixels each. The block forming circuit 102 is connected to a DCT (discrete cosine transformation) circuit 103 which performs an orthogonal transformation. The DCT circuit 103 is connected to a scan converting circuit 104 which, as shown in FIG. 34, subjects each item of data that has undergone DCT processing to a zigzag scan conversion. The scan converting circuit 104 is connected to a quantization unit 105 which subjects the zigzag-scanned data to linear quantization at the step width of a quantization table 106, described below. The quantization table 106 shall be referred to as a "Q table" hereinafter.

The output of the Q table 106 is connected to a variable-length coding (hereinafter referred to as "VLC") circuit 109, which in turn is connected to data-length counter 110 for counting the cumulative value, block by block, of the data length of the coded data outputted by the VLC circuit 109. The data-length counter 110 is connected to a G discriminating circuit 111 which, based upon the output of the counter 110, determines whether the sum total of the quantity of coded data of the prevailing block is less than G bits (G: a predetermined value). An S factor 107 performs scaling of the values in the Q table 106. In accordance with the scaling value from the S factor 107, a multiplier 108 controls the Q-table values, namely the step width of quantization. The VLC circuit 109 is further connected to a buffer 112, which is for storing and holding G bits of data. The output of the buffer 112 is connected to a frame memory 113, which is for storing one frame of data delivered by the buffer 112. An index memory 114 writes the result outputted by the G discriminating circuit 111 into the frame memory 113.

Numeral 26 denotes an input terminal for inputting a synchronizing signal from an external device (not shown). In accordance with the synchronizing signal from the input terminal 115, a memory control circuit 115 controls the frame memory 113. An inverse VLC circuit 116 subjects the coded data, which has been outputted by the frame memory 113, to decoding which corresponds to the coding performed by the VLC 109. An inverse quantization circuit 117 subjects the decoded data to inverse quantization ($Q^{-1}$). A quantization table 118 is used when inverse quantization is performed by the inverse quantization circuit 117. A delay circuit 120 delays timing when inverse quantization is performed.

An S factor 119 is for generating, block by block, an S factor which corresponds to the index, of every block, read out of the index memory 114. A multiplier 121 is for scaling the values of the Q table 118, namely the step width of quantization. A scan converting circuit 122 subjects the output of the inverse quantization circuit 117 to an inverse transformation which corresponds to the scan converting circuit 104. An inverse DCT circuit 123 subjects the output of the scan converting circuit 122 to an inverse discrete cosine transformation which corresponds to the DCT circuit 103. A rasterization unit 124 is for converting the image data outputted by the inverse DCT circuit into raster scanning data. The output of the rasterization circuit 124 is delivered from an output terminal 25.

Figure 3A:
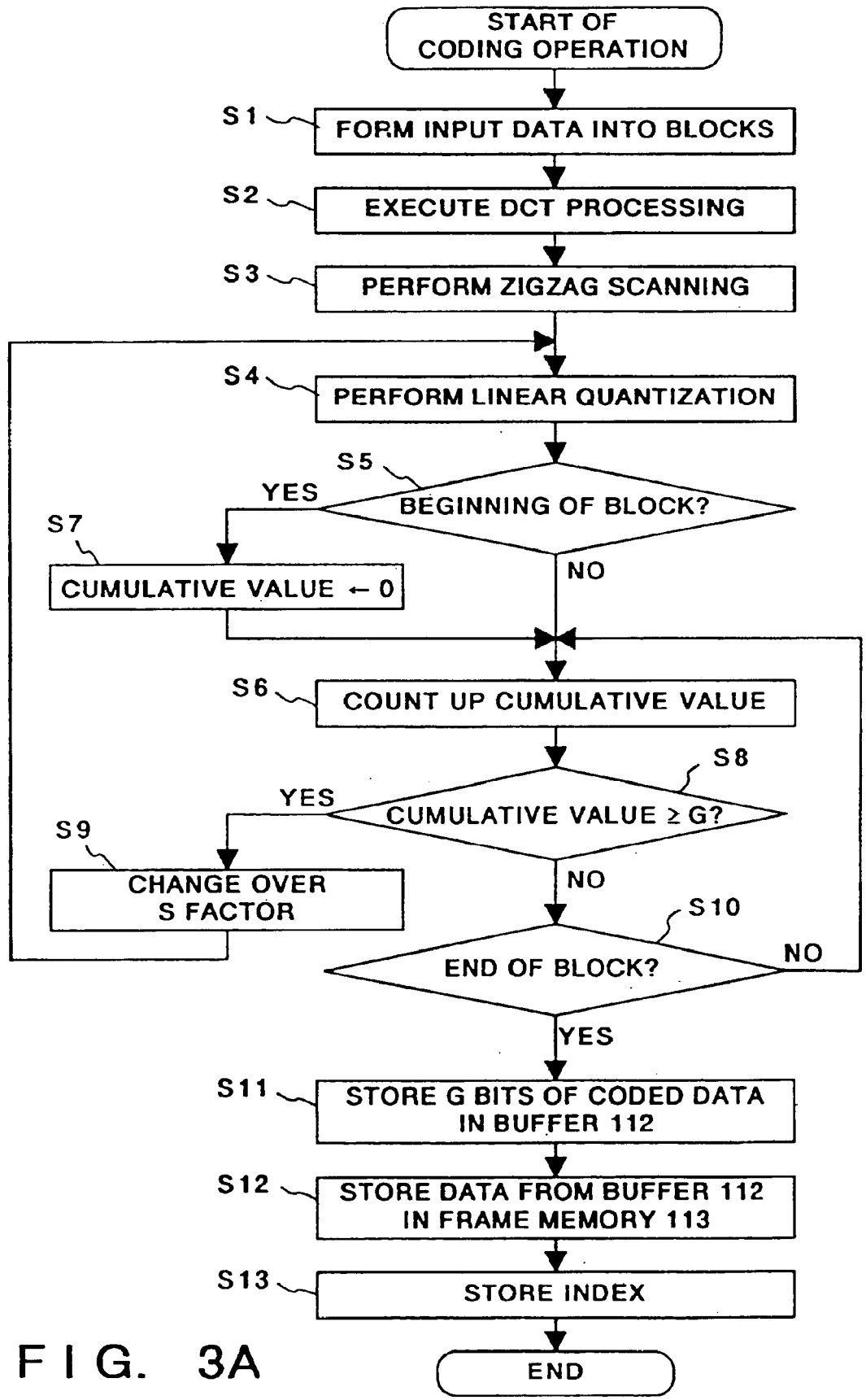
FIG. 3A is a flowchart for describing a coding operation in accordance with the first embodiment.

FIG. 3A is a flowchart for describing the coding operation of the first embodiment, and FIG. 3B is a flowchart for describing the decoding operation of the first embodiment.

First, in coding, the block forming circuit 102 forms the input data from the input terminal 101 into blocks of, e.g., 8×8 pixels, at step S1. Next, upon receiving the data put into block form by the block forming circuit 102, the DCT circuit 103 subjects the data to an orthogonal transformation, namely DCT processing, and outputs the result to the scan converting circuit 104 at step S2. As shown in FIG. 3A, the scan converting circuit 104 subjects each item of data that has undergone DCT processing to a zigzag scan conversion and then outputs the result to the quantization unit 105 at step S3. The quantization unit 105 performs linear quantization at a step width indicated in the Q table 106 and outputs the resulting data to the VLC circuit 109 at step S4.

The VLC circuit 109 outputs the coded data to the buffer 112 and outputs the data length of this data to the data-length counter 110. At step S5, it is examined whether beginning of block is detected. If the beginning of block is detected, the process proceeds to step S7. At step S7, the cumulative value is reset to be zero, then the process returns to step S6. On the other hand, if the beginning of block is not detected, the process proceeds to step S6. At step S6, the data-length counter 110 counts the cumulative value, block by block, of the data length of the coded data outputted by the VLC circuit 109. The data length of one block of coded data is accumulated by the data-length counter 110. Based upon the output of the data-length counter 110, the G discriminating circuit 111 determines at step S8 whether the sum total of the quantity of coded data of the prevailing block, namely the cumulative value, is less than G bits. If it is greater than G bits, then the S factor 107 is changed over at step S9. In conformity with the changeover of the S factor 107, calculation of the Q-table value, namely of the quantization step width, is performed. At this time the Q factor 107 controls the quantization step width according to the scaling value of the value in the Q table 106. If the decision rendered at step S8 is that the cumulative value is less than G bits, the process proceeds to step S10. At step S10, if end of block is detected, then the coded data planted in the buffer 112 by the VLC circuit 109 is stored in the frame memory 113 (steps S11, S12). On the other hand, if end of block is not detected, the process returns to step S6.

By virtue of this operation, block-by-block control of the quantity of coded data (the quantity of VLC data) becomes possible. As a result of the foregoing operation, the G discriminating circuit 111 controls the S factor 107 block by block in such a manner that the sum total of the quantity of coded data within a block is maximized but made less than G bits. The buffer 112 buffers the coded data, block by block, with respect to the S factor 107 obtained as set forth above. The buffer writes this data in the frame memory 113. At step S13 the G discriminating circuit 111 writes the index of the S factor 107 of every block in the index memory 114 for the sake of later decoding. The foregoing operation is repeated so that one frame of coded data and indices are written in the frame memory 113 and index memory 114, respectively.

Decoding will be described next.

When a synchronizing signal from an external device (not shown) enters the input terminal 26 at step S21, the memory control circuit 115, in accordance with this synchronizing signal, controls the frame memory 113 so as to perform read-out in units of G bits from the beginning of the frame memory 113 and, at the same time, controls the index memory 114 in such a manner that an index corresponding to the block read out of the frame memory 113 is read out of the index memory 114 (step S22). The coded data read out of the frame memory 114 is decoded at step S23 by the inverse VLC circuit 116, which corresponds to the VLC circuit 109. The decoded data is subjected to inverse quantization by the inverse quantization circuit 117 at step S24. At this time the quantization table 118 is used and the index of the S factor corresponding to the block which has undergone inverse quantization is used upon being read out of the index memory 114. The delay circuit 120 adjusts timing when inverse quantization is performed.

The S factor 119 generates, block by block, an S factor corresponding to the index of every block read out of the index memory 114 (step S25). The multiplier 121 scales the value of the quantization table 119, namely the quantization step width, and supplies the result to the inverse quantization unit 117 at step S26. The scan converting circuit 122 subjects the output of the inverse quantization unit 117 to an inverse transformation corresponding to the scan converting circuit 104, and delivers its output to the inverse DCT circuit 123 for an inverse discrete cosine transformation corresponding to the scan converting circuit 104 (step S27). The image data that has been returned to the real-space data by the inverse DCT circuit 123 is converted into raster scanning data by the rasterization circuit 124 at step S28. The raster scanning data is outputted from the output terminal 25 at step S29.

Thus, irrespective of the fact that variable-length coding is used, one block of compressed data can be stored within a predetermined value of G bits, and decoding (expansion) can be performed only in G bits. This makes it possible to access the frame memory 113 in units of G bits. Accordingly, memory control is greatly facilitated and compressed image data can be combined in the frame memory 113.

In addition, since a fixed length is achieved in block units, the time required for decoding also is rendered substantially constant every block. Consequently, there is no need for a buffer for rendering constant the transmission rate of data after the decoding necessary for variable-length coding. This makes possible a great simplification in hardware.

[Second Embodiment]

Figure 4B:
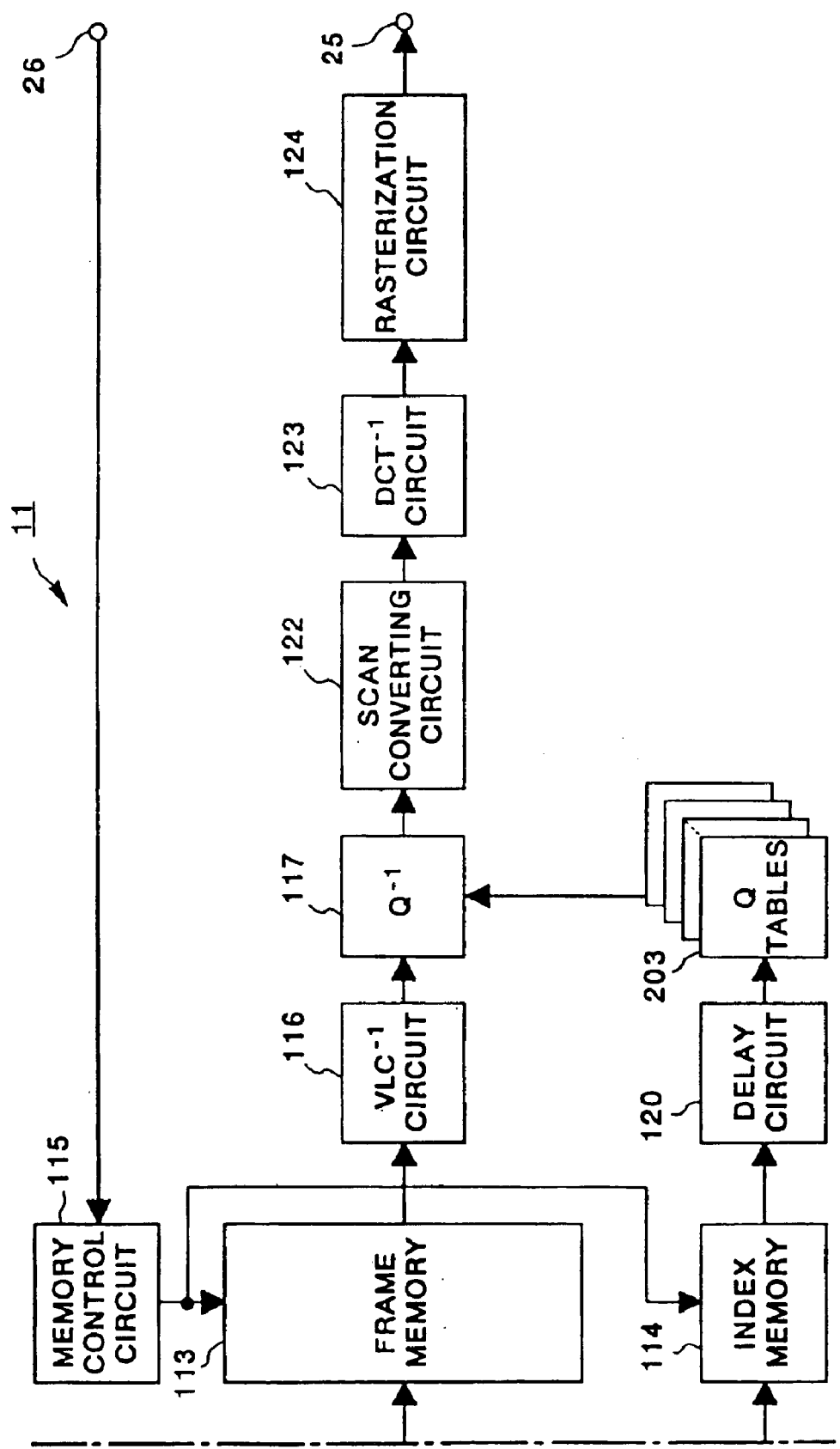

FIG. 4 is a block diagram showing the detailed construction of the image memory unit 11 of FIG. 1 according to a second embodiment of the invention. Blocks in FIG. 4 indicating functions identical with those shown in FIG. 2 are designated by like reference characters. In the first embodiment set forth above, the data quantity of every block is controlled by adjusting the S factor, as illustrated in FIG. 2. In this embodiment, however, the data quantity of every block is controlled by changing over the Q table.

The description will focus on the portions in FIG. 4 that differ from those of the first embodiment of FIG. 2. Numeral 202 denotes a Q-table group having a plurality of Q tables. Numeral 201 denotes a Q-table selecting circuit which, in accordance with the cumulative value from the data-length counter 110, selects one Q table form the Q-table group 202. Numeral 203 designates a Q-table group having a plurality of Q tables for selecting a Q table corresponding to the index, of every block, read out of the index memory 114.

The operation of the second embodiment will now be described in brief.

In coding, the data-length counter 110 counts the sum total of the data length block by block, just as in the embodiment of FIG. 2. The Q-table selecting circuit 201 determines whether the output (cumulative value) of the data-length counter 110 is less than G and selects one Q table from among the Q-table group 202. The Q-table selecting circuit 201 performs the Q-table selection in such a manner that the sum total of the data quantity within a block becomes less than G bits and maximum. The coded data corresponding to the Q table thus selected is buffered in the buffer 12, after which it is written in the frame memory 113 block by block. At the same time, the index corresponding to the Q table of this block is written in the index memory 114.

In decoding, the coded data read out of the frame memory 113 block by block in units of G bits is decoded by the inverse VLC circuit 116 corresponding to the VLC circuit 109, after which the decoded data is inversely quantized by the inverse quantization circuit 117. At this time, the Q table read out of the index memory 114 (the Q table corresponding to the index of the block which has been inversely quantized) is selected from the Q-table group 203. The operation from inverse quantization onward is the same as in the first embodiment, and raster data is finally outputted from the output terminal 25.

Thus, the second embodiment provides effects similar to those of the first embodiment.

[Third Embodiment]

Figure 5A:
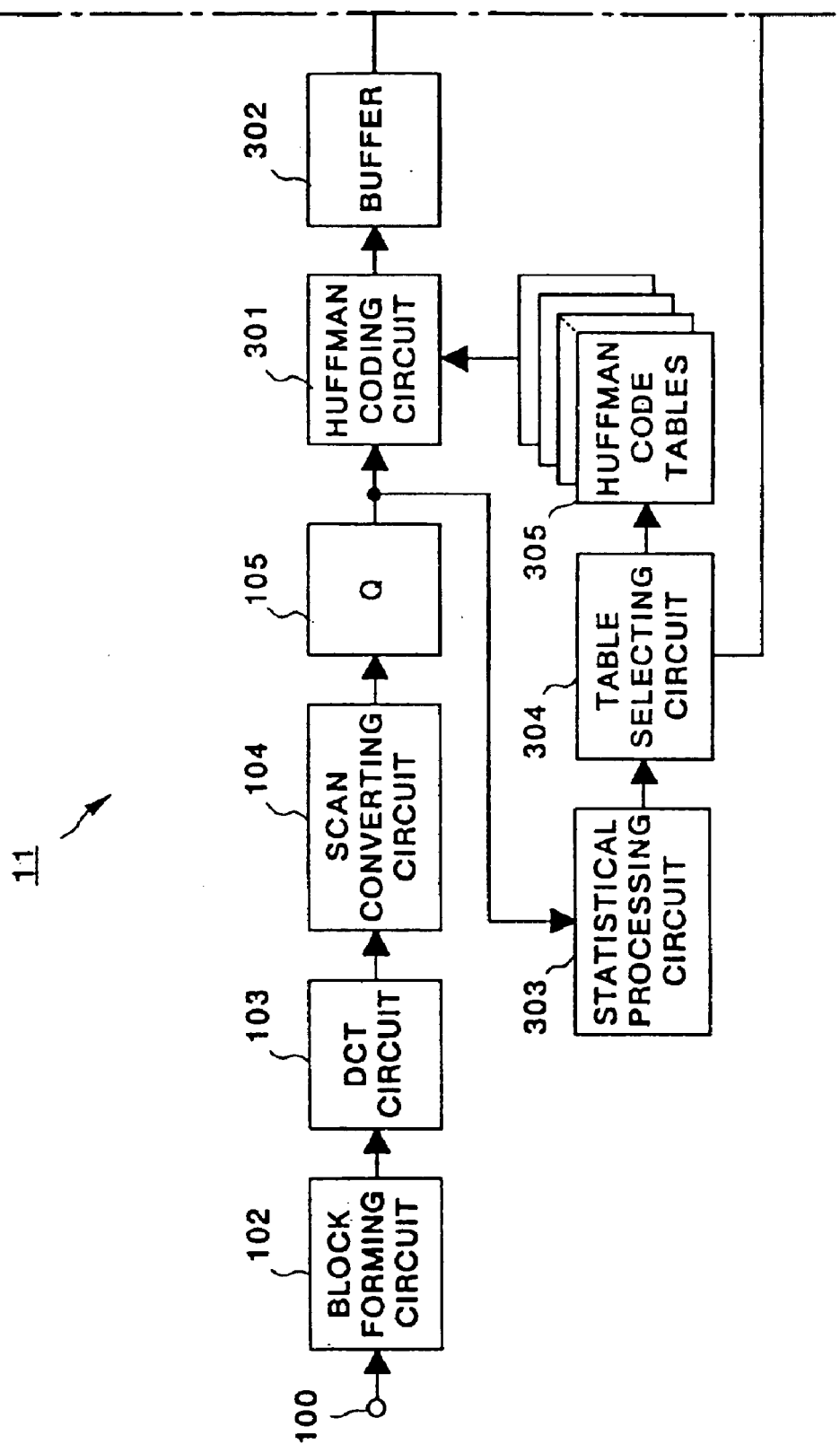

FIG. 5 is a block diagram showing the detailed construction of the image memory unit 11 of FIG. 1 according to a third embodiment of the invention. Blocks in FIG. 5 having functions identical with those shown in FIG. 2 are designated by like reference characters.

The third embodiment is so adapted that a Huffman coding circuit is adopted as the VLC circuit 109 of the second and third embodiments, and the data quantity of every block stored in the frame memory 113 is controlled upon changing over a Huffman code table. In FIG. 5, numeral 301 denotes the Huffman coding circuit, 306 a Huffman decoding circuit, namely an inverse Huffman coding circuit, for performing decoding corresponding to the Huffman coding circuit 301, and 305 a Huffman code table group having a plurality of Huffman codes. Numeral 303 denotes-statistical processing circuit which obtains, for every block, the variance of DCT coefficients after quantization. Numeral 304 designates a table selecting circuit which, based upon the result outputted by the statistical processing circuit 303, selects one Huffman code table from the Huffman code table group 305. Numeral 307 denotes a Huffman code table group having a plurality of Huffman code tables for selecting a Huffman code corresponding to the index, of every block, read out of the index memory 114.

Hereinafter, only aspects of the third embodiment that differ from the first embodiment will be described.

In coding, the Huffman coding circuit 301 Huffman-codes the output of the quantization unit 105 and outputs the result to a buffer 302. The Huffman code table used at this time is selected from the Huffman code table group 305. The method of selection is as follows: The quantization unit 105 delivers its output to both the Huffman coding circuit 301 and statistical processing circuit 303. The variance of the DCT coefficients after quantization is found by the statistical processing circuit 303. The table selecting circuit 304 selects the optimum Huffman code table that conforms to the variance value from the table group 305 and supplies this Huffman code table to the Huffman coding circuit 301. In addition, it stores the table index of this block in the index memory 114. Though the buffer 302 buffers the Huffman-coded data every block, there is no assurance in Huffman coding that the total quantity of data will be less than G bits, namely that such a coding table will always exist and be selected. Accordingly, in a case where the total quantity of block data is greater than G bits, that portion of the data that has exceeded G bits is rounded down. In other words, the buffer capacity is assumed to be G bits, and storage of data in excess of (G+1) bits is prohibited. As a result, the buffer 302 stores block-by-block data of a maximum of G bits in the frame memory 113.

Operation at the time of decoding will now be described.

In synchronization with the synchronizing signal at input terminal 26, one block of data read out of the frame memory 113 in units of G bits is subjected to decoding processing by the inverse Huffman coding circuit 306, after which an output is obtained at output terminal 25 via processing similar to that of the first embodiment. As for the code table used at the time of Huffman decoding processing, the index corresponding to the prevailing block is read out of the index memory 114 and the code table corresponding to this index is selected from the table group 307. Since there are cases where data of (G+1) bits or greater is rounded down, as mentioned above, the inverse Huffman coding circuit 306 is reset at the beginning of the block.

Thus, this embodiment is capable or providing effects similar to those of the first embodiment.

Though the Huffman code table is selected in accordance with the variance value in the third embodiment, it is possible to adopt an arrangement in which coding is carried out for each Huffman code table and the Huffman code table selected is that for which the information quantity (the sum total of code length) within a block is minimized.

According to the first through third embodiments set forth above, selection of the S factor, Q table and Huffman code table is performed serially. However, these may be selected in parallel fashion to select the optimum coded data and parameters.

In addition, in the first through third embodiments, selection of the S factor, Q table and Huffman code is performed individually. However, it goes without saying that these may be combined.

Further, in the first through third embodiments, the index memory 114 is provided separate from the frame memory 113. However, an arrangement can be adopted in which multiplexed indexing is applied to the coded data which is then stored in the frame memory. In this case, the index memory 114 will be unnecessary.

Further, the coding method is not limited to the above-described ADCT (advanced discrete cosine transformation). For example, other forms of variable-length coding, such as arithmetic coding, can be employed.

Moreover, the processing described above can be performed by computer software as well as by a hardware configuration.

[Fourth Embodiment]

Figure 6:
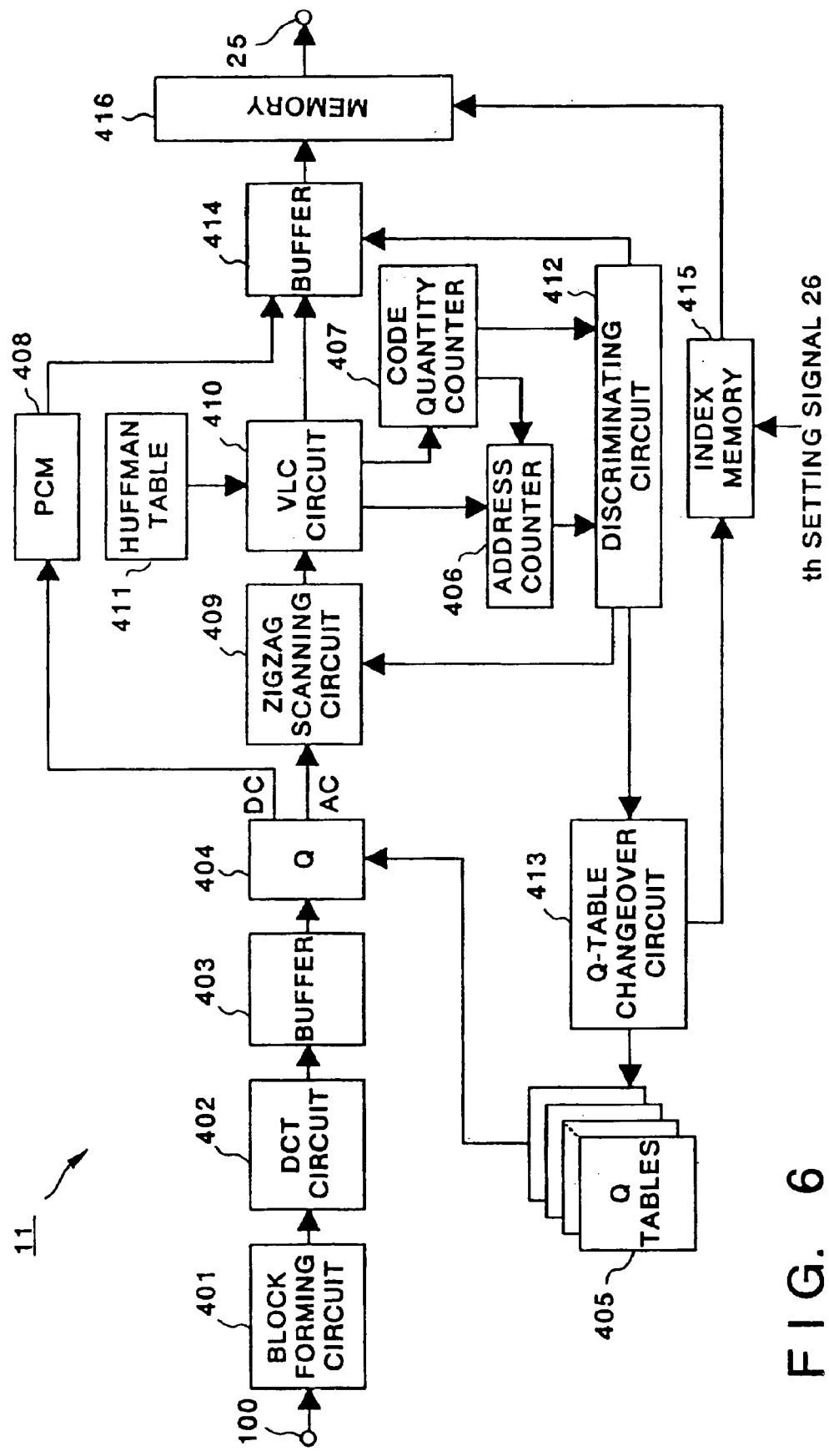
FIG. 6 is a block diagram illustrating the construction of the image memory unit in accordance with a fourth embodiment of the present invention.
Figure 9:
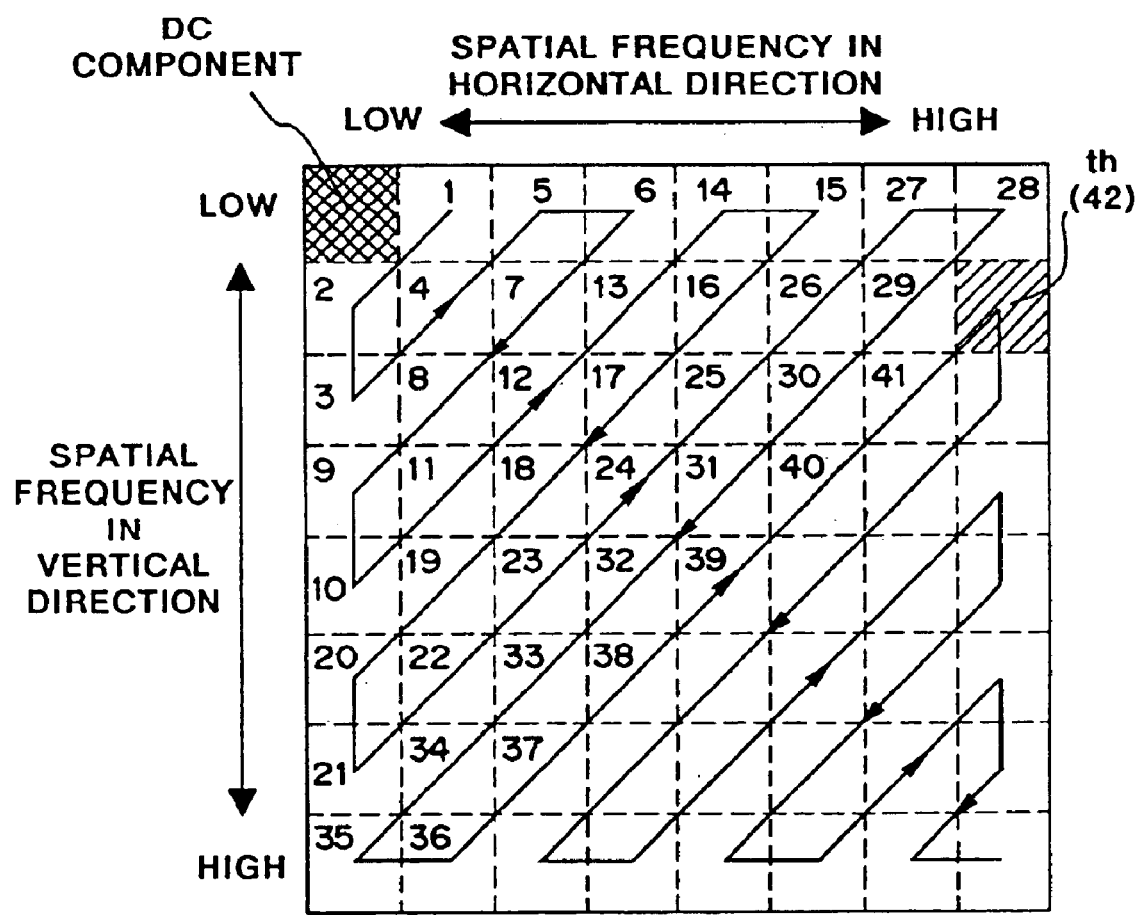
FIG. 9 is a diagram for describing zigzag scanning in accordance with the fourth embodiment.

FIG. 6 is a block diagram showing the detailed construction of the image memory unit 11 according to a fourth embodiment of the invention. FIG. 9 is a diagram for describing the zigzag scanning of the fourth embodiment.

As shown in FIG. 6, the image memory unit 11 has the input terminal 100 for inputting image pixel data (multivalued information having density information), and a block forming circuit 401 which forms the input data from the input terminal 100 into blocks of, say, 8×8 pixels each. The block forming circuit 401 is constituted by line memories for applying a delay equivalent to several lines. The block forming circuit 401 is connected to a DCT circuit 402 which performs an orthogonal transformation by DCT. The DCT circuit 402 is connected to a buffer 403, which stores transformation coefficients in block units. The buffer 403 is connected to a quantization unit 404 which, in accordance with Q (quantization) step information applied by a Q (quantization) table, subjects the transformation coefficients stored in the buffer 403 to linear quantization (Q). Numeral 405 denotes a Q-table group equipped with a plurality of Q tables supplied to the quantization unit 404.

Numeral 408 denotes a coding circuit (hereinafter referred to as a "PCM circuit") which obtains the differential (error) between a DC coefficient, from among transformation coefficients quantized by the quantization unit 404, and the DC component of the preceding block. Numeral 409 denotes a scan converting circuit for sequentially zigzag scanning the AC coefficients (coefficients other than DC coefficients), quantized by the quantization unit 404, from coefficients of lower order, as illustrated in FIG. 9. Numeral 410 denotes a VLC circuit which, in accordance with a Huffman table 411 described below, applies variable-length coding to the quantized coefficients zigzag-scanned by the zigzag scanning circuit 409. Numeral 406 denotes an address counter for counting the addresses outputted by a VLC circuit 110, namely a run length of (NNNN+1). Numeral 407 denotes a code-quantity counter for counting a code quantity outputted by the VLC circuit 410. The aforementioned Huffman table 411 possesses data set in such a manner that the code quantity is minimized in conformity with the frequency of occurrence of quantized coefficients inputted to the VLC circuit 410.

A discriminating circuit 412 determines whether the sum of the count in the code-quantity counter 407 and the code quantity presently being generated is greater than a predetermined value th. The discriminating circuit 412 determines whether scanning and coding within a block have ended. If the scanning and coding have not ended, the zigzag scanning circuit 408 is so informed. A Q-table changeover circuit 413 changes over the Q table of the Q-table group 405 based upon the determination made by the discriminating circuit 412. A buffer 414 temporarily stores the coded data outputted by the PCM circuit 408. An index memory 415 stores an index signal (information indicating which Q table has been selected) sent from the Q-table changeover circuit 413. A memory 416 stores, in pairs, the coded data from the buffer 414 and the index signal from the index memory 415. The output terminal 25 is for outputting the data from memory 416.

The VLC circuit 410 will now be described in detail.

Figure 8:
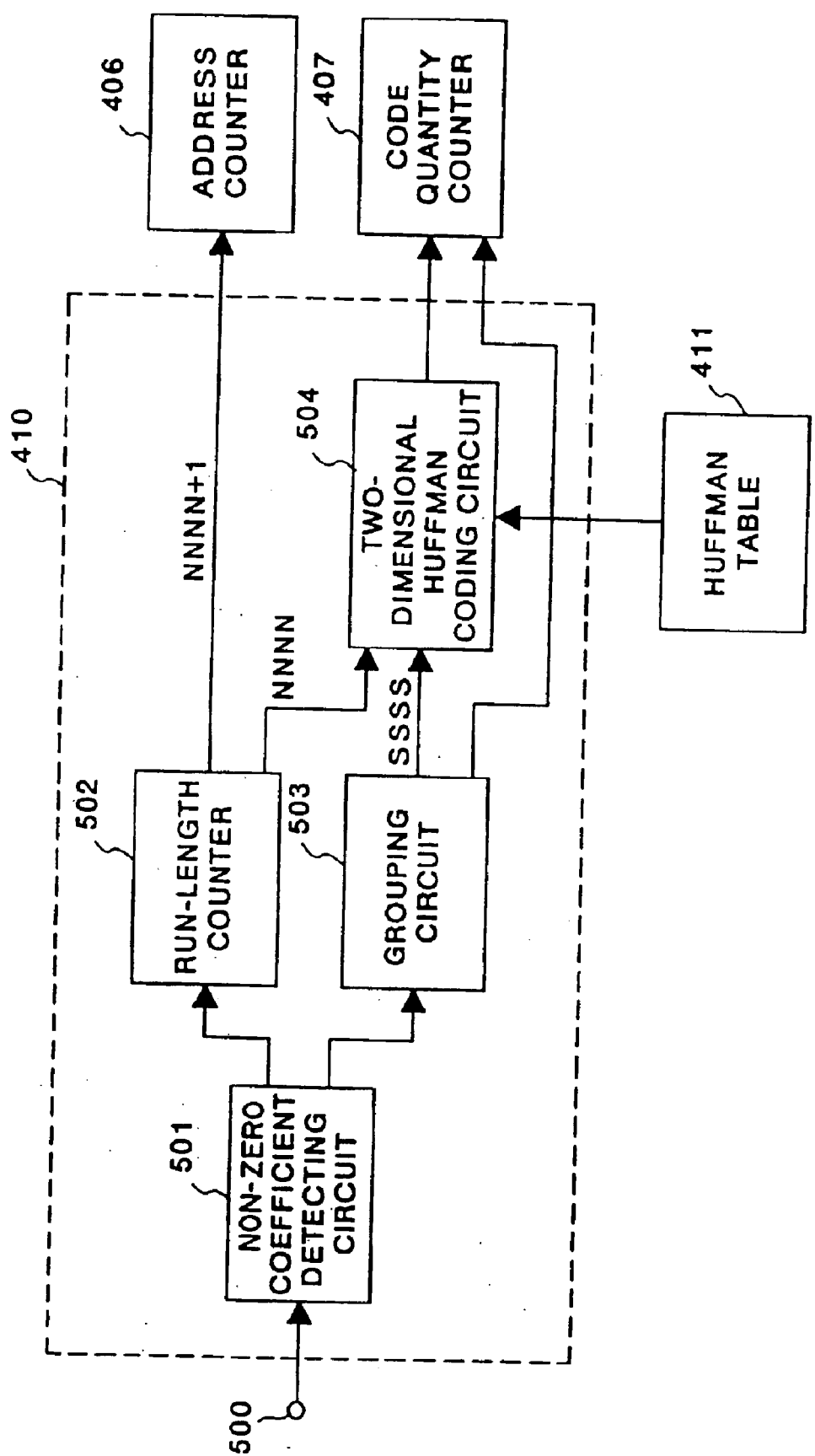
FIG. 8 is a block diagram illustrating the construction of a VLC circuit in accordance with the fourth embodiment of the present invention.

FIG. 8 is a block diagram illustrating the construction of the VLC circuit 410 according to the fourth embodiment. As shown in FIG. 8, the VLC circuit 410 includes a significant-coefficient detecting circuit 501 for detecting that a quantized coefficient inputted to the VLC circuit 410 is at state "0", a run-length counter 502 for counting the "0" run length from the significant-coefficient detecting circuit 501, a grouping circuit 503 for splitting a quantized coefficient other than "0" from the significant-coefficient detecting circuit 501 into a group number and annexed bits and outputting these separately, and a two-dimensional Huffman coding circuit 504 which, in accordance with the Huffman table 411, described below, applies variable-length coding to the run length NNNN and group number SSSS respectively outputted by the run-length counter 502 and grouping circuit 503.

The operation of the fourth embodiment will be described next.

Figure 7:
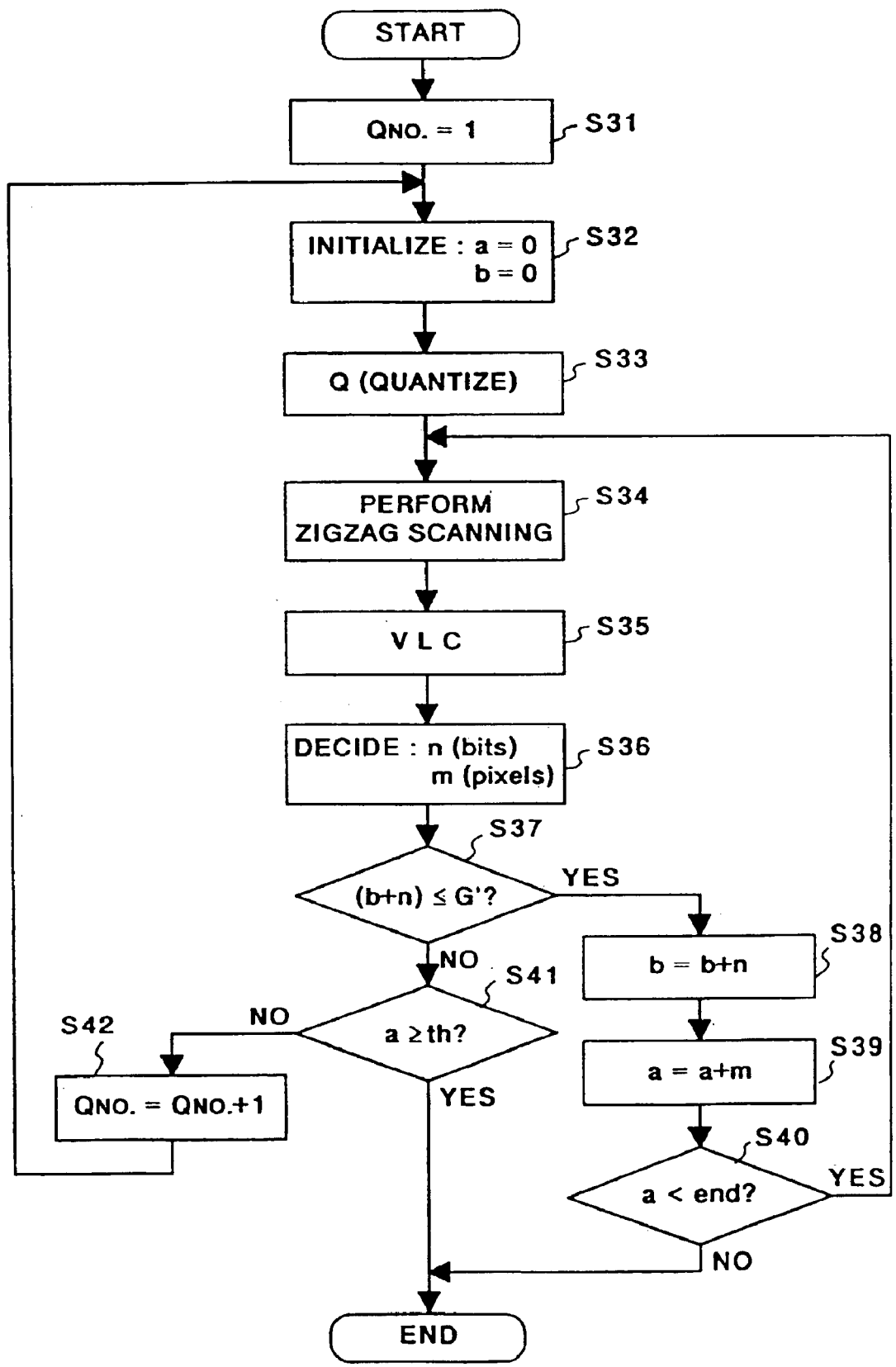
FIG. 7 is a flowchart for describing a coding operation in accordance with the fourth embodiment.

FIG. 7 is a flowchart for describing the coding operation of the fourth embodiment.

First, multivalued information inputted from the input terminal 100 is cut into, say, a block of 8×8 pixels by the block forming circuit 401, which delivers the resulting information to the DCT circuit 402. In this embodiment, DCT is employed in the orthogonal transformation, but it is of course permissible to use another method of orthogonal transformation. The DCT-processed transformation coefficient is temporarily stored in the buffer 403 and then supplied to the quantization unit 404. This embodiment is characterized by a control method in which, in order to render a code quantity within a cut block constant, a changeover is made in the Q-table group 405, which has various types of Q tables, so as to employ the optimum Q table.

At step S31 in the flowchart of FIG. 7, "1" is substituted into the Q-table number (hereinafter referred to as a "Q No."). In other words, the Q table is made Q No. 1. Next, two variables indicated by a, b are initialized at step S32. The variable a represents the count of address counter 406, and the variable b represents the code-quantity count recorded by the code-quantity counter 407. Next, at step S33, linear quantization of the DCT coefficient within the buffer 403 is carried out in accordance with the Q table of Q No. 1.

The quantized DC component is coded by the PCM circuit 408, and the quantized AC component is rearranged in one dimension by the zigzag scanning circuit 409 at step S34. As in the example of the prior art, zigzag scanning entails scanning in the forward direction from lower order to higher order AC components. Next, while zigzag scanning is carried out, the scanned quantized coefficients are coded in the VLC circuit 410 at step S35.

In variable-length scanning, the Huffman table 411, which has been set in such a manner that the code quantity is minimized in conformity with the frequency of occurrence of the inputted coefficients, is loaded, and the coefficients are subjected to entropy coding. The VLC circuit 110 will now be described as applied to the aforementioned JPEG method. In FIG. 8, the portion enclosed by the dashed line corresponds to the VLC circuit 410. First, when a quantized zigzag-scanned coefficient enters from the input terminal 500 of FIG. 8, the non-zero coefficient detecting circuit 501 determines whether the inputted quantized coefficient is "0". If the coefficient is "0", the detecting circuit 501 supplies a count-up signal to the run-length counter 502, whereby the count in counter 502 is incremented. In case of a quantized coefficient other than "0", the detecting circuit 501 supplies a reset signal to the run-length counter 502, whereby the count in the counter 502 is reset and the quantized coefficient is split into a group number and annexed bits by the grouping circuit 503. The group number SSSS is supplied to the Huffman coding circuit 504, and the annexed bits are supplied to the code-quantity counter 407. The run-length counter 502 is a circuit which counts the "0" run length and supplies the Huffman coding circuit 504 with the number NNNN of "0"s between non-zero coefficients other than "0". In accordance with the Huffman table 111, the Huffman coding circuit 504 subjects the supplied "0"-run length NNNN and group number SSSS of non-zero coefficients to variable-length encoding and supplies the results to the code-quantity counter 407.

In the arrangement of the VLC circuit 410, variable-length coding occurs when a quantized coefficient other than "0", namely a non-zero coefficient, enters. However, the code quantity which occurs (namely the sum of the annexed bits and the code quantity in the two-dimensional Huffman coding) is made n bits.

In the case where the input is a quantized coefficient other than "0", as mentioned above, no code quantity is produced. When a non-zero coefficient other than "0", is inputted, the run-length counter 502 is reset and the "0"-run value NNNN is outputted. However, the number of inputs, namely (NNNN+1), which is equivalent to ("0"-run value)+(the input itself for which a non-zero coefficient has appeared), is supplied to the address counter 406. In other words, from the moment a code quantity is produced until the moment the next code quantity is produced, the number of pixels that have been zigzag-scanned is expressed by m (pixels)= (NNNN+1).

More specifically, at step S36 in FIG. 7, the code quantity n (bits) at the time of code-quantity occurrence and the number m of pixels scanned during this time are decided. Then, at step S37, the discriminating circuit 412 determines whether the sum of the count b in the code-quantity counter 407 and the code quantity n currently produced is greater than a predetermined code quantity indicated by G'. In a case where G represents the quantity of code attempting to be rendered constant within a block, the predetermined code quantity G' is as indicated by the following equation:

$$G = G' + d + i \qquad (1)$$

where d represents the code quantity of the DC component, and i represents an index number which indicates which Q table has been used.

By way of example, if the DC component has a fixed length of eight bits and four types of Q tables are provided in a case where G=64 bits holds, two bits are required for the index signal and therefore G'=64−8−2=54 (bits) will hold.

If (b+n)≦G' is found to hold at step S37 in FIG. 7, namely if the predetermined code quantity G' has not yet been attained, the operation a=a+m is performed at step S39, whereby the address counter 406 is counted up. Next, at step S40, it is determined whether a<end holds (where "end" is the address of the last pixel within the block; this would be the 63rd pixel in a block composed of 8×8 pixels). This is to determine whether scanning and coding within the block have ended. If scanning and coding have not yet ended, processing returns to step S34 and zigzag scanning is resumed from the address at which processing stopped.

If the condition b+n≦G' is not satisfied at step S37 after the foregoing operation has been repeated, namely if the count in the code-quantity counter 407 to which the current n bits have been added is found to exceed the predetermined code quantity G', then it is determined at step S41 whether a≧th (threshold value) holds.

Reference will be had to FIG. 9 to describe the meaning of th.

FIG. 9 illustrates zigzag scanning in a block composed of 8×8 pixels. Here numbers are assigned in the order of AC-component scanning. In this example, the 42nd component is adopted as the threshold value th.

By way of example, if the present apparatus is applied to an image output apparatus such as a printer, resolution will differ, as a matter of course, depending upon the output characteristics of the printer used. Also, when the outputted image is observed, there is a limitation upon resolving power in the high-frequency region owing to the characteristics of human vision. Accordingly, it is necessary to determine both of these characteristics in advance, based upon experience and experimentation, and establish the boundary frequency beforehand. In other words, the idea is to compensate at least coding of a band up to the boundary value without performing coding up to the 63rd component, which is the last component within the block.

In this embodiment, it is assumed, by way of example, that the boundary value is the 42nd component. That is, it is required to discern whether the coded address has reached the threshold value, wherein the threshold value (th) serves as the boundary value. This is the determination regarding a≧th indicated at step S41 in FIG. 7. If the code quantity has exceeded the predetermined value without the threshold value (th) being attained, the Q No. is counted up and quantization is performed again using a different Q table (step. S42). Conversely, in a case where coding has attained the threshold value (th), this means that coding up to the boundary value has been assured, and coding ends. If coding has ended, the code quantity should be equal to G', but there is no assurance that it will. In such case, various expedients are conceivable, such as "stuffing" "0" or applying an EOB (end-of-block) signal until the code quantity becomes equal to G'. Here it is assumed that the th-setting signal 26 is outputted by the output controller 13 in FIG. 1 so that the value of th is set in the discriminating circuit 412 in dependence upon the printer used. The value of th is set to be large in case of a high-resolution printer and small in case of a low-resolution filter.

A characterizing feature of this embodiment is that it is necessary to gradually change over the Q table from one having a fine quantization step width to one having a coarse quantization step width. More specifically, the quantization steps are set so as to gradually become coarser in the manner Q No.=0, Q No.=1, Q No.=2, . . . , in which Q No.=0 is the finest. Conversely, the code quantity after quantization is set so as to gradually decrease whenever feedback is performed.

As a result of the foregoing, Q No. is counted up and excellent coding is performed up to the boundary value (threshold value th).

Returning to FIG. 6, the coded data that has been stored in the buffer 414 is planted in the memory 416, along with the index signal from the index memory 415 indicating which Q table has been selected, by satisfying the above-mentioned conditions. Though a minute description of what takes place outside the present apparatus after an output is delivered from the output terminal 25 is deleted, decoding of the data that has been stored in the memory 416 is performed through a procedure which is the reverse of the operation described above.

Thus, in accordance with the fourth embodiment of the invention, it is possible to perform optimum quantization which conforms to the output characteristics of the image output unit and the visual characteristics of the human being who observes the output image. More specifically, up to a preset threshold frequency, a band compensated excellent compression can be at least achieved through a simple arrangement which entails adding a counter and a comparator.

In addition, it is possible also to shorten the time needed to select the optimum quantization conditions.

[Fifth Embodiment]

Figure 10:
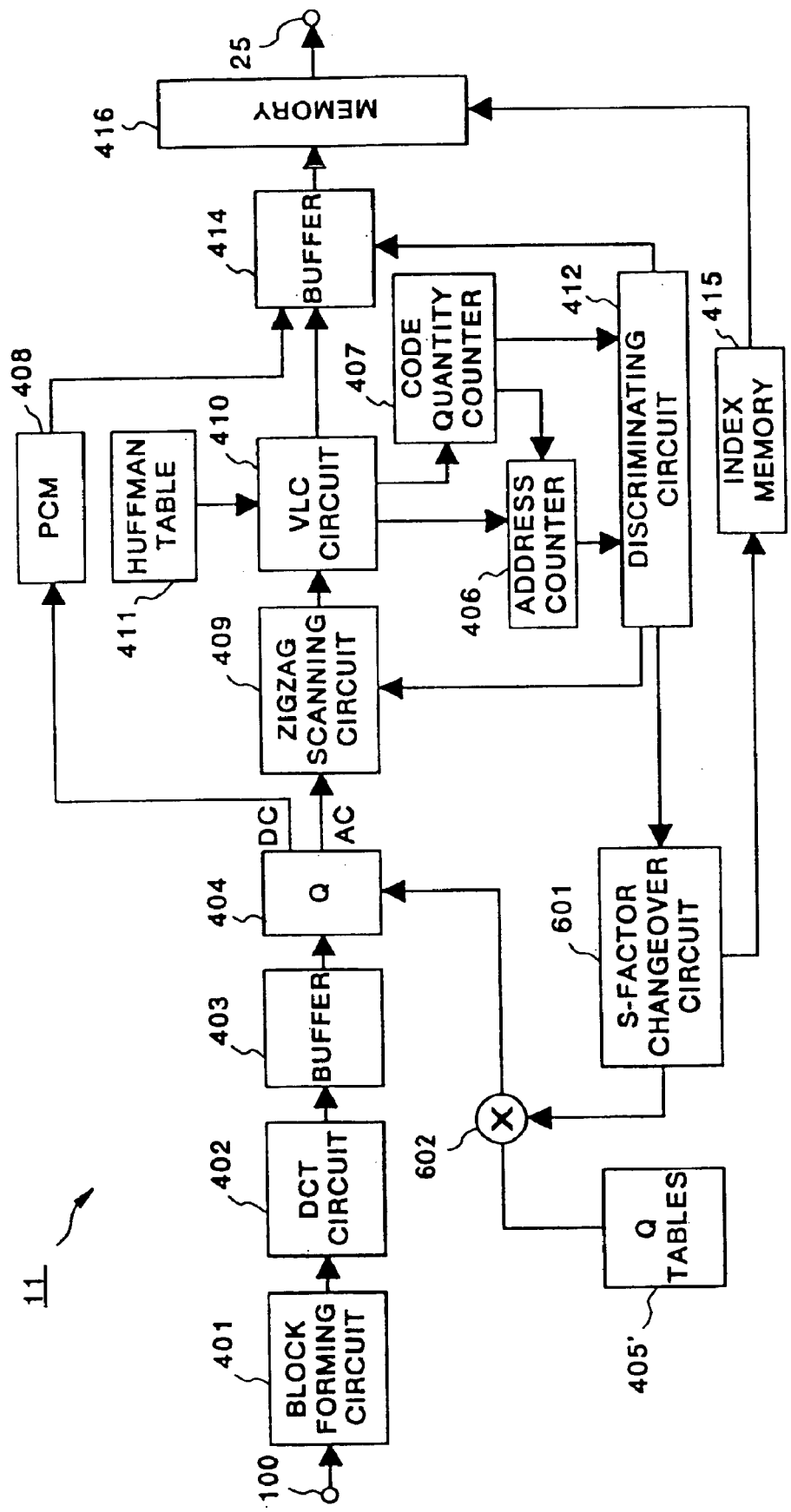
FIG. 10 is a block diagram illustrating the construction of the image memory unit in accordance with a fifth embodiment of the present invention.

FIG. 10 is a block diagram showing the construction of the image memory unit 11 of FIG. 1 according to a fifth embodiment of the invention. Portions in FIG. 10 identical with those shown in FIG. 6 are designated by like reference characters. In this embodiment, the Q table is of only one type (denoted Q table 405'), and the quantization step width in the Q table is made variable by multiplication with a certain coefficient.

In FIG. 10, numeral 601 denotes an S (scaling)-factor changeover circuit, which corresponds to the Q-table changeover circuit 413 of FIG. 6. Numeral 602 denotes a multiplier for multiplying the data of the Q table 405' by a coefficient applied to the S-factor changeover circuit 601.

When the discriminating circuit 412 determines that coding has not reached the boundary value (threshold value th) within a block, as described in connection with the fourth embodiment, the S-factor changeover circuit 601 changes over the coefficient (hereinafter referred to as an "S factor") by which the Q table is multiplied, the multiplication is performed by the multiplier 602, and quantization is performed again. In this case, what is important is the premise that the S factor is changed over gradually from a small value to a large value. Several types of S factors are provided, and which S factor is selected is stored in the index memory 415. For example, in a case where four types of S factors have been provided, the four types can be expressed by a two-bit signal. Therefore, the type of S factor is stored in the index memory 415 by the two-bit signal, and the selected index signal is supplied to the memory 416.

In this embodiment, the Q table is fixed and the quantization step width within the table varies linearly. Consequently, though control conforming to the frequency characteristic (f characteristic) is not feasible, the overall construction is simpler than that of the fourth embodiment.

[Sixth Embodiment]

Figure 11:
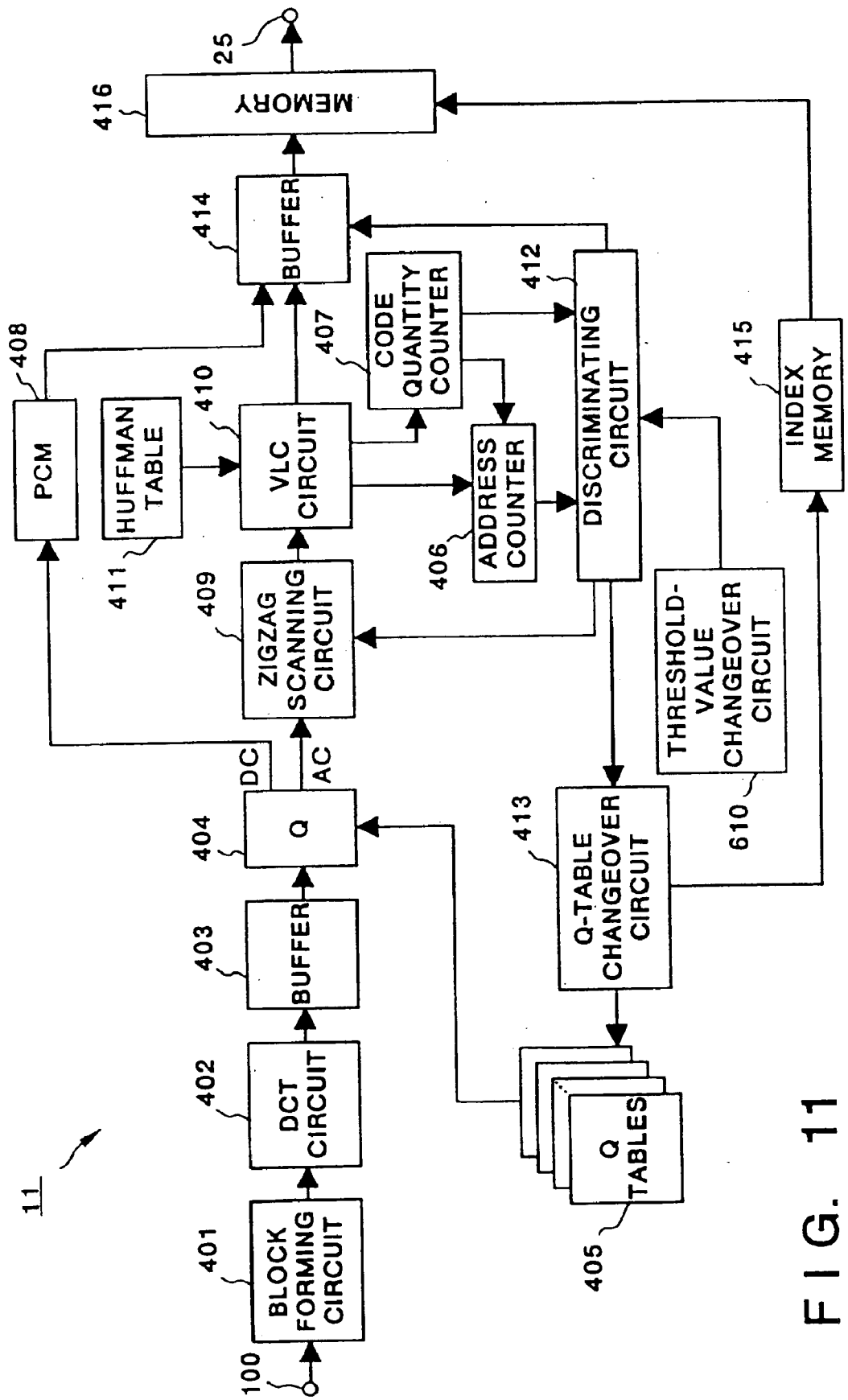
FIG. 11 is a block diagram illustrating the construction of the image memory unit in accordance with a sixth embodiment of the present invention.

FIG. 11 is a block diagram showing the construction of the image memory unit 11 of FIG. 1 according to a sixth embodiment of the invention. Portions in FIG. 11 identical with those shown in FIG. 6 are designated by like reference characters. In this embodiment, a threshold changeover circuit 610 is connected to the discriminating circuit 412 described in the fourth embodiment. More specifically, the fixed boundary value (threshold value) within a block in accordance with the fourth and fifth embodiments is made variable in this embodiment. However, the threshold value varies only under the condition that the output characteristic of the printer used varies, as well as the characteristic of human vision.

By way of example, if the present embodiment is applied to a color-image output apparatus such as a color printer or color copier, it is assumed that three plain color signals Y (yellow), M (magenta) and C (cyan) are inputted. In a case where the Y, M and C signals are compressed, it is preferred that these types of signals be handled individually even with regard to the output characteristic of the printer and the characteristics of human vision. In other words, it is required that the output characteristic and visual characteristic be obtained experimentally and based upon experience for Y, M and C independently, and that the boundary frequency be determined in advance. The Y, M and C boundary values, which are denoted by $th_Y$, $th_M$ and $th_C$, are judged based upon threshold values conforming to the color components of the input signal set in the threshold changeover circuit 610. Here, in accordance with visual characteristics, the boundary value of Y (yellow), which is difficult for the human eye to sense, is set to be small, while the boundary values of M (magenta) and C (cyan), which are comparatively easy to sense, are set to be large. The judgement conditions are the same as the contents shown in the flowchart of FIG. 7. Though Y, M and C are taken as examples in this embodiment, it goes without saying that another color model can be used.

Figure 12B:
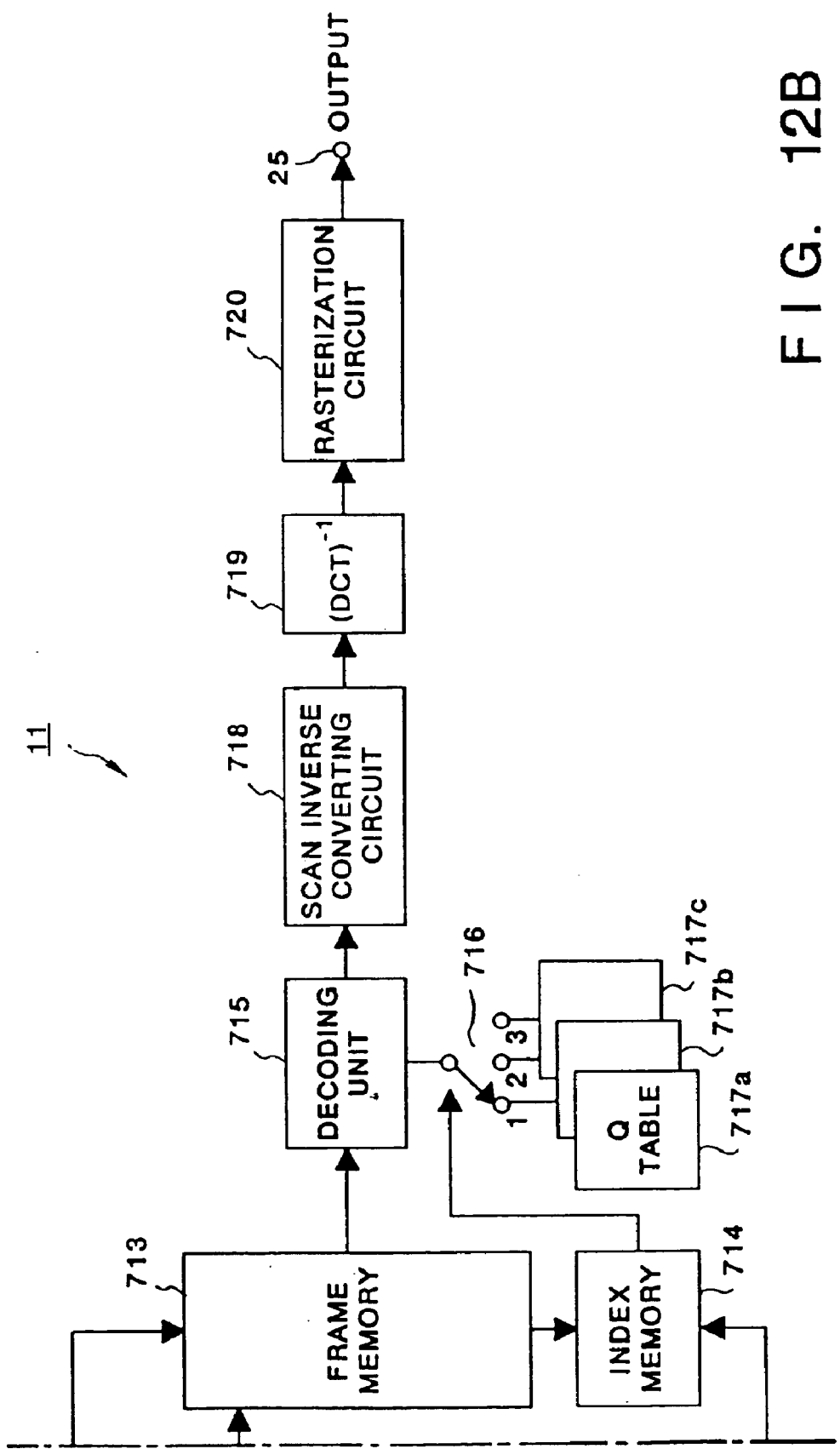

FIG. 12 is a block diagram showing the construction of the image memory unit 11 of FIG. 1 according to a seventh embodiment of the invention.

As shown in FIG. 12, image pixel data which has entered from the input terminal 100 is split into blocks of, say, 8×8 pixels each by a block forming circuit 702 constituted by line memories for applying a delay equivalent to several lines. A cosine transformation is performed every block by a DCT circuit 703, and a scan converting circuit 704 then converts the data into a one-dimensional data string. Thereafter, the coded data from a coding unit 705 is stored in a buffer memory 709 or 710 controlled by a table selector 712 and memory controller 708, which will be described below.

Figure 32:
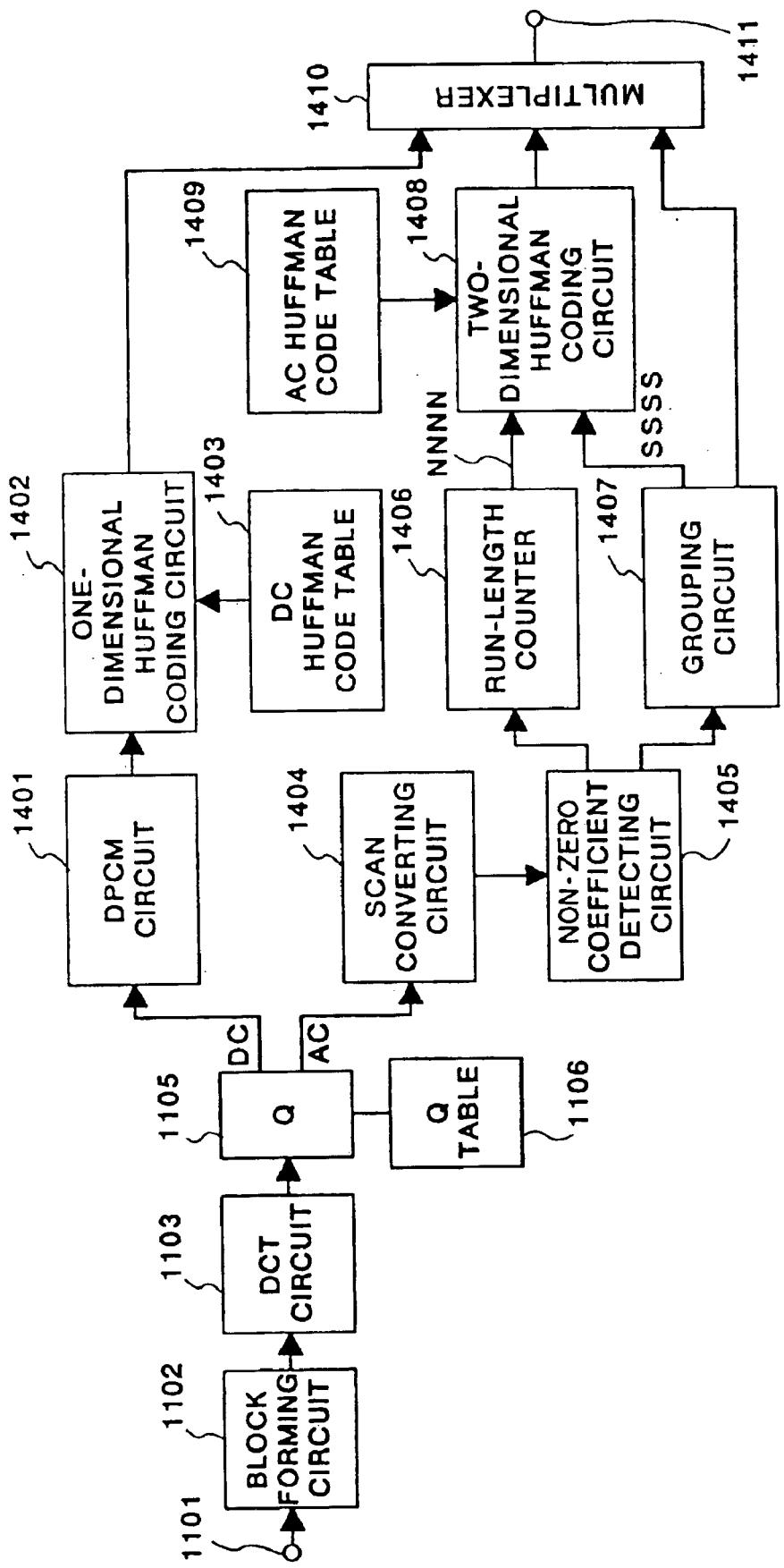
FIG. 32 is a block diagram illustrating the construction of an image memory circuit which uses the coding method of JPEG baseline system according to the prior art.
Figure 33:
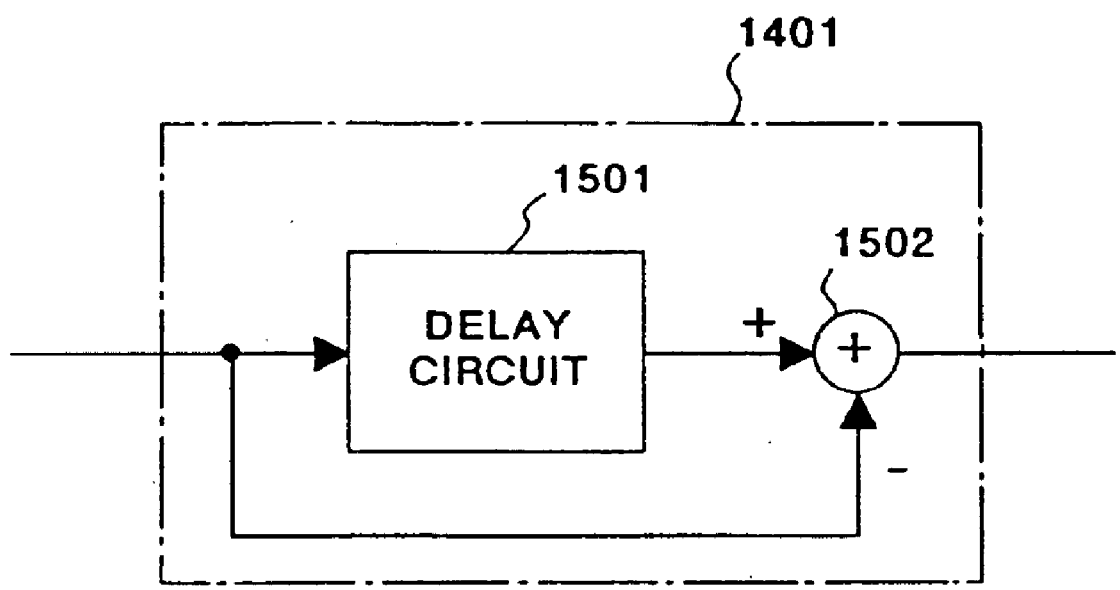
FIG. 33 is a block diagram illustrating the detailed construction of a DPCM circuit.

FIG. 14 is a block diagram illustrating the detailed construction of the coding unit 705. As shown in FIG. 14, the coding unit 705 includes a quantizer (Q) 722 and a VLC (variable length coding unit) 723 of the kind indicated in the prior-art example of FIG. 32 from 1401 to 1411. Ordinarily, quantization is carried out while referring to the quantization (Q) table 706. FIG. 13 is a diagram showing an example of this quantization table (JPEG Y table).

However, in this embodiment, as illustrated in FIG. 12, a plurality of quantization tables 706a–706c are provided so as to be selectable by a switch 707. The arrangement is such that the coded data from the coding unit 705 is monitored and the table selector 712 changes over the quantization tables 706a–706c based upon the result of monitoring. The quantization tables 706a–706c have contents that differ from one another, and the tables are so arrayed that values at the same positions in the tables 706a–706c become successively smaller in the order 706a→706b→706c.

Figure 16:
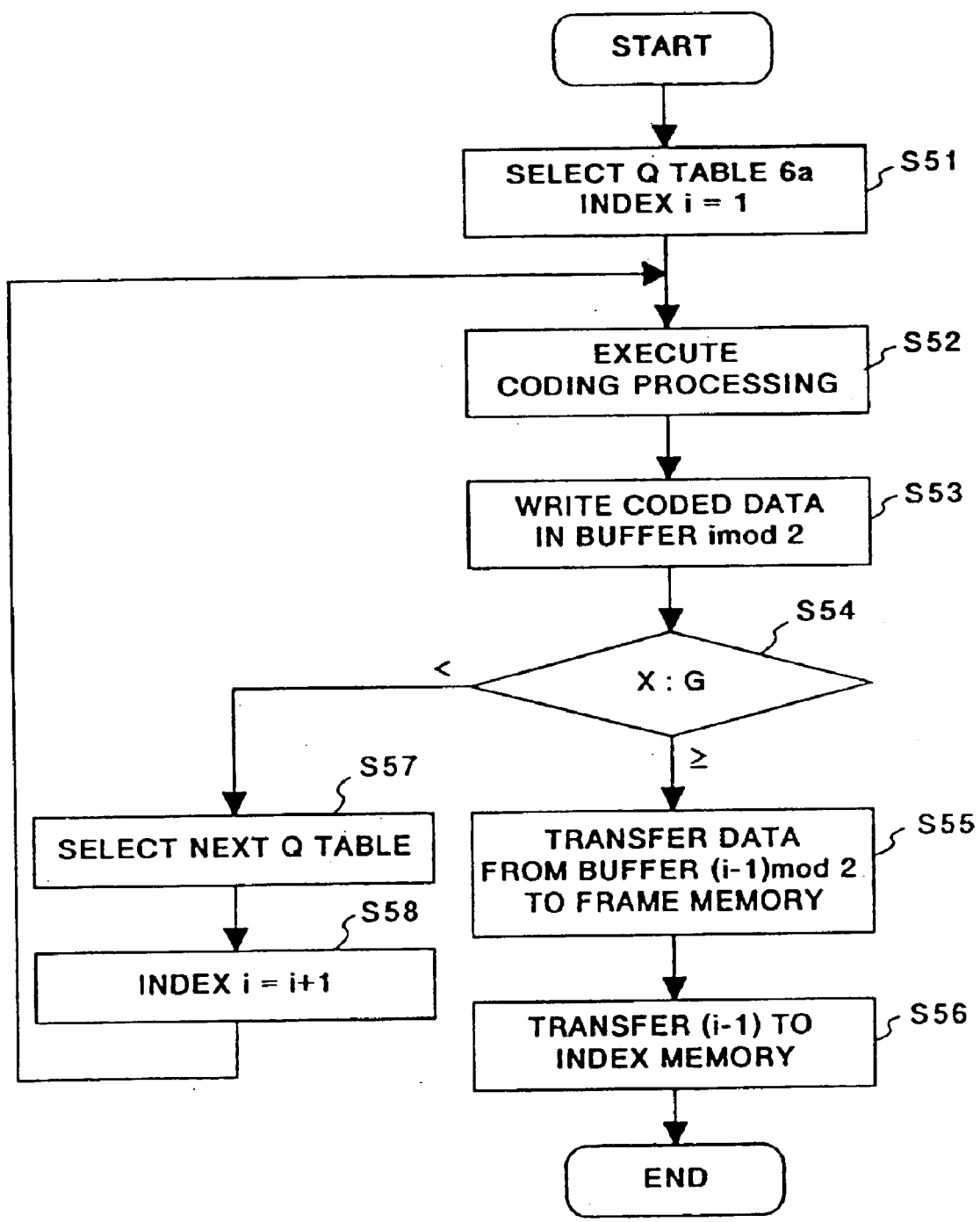
FIG. 16 is a flowchart illustrating a coding and storing operation in accordance with the seventh embodiment.

Accordingly, when the quantization tables are changed over in the manner 706a→706b→706c, the quantity of information generated by the coding unit 705 increases in monotonous fashion (i.e., the compression rate decreases). Next, the coding and storing operations of this embodiment will be described in accordance with the flowchart shown in FIG. 16.

First, at step S51, the quantization table 706a is selected by the table sensor 712, and the index i is initialized. Next, at step S52, the coding unit 705 codes the image data, which has been put into block form, based upon the selected quantization table. This is followed by step S53, at which the coded data from the coding unit 705 is written in the buffers 709, 710 controlled by the memory controller 708. At the same time, the coded data enters a counter 711, where the quantity of information (compression rate) is monitored.

Next, at step S54, the output X of the counter 711 enters the table selector 712, where it is compared with a predetermined information quantity G determined from the capacity of the frame memory 713. If the result of the comparison is that the output X is less than the predetermined information quantity G, the program proceeds to step S57, where the next quantization table is selected. The index i is updated at step S58, after which the program returns to step S52. In other words, this operation is such that the table selector 12 changes over the switch 707 in the manner 1→2→3 to obtain the maximum output X which will not exceed the predetermined quantity G.

If the result of the decision at step S54 is that the output X is equal to or greater than the predetermined information quantity G, the program proceeds to step S55, at which the coded data prevailing at this time is stored in the frame memory 713 from the buffer 709, 710. Next, at step S56, the index data of the quantization tables 706a–706c is recorded in the index memory 714 and operation is ended.

By repeating the foregoing operation block by block, all of the image data is stored in the frame memory 713 as compressed data. The information quantity of each block is less than the predetermined information quantity G, and one block of the memory capacity in frame memory 713 can be fixed.

Next, when the compressed data stored in the frame memory 713 is read out, an inverse quantization unit 725 of a decoder 715 the details of which are shown in FIG. 15 performs inverse quantization by referring to quantization tables 717a–717c the contents whereof are the same as the contents of the quantization tables 706a–706c. In other words, table selector 712 selects one of the quantization tables 717a–717c in accordance with the index data recorded in the index memory 714, and the inverse quantization unit 725 performs inverse quantization based upon the content of the selected quantization table. The image pixel data processed by an ordinary inverse scanning converter 718, inverse DCT circuit 719 and rasterization circuit 720 is outputted from the output terminal 25.

It is permissible to change the order of the quantization tables in such a manner that the generated information quantity decreases monotonously, which is the opposite of the operation described above.

In addition, the above-described variable-length coding is not limited to ADCT. For example, another coding method such as arithmetic coding may be used.

In accordance with the embodiment described above, a plurality of quantization tables are provided and output information from a coding unit is monitored, thereby making it possible to obtain the maximum output information without exceeding a designated information quantity.

Accordingly, the memory capacity within a block can be made constant, and an image editing function can be implemented in the form of an inexpensive system. In addition, a deterioration in picture quality due to compression can be minimized.

[Eighth Embodiment]

Figure 25A:
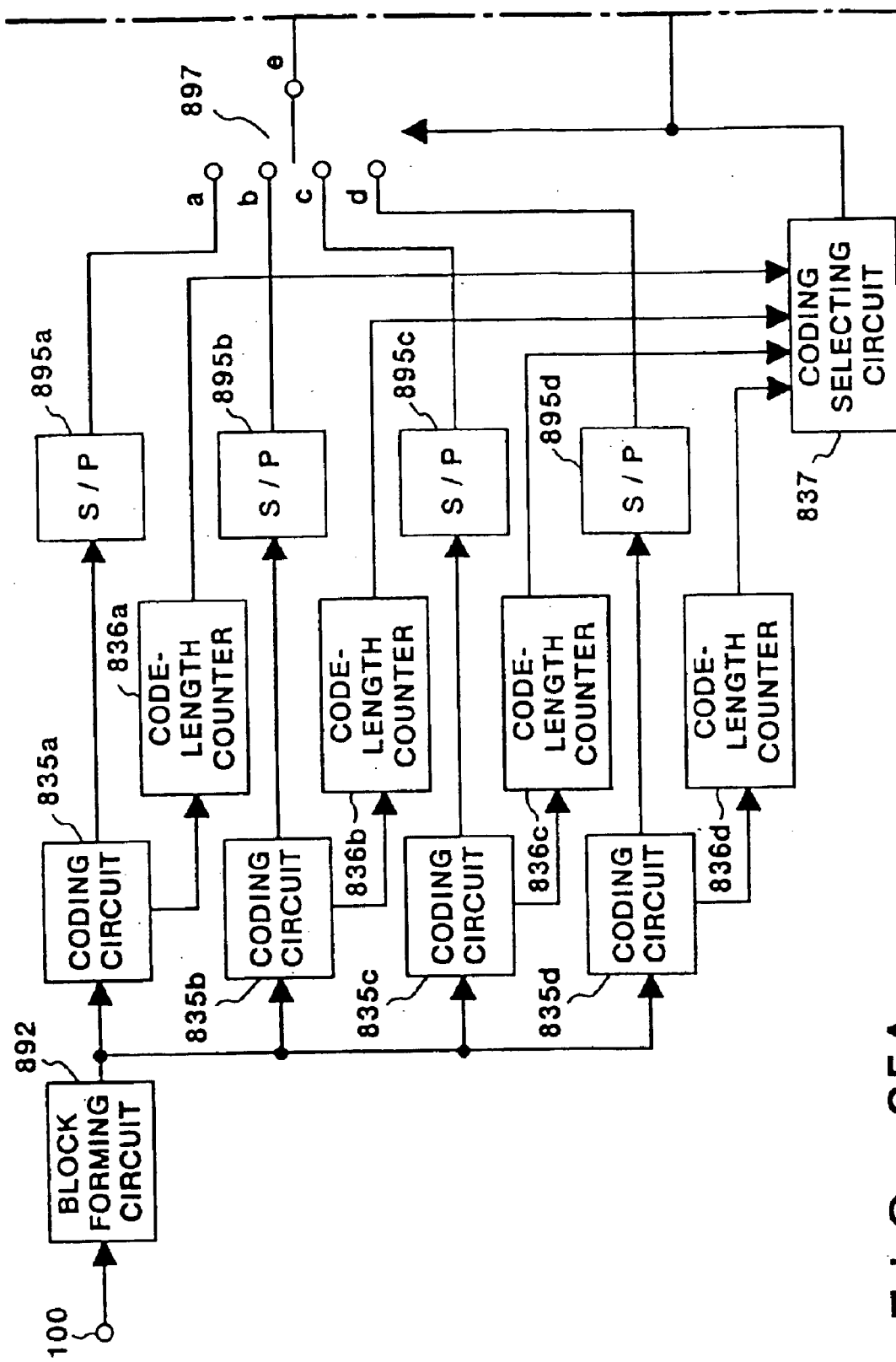
FIGS. 25A and 25B are block diagrams illustrating the construction of the image memory unit in accordance with a block mapping method.
Figure 25B:
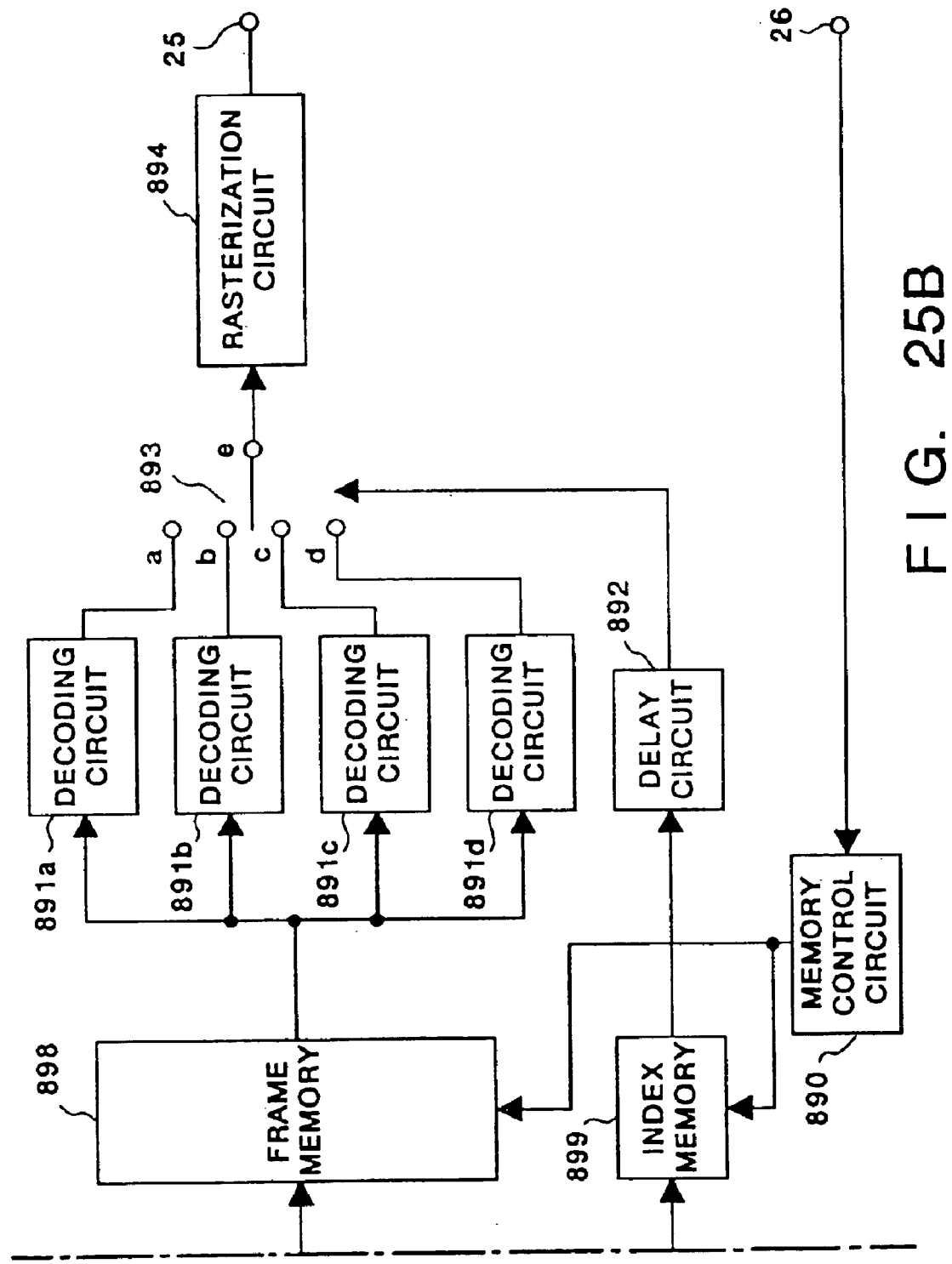

In this embodiment, a method (hereinafter referred to as a "block mapping method") is proposed in which the information quantity within one block constituted by a plurality of pixels as shown in FIG. 25 is made less than the predetermined value G, decoding is capable of being performed in block units and accessing of the frame memory is carried out in G units. The block mapping method will first be described with reference to FIG. 25.

As shown in FIG. 25, image pixel data which has entered from the input terminal 100 is cut into DCT blocks (e.g., of 8×8 pixels each) by a block forming circuit 892, and the resulting data is supplied to coding circuits 835a–835d. The block forming circuit 892 is constituted by line memories for applying a delay equivalent to several lines (eight lines in this embodiment). The coding circuits 835a–835d are coding circuits which include variable-length coding set in such a manner that the information quantities differ from one another. The coded words are supplied to serial/parallel converters (hereinafter referred to as "S/P"s) 895a–895d, and the code lengths are supplied to code-length counters 836a–836d. The code-length counters 836a–836d are for obtaining the code lengths (the sum totals of the numbers of bits of the respective coded words) of the present block in the respective coding circuits. Each counter is reset at the beginning of the block, after which the code lengths supplied by the coding circuits 835a–835d are accumulated for one block. The results are supplied to a coding selecting circuit 837. The S/Ps 895a–895d accumulate G bits (where G is the maximum information quantity of one block) of the serial data inputted from each coding circuit, and the outputs of the S/Ps 895a–895d are delivered to the terminals of a signal changeover switch 897 at a predetermined timing.

The coding selecting circuit 837 compares the code lengths of the present block in the coding circuits supplied by the code-length counters 836a–836d with the predetermined value G, determines which coding circuit provides a value closest to G without exceeding G and supplies the result of the determination, namely the index of the selected coding circuit, to the signal changeover switch 897 and an index memory 899. The signal changeover switch 897 connects, to a common terminal e, the terminal connected to the S/P storing the data from the coding circuit corresponding to the index, thereby writing the data of the present block at the corresponding address of a frame memory 898. At the same time, the index of the selected coding circuit is written in the index memory 899 at a portion corresponding to the address of the frame memory 898.

By repeating the forgoing operation, one frame (page) of data is accumulated in the frame buffer 898.

Then, when a synchronizing signal enters the input terminal 26 from an external apparatus (e.g., a printer engine), not shown, the coded block data is sequentially read out, in G-bit units and in synchronization with the synchronizing signal, from the leading address of the frame memory by a memory control circuit 890. At the same time, the index of the corresponding block is read out of the index memory 899, and a delay circuit 892 applies a delay equivalent to a time period needed for decoding. The index signal delayed by the delay circuit 892 is then applied to the control terminal of a signal changeover switch 893. Decoding circuits 891a–891d correspond to the coding circuits 835a–835d, respectively, decode the data read out of the frame memory 898 and output the decoded data to respective terminals a–d of the signal changeover switch 893. Accordingly, a common terminal e of the switch 893 outputs the decoded data from the decoding circuit corresponding to the index, and the decoded data is delivered to a rasterization circuit 894. The latter makes a conversion from block scanning to raster scanning to obtain expanded image pixel data. This data is delivered from the output terminal 25.

With the method described above, however, a code-length counter is necessary for each coding circuit. In addition, the coding selecting circuit 837 compares the code-length count of each coding circuit with the predetermined value S and retrieves a value closest to S without exceeding S. Consequently, when the number of coding circuits increases, the number of comparators for making the aforementioned determination increases exponentially. The result is not only a complicated hardware configuration but also a prolonged period of time necessary for making the determination.

Accordingly, the present embodiment, described below, has been designed in order to realize an image processing apparatus capable of performing the above-mentioned coding-circuit selection through simple circuitry and without complicated hardware even when the number of coding circuits is increased.

Figure 17A:
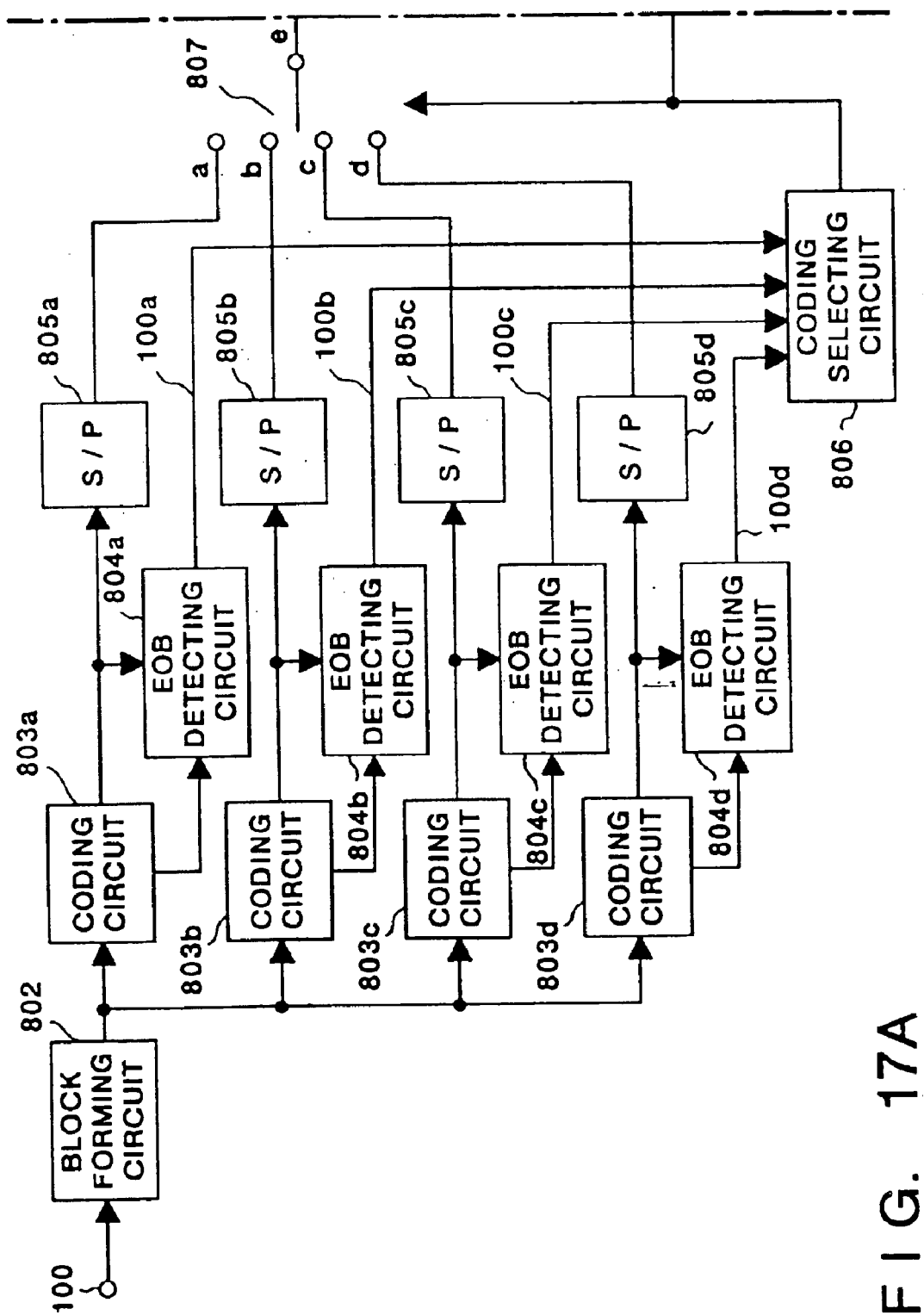
FIGS. 17A and 17B are block diagrams illustrating the construction of the image memory unit in accordance with an eighth embodiment of the present invention.
Figure 17B:
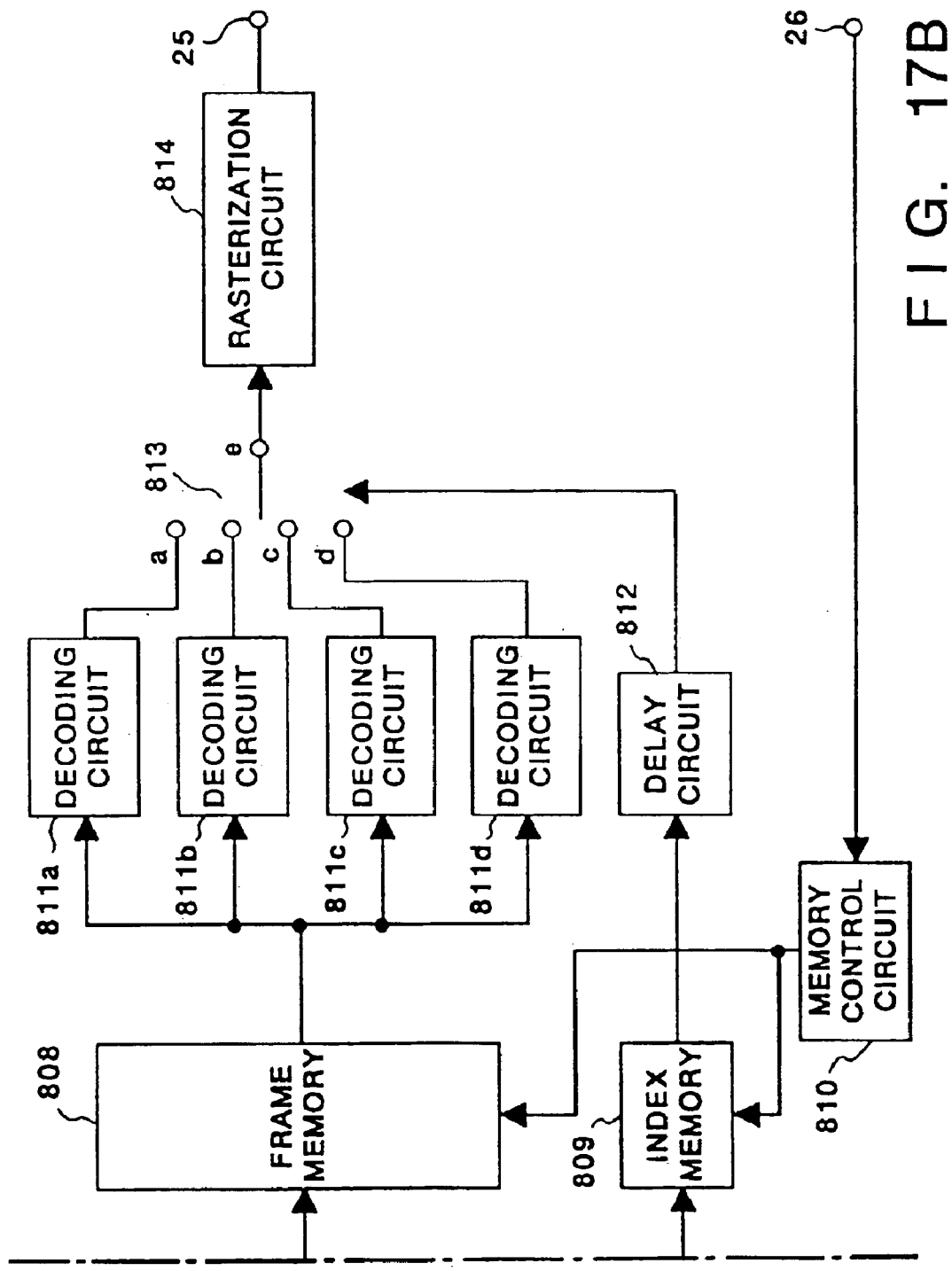

FIG. 17 is a block diagram illustrating an example of the construction of an image processing apparatus according to this embodiment.

As shown in FIG. 17, image pixel data enters from an input terminal 100. The image pixel data is cut into DCT blocks (e.g., of 8×8 pixels each), subjected to an orthogonal transformation such as DCT, by a block forming circuit 802, and the resulting data is supplied to coding circuits 803a–803d. The coding circuits 803a–803d are coding circuits set in such a manner that the information quantities differ from one another.

Figure 18:
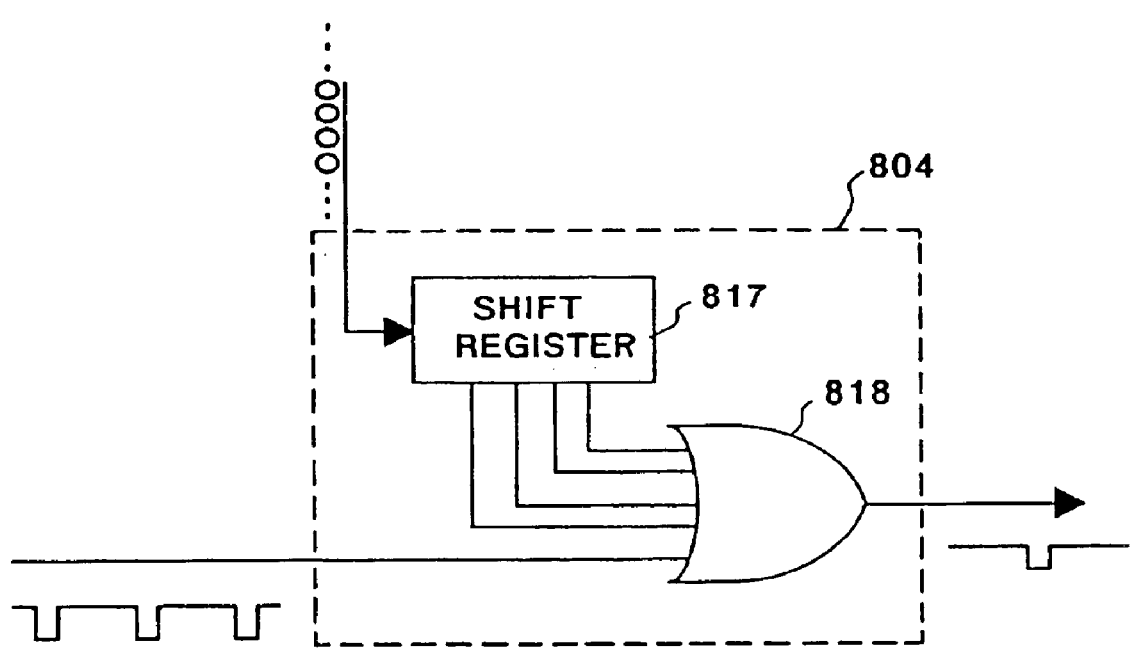
FIG. 18 is a circuit diagram illustrating an example of the construction of EOB detecting circuits of the eighth embodiment.

The coded words are supplied to S/Ps 805a–805d continuously at a constant rate, and masking signals for preventing erroneous detection are supplied to respective EOB (end-of-block) detecting circuits 804a–804d. The EOB detecting circuits 804a–804d, which are for detecting the EOB signals outputted by the decoding circuits 803a–803d, are as constructed as shown in FIG. 18, described below. Other components in FIG. 17 are substantially the same as those shown in FIG. 25 and need not be described again.

FIG. 18 is a circuit diagram which illustrates an example of the construction of the EOB detecting circuits 804a–804d of this embodiment. The EOB detecting circuit 804 of FIG. 18 is one example of the EOB detecting circuits 804a–804d, all of which have the same construction. In this embodiment, the EOB code is "LLLL".

Four bits at the beginning of the coded word outputted by the coding circuit enters a shift register 817, each of whose output bits is supplied to an OR gate 818. This makes it possible to detect the EOB code. However, depending upon the state of the shift register, there are cases where the content of the register happens to become "LLLL" while the coded word is being stored in the register. Accordingly, in this embodiment, a signal which masks a signal that becomes "LLLL" at a bit other than the fourth bit of the coded word is inputted to the OR gate 818, thereby preventing the above-described erroneous detection. Though the above-mentioned masking signal is supplied by each of the coding circuits 803a–803d according to this embodiment, this does not impose a limitation. For example, it is permissible to adopt an arrangement in which a signal resulting from taking the OR of each bit of the shift register 817 is latched immediately after the first four bits are stored in the shift register 817.

The detected EOB signals are supplied to a coding selecting circuit 806.

Figure 19:
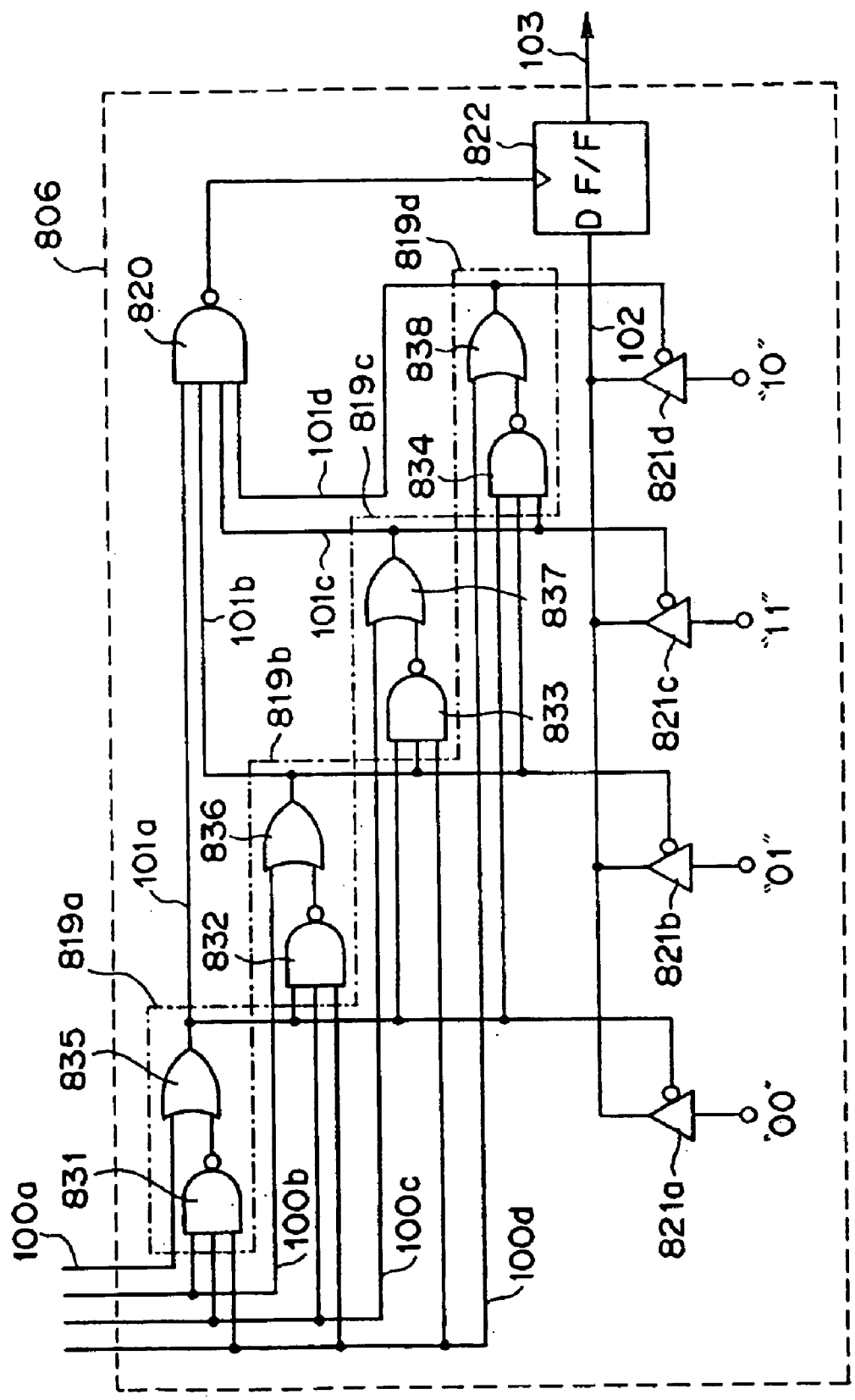
FIG. 19 is a circuit diagram illustrating an example of the construction of a coding selecting circuit of the eighth embodiment.

FIG. 19 is a circuit diagram showing an example of the construction of the coding selecting circuit 806 according to this embodiment.

EOB signals 100a–100d detected by the EOB detecting circuits 803a–803d are supplied to logic circuits 819a–819d, respectively. The logic circuits 819a–819d are for preventing collision of signals when EOB signals overlap. As shown in FIG. 19, the logic circuits 819a–819d comprise, in combination, three-input NAND gates 831–834 and OR gates 835–838, respectively. The order of priority at the time of collision is set as follows, in descending order: output signal 101a→output signal 101b→output signal 101c→output signal 101d.

The results of the operations performed by the logic circuits 819a–819d are supplied to a four-input NAND gate 820, respective index signal circuits 821a–821d and a logic circuit having a higher order of priority. The NAND gate 820 is a circuit for generating the clock of a D-type flip-flop (hereinafter referred to as a "DF/F") 822. More specifically, when, depending upon the logic circuits 819a–819d, a corresponding index signal gate opens, an index corresponding to the coding circuit which has outputted the EOB signal is outputted on a signal line 102, and the index is stored in the DF/F22 by the NAND gate 820. This operation is carried out whenever the EOB signal is detected. Therefore, what is obtained from the output of the DF/F 822 after a certain predetermined time is the index of the coding circuit for which the EOB signal was detected last within the above-mentioned predetermined time.

Figure 20:
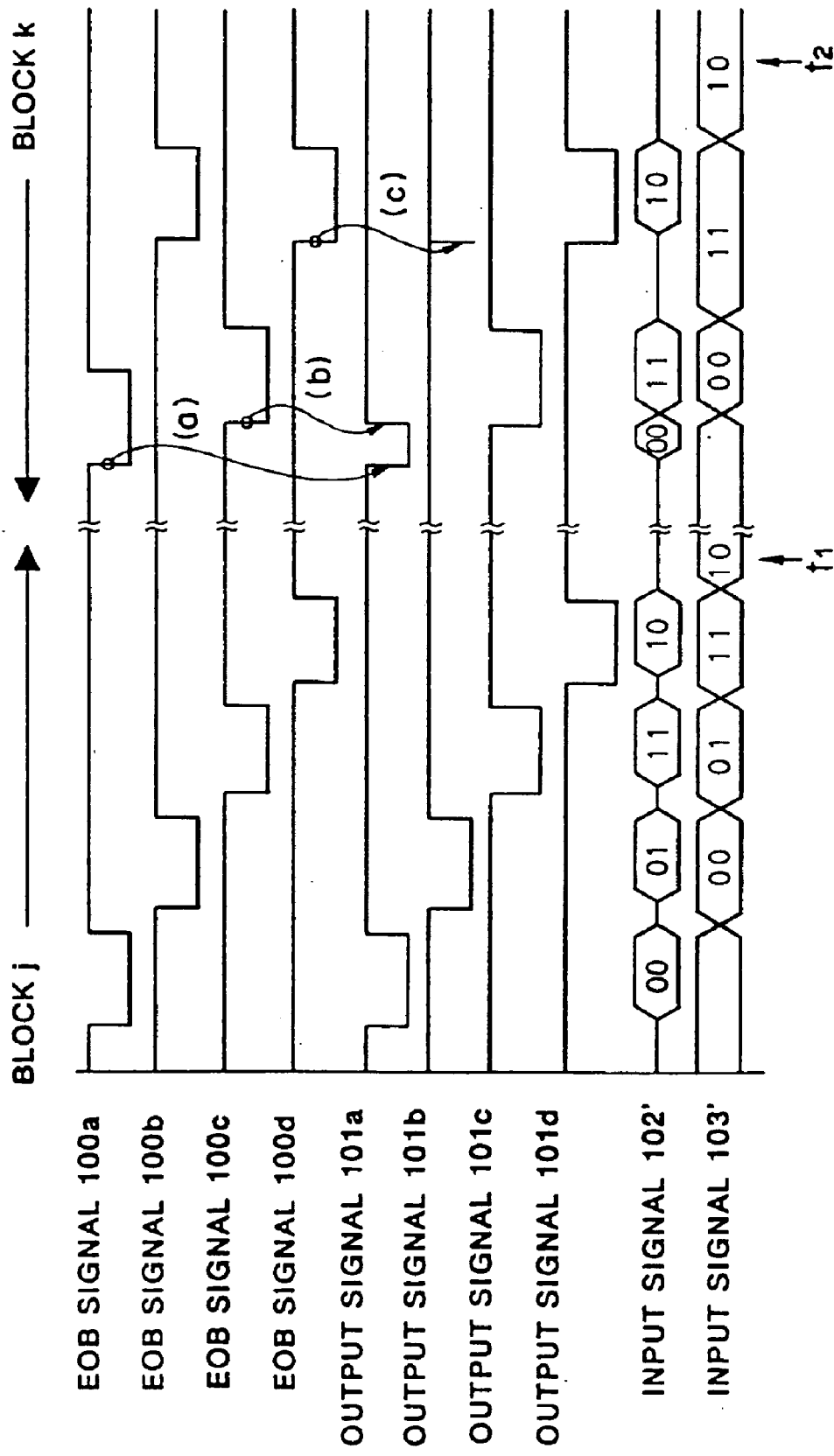
FIG. 20 is a timing chart associated with the coding selecting circuit of the eighth embodiment.

FIG. 20 is a timing chart associated with the coding selecting circuit 806 of the eighth embodiment. In FIG. 20, numerals 100a–100d represent the outputted results, namely the EOB signals, of the respective EOB detecting circuits 804a–804d, numerals 101a–101d represent the outputted results, namely the output signals, of the respective logic circuits 819a–819d, and numerals 102' 103' denote the input signal and output signal of input/output signal lines 102, 103 of the DF/F 822.

In the first half of the chart (the half corresponding to block j in FIG. 20), the EOB signals 100a–100d do not overlap. Consequently, the output of the DF/F 822 is as indicated by output signal 103' in FIG. 20. It will be understood that if latching is performed at a predetermined time $t_1$, the index of the coding circuit for which the EOB signal was detected last will be obtained.

In the second half of the chart (the half corresponding to block k in FIG. 20), overlapping occurs at two locations. In other words, EOB signals 100a, 100c overlaps, and so do EOB signals 100b, 110d.

As shown at (a) in FIG. 20, output signal 110a of logic circuit 819a assumes the "L" level at the trailing edge of the EOB signal 100a. Then, when EOB signal 100c decays, the output of the NAND gate 831 of logic circuit 819a attains the "H" level. As shown at (b) in FIG. 20, the output signal 101a of OR gate 835 is reset and, at the same time, the output signal 101c of logic circuit 819c assumes the "L" level, so that the index "11" is supplied from gate circuit 821c to DF/F 822.

Next, the output signal 101*b* of logic circuit 819*b* temporarily decays in response to the EOB signal 100*b*. However, since the EOB signal 100*d* also decays at the same time, the output signal 101*b* is reset to the "H" level instantaneously (c) by the NAND gate 832 of logic circuit 819*b*.

Accordingly, if the output signal 103' of the DF/F 822 is latched at a predetermined time t2, as shown in FIG. 20, the index of the coding circuit for which the EOB signal was detected last is obtained. In this example, the output signal 101*d* has a higher order of priority than the output signal 101*b*, and therefore the selected index is "10". The selected index is supplied to the index memory 809 and signal changeover switch 807.

Meanwhile, the S/Ps 805*a*–805*d* (FIG. 17) accumulate S bits of the serial data inputted from the coding circuits 803*a*–803*d* (where S is the maximum information quantity of one block) and output the data to the terminals a–d of the signal changeover switch 807 at a predetermined timing. The signal changeover switch 807 connects, to the common terminal e, the terminal connected to the S/P corresponding to the selected index, whereby the data is written in the corresponding address of the frame memory 808. The index memory 809 writes the selected index in the portion corresponding to the write address of frame memory 808.

The components from frame memory 808 onward are the same as in FIG. 25 and need not be described again.

In accordance with the foregoing description, the arrangement of the present embodiment is such that when coded data is outputted at a fixed rate, use is made of the fact that the quantity of information is proportional to the time required for output. Specifically, the information quantity is detected, as the coding circuit is selected, based upon the time from the data at the beginning of the block until the EOB signal is outputted. As a result, a counter and comparator need not be provided, and selection of coding can be realized through simple circuitry even if the number of coding circuits is increased.

[Ninth Embodiment]

Figure 21:
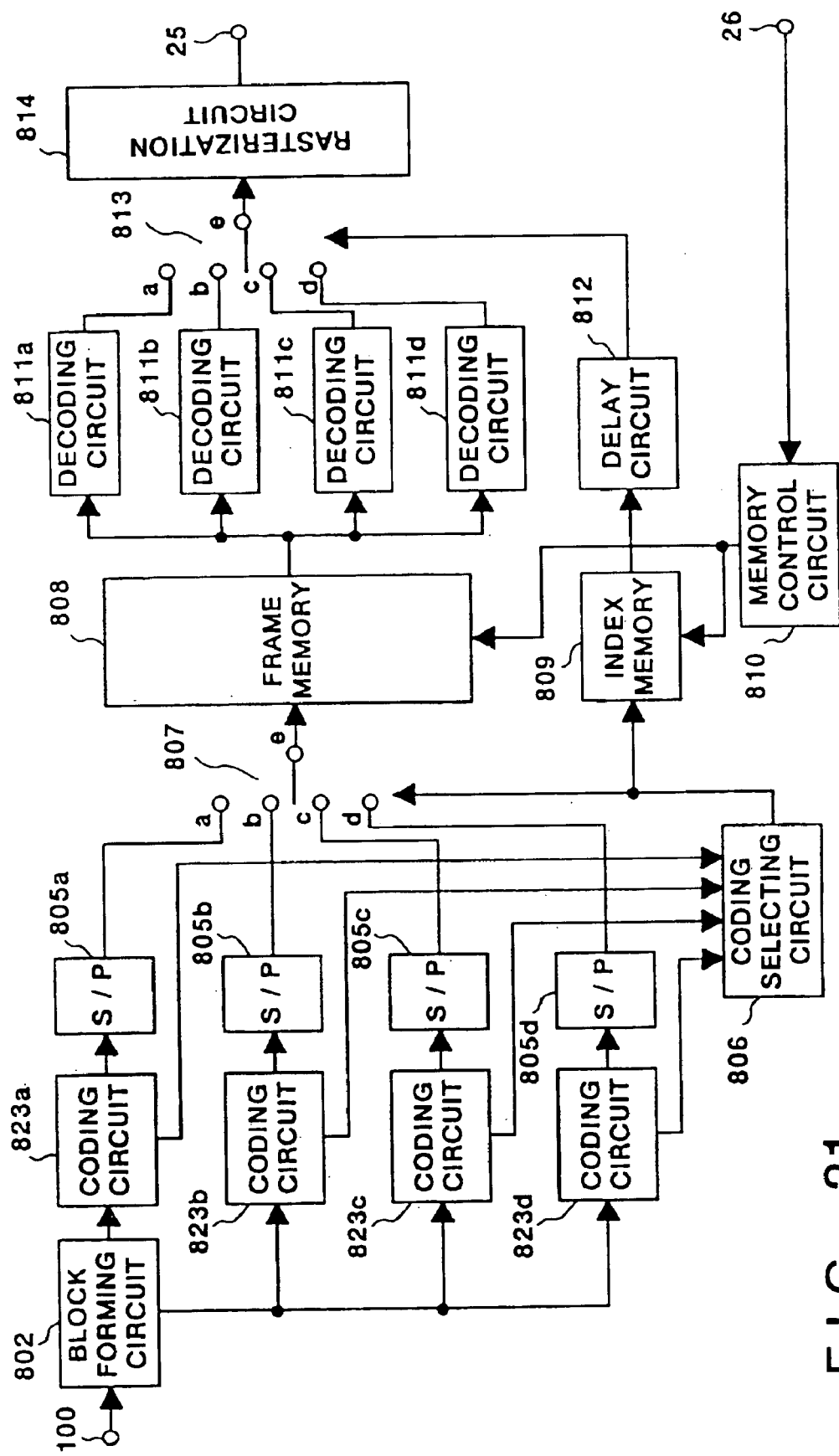
FIG. 21 is a block diagram illustrating the construction of the image memory unit in accordance with a ninth embodiment of the present invention.

FIG. 21 is a block diagram showing the construction of the image memory unit 11 of in accordance with a ninth embodiment of the invention. Blocks in FIG. 21 having functions identical with those of the eighth embodiment shown in FIG. 17 are designated by like reference characters and need not be described again. Only portions that differ from the eighth embodiment shown in FIG. 17 will be described.

Coding circuit 823*a*–823*d* are set so as to have information quantities that differ from one another. The coded words are supplied to S/Ps 805*a*–805*d*, and the EOB signals are applied to the coding selecting circuit 806. The EOB signals are signals which indicate the positions at which EOB codes have been entered. For example, an EOB signal is a signal which assumes the "L" level when the EOB code is outputted. The coding selecting circuit 806 is a circuit of the kind shown in FIG. 19. This arrangement results in a further simplification in hardware.

[Tenth Embodiment]

Figure 22A:
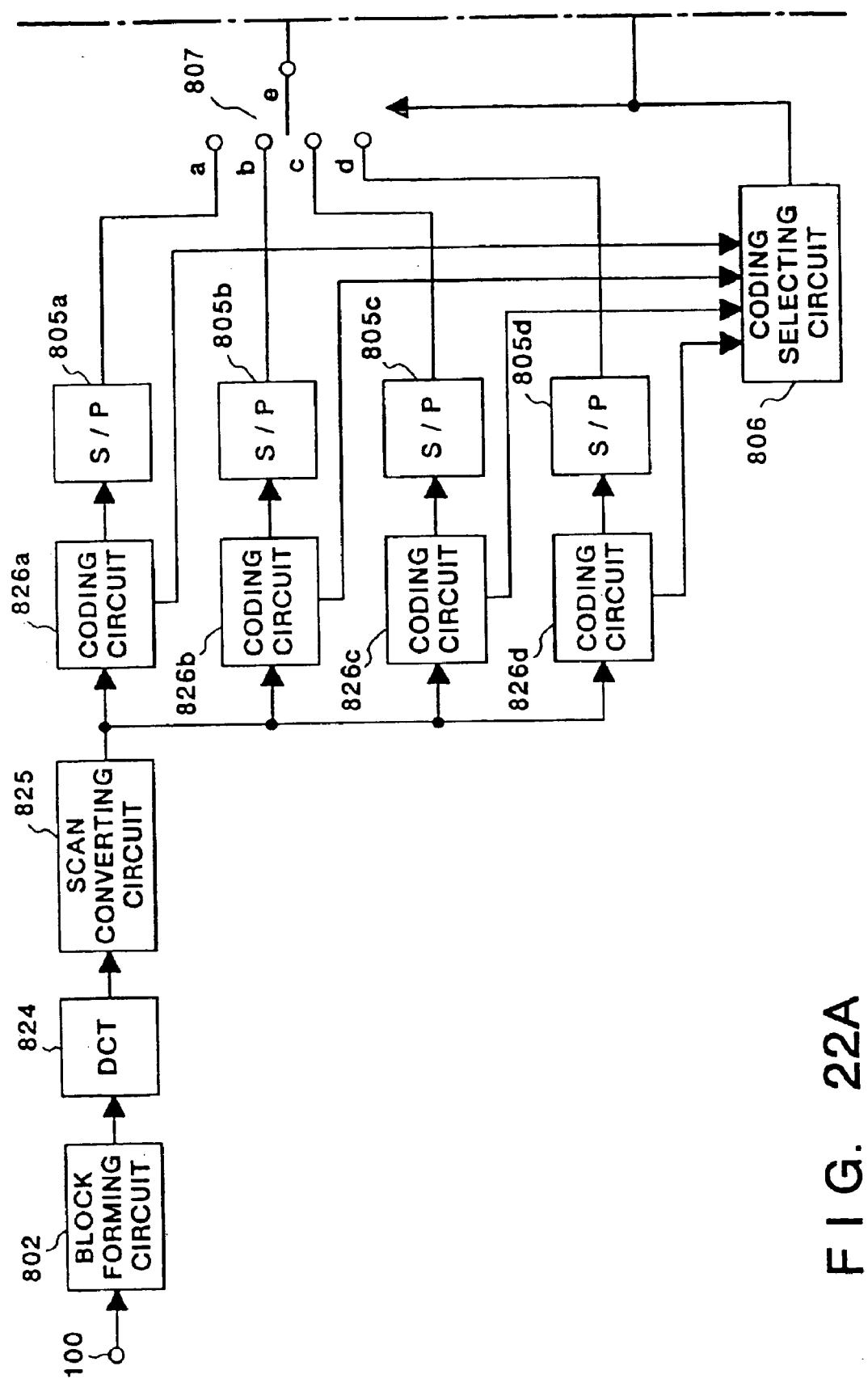
FIGS. 22A and 22B are block diagrams illustrating the construction of the image memory unit in accordance with a tenth embodiment of the present invention.
Figure 22B:
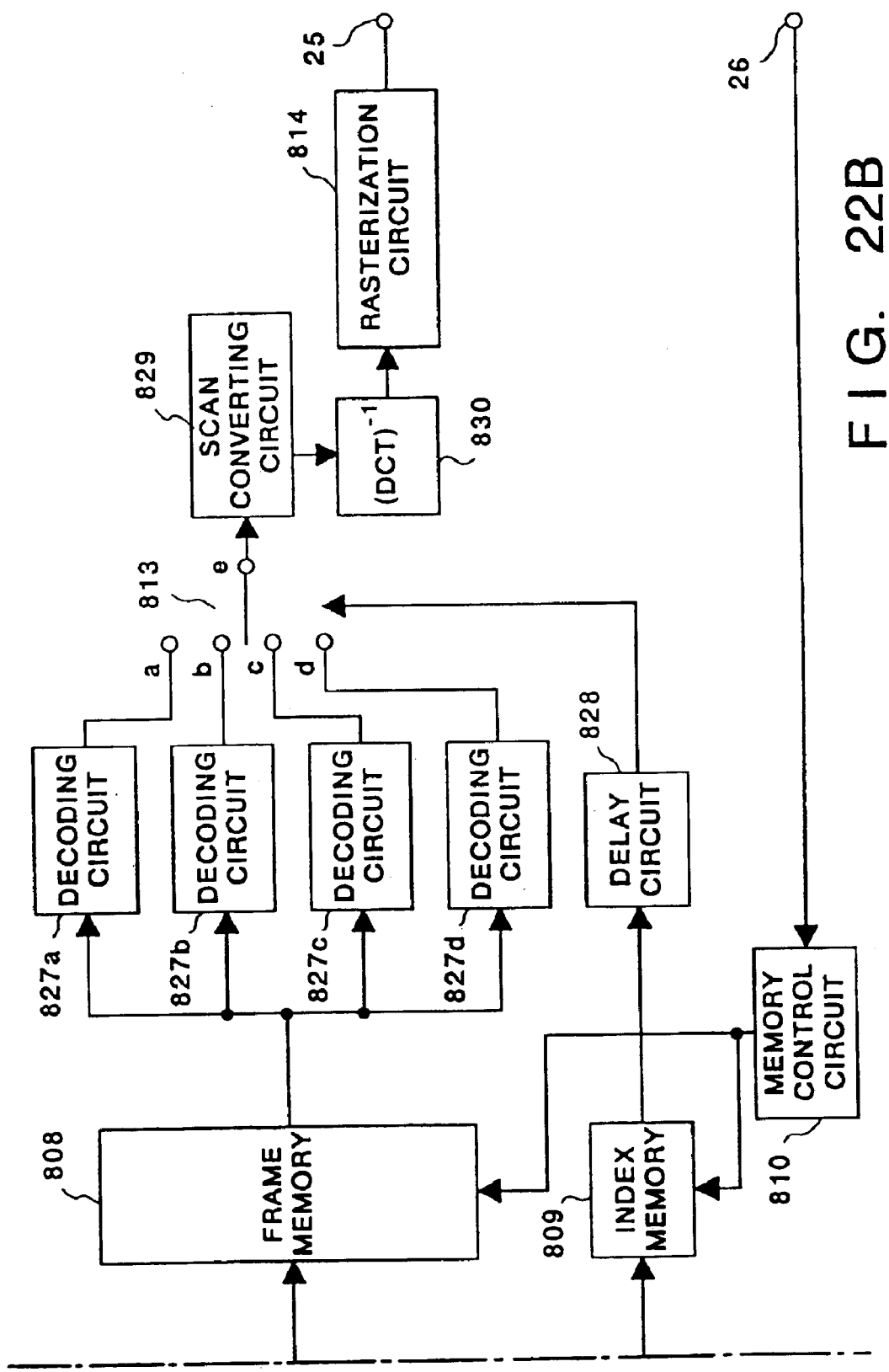

FIG. 22 is a block diagram showing the construction of the image memory unit 11 of in accordance with a tenth embodiment of the invention. Blocks in FIG. 22 having functions identical with those of the ninth embodiment shown in FIG. 21 are designated by like reference characters and need not be described again.

In this embodiment, portions not related to control of information quantity, such as the orthogonal transformation circuit, etc., are shared by the coding circuits, thereby making it possible to reduce hardware. Only portions that differ from the ninth embodiment shown in FIG. 21 will be described.

In a case where coding in which DCT and VLC are combined is applied to the present invention, as in the baseline method of the JEPG, the DCT circuit and the scan converting circuit which performs zigzag scanning are not related to control of information quantity and are shared by the coding circuits. Accordingly, in this embodiment, the DCT circuit 24 and the scan converting circuit 25 are placed outside the coding circuitry and are shared by the coding circuits, thereby simplifying the hardware.

The image pixel data placed in block form by the block forming circuit 802 is subjected to a discrete cosine transformation by a DCT circuit 824. The transformation coefficients of DCT are zigzag-scanned in order from coefficients of lower order by a scan converting circuit 825, and the output of the scan converting circuit 825 is supplied to coding circuits 826*a*–826*d*.

Figure 23:
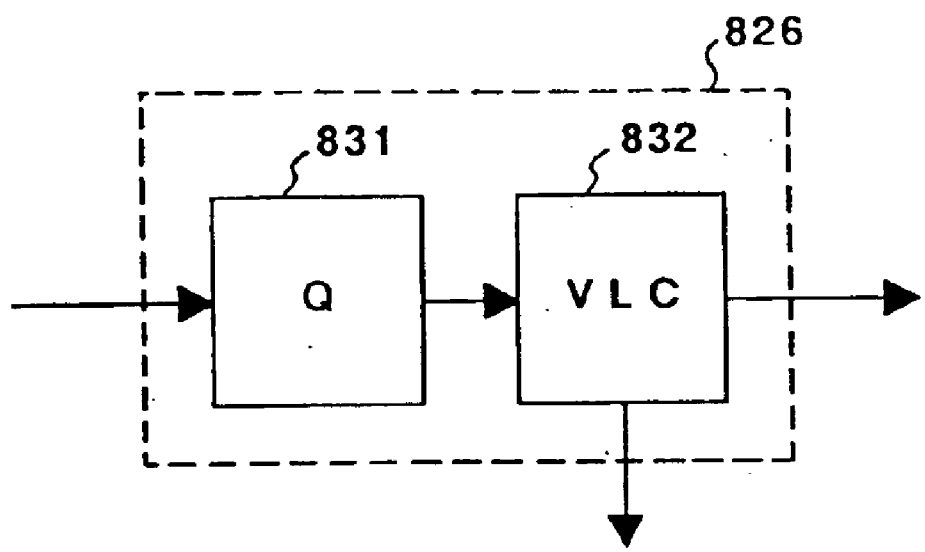
FIG. 23 is a block diagram illustrating the construction of coding circuits according to the tenth embodiment.

FIG. 23 is a block diagram which illustrates the construction of the coding circuits 826*a*–826*d* of the tenth embodiment. In a coding circuit 826, which illustrates one example of the coding circuits 826*a*–826*d*, the zigzag-scanned transformation coefficients are quantized by a quantization unit 831 and then supplied to a VLC circuit 832. The VLC circuit 832 codes the quantized transformation coefficients by well-known variable-length coding such as Huffman coding, delivers a coded word to a corresponding one of the S/Ps 805*a* –805*d*, and supplies an EOB signal to the coding selecting circuit 806. The EOB signal indicates the position at which an EOB code has been inserted, as mentioned above. The EOB signal assumes the "L" level when the EOB code is outputted, and attains the "H" level at all other times.

The coding selecting circuit 806, which is a circuit similar to that shown in FIG. 19, supplies the index memory 809 and signal changeover switch 807 with an index illustrating the selected coding circuit. The selected coded data and the index are written in the frame memory 808 and in the corresponding address of the index memory 809.

By repeating the forgoing operation, one frame (page) of data is accumulated in the frame memory 808. Then, when a synchronizing signal enters the input terminal 26 from an external apparatus (e.g., a printer engine), not shown, the coded data is sequentially read out, in S-bit units and in synchronization with the synchronizing signal, from the leading address of the frame memory by memory control circuit 810. At the same time, the index of the corresponding block is read out of the index memory 809.

Decoding circuits 827*a*–827*d* correspond to the coding circuit 826*a*–826*d*, respectively. These are constructed as shown in FIG. 24.

Figure 24:
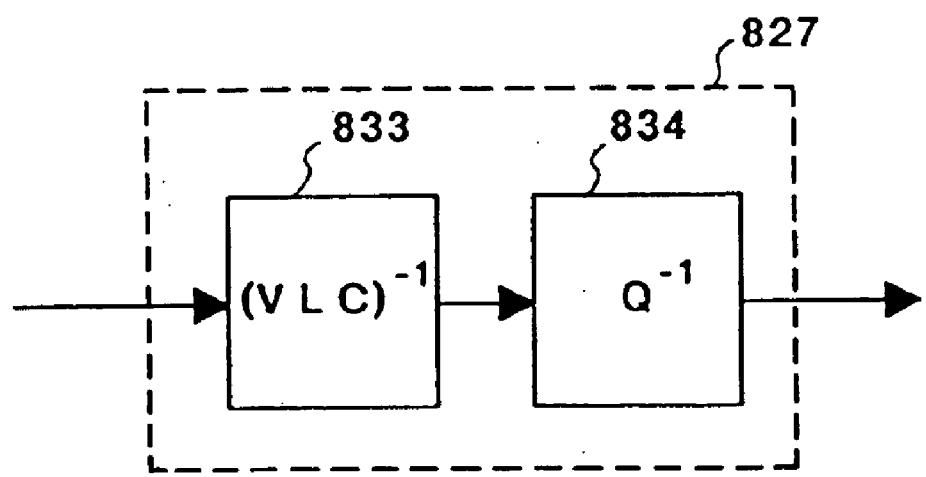
FIG. 24 is a block diagram illustrating the construction of decoding circuits according to the tenth embodiment.

FIG. 24 is a block diagram showing the construction of the decoding circuits 827*a*–827*d* of the tenth embodiment. A decoding circuit 827, which illustrates one example of the decoding circuits 827*a*–827*d*, receives the read coded data, and a variable-length decoding circuit 833 obtains a quantized code of the DCT transformation coefficients. An inverse quantization unit 834 effects a transformation into a quantized representative. The outputs of the decoding circuits 827*a*–827*d* are supplied to the terminals a–d of the signal changeover switch 813.

Meanwhile, the index read out of the index memory 809 is delayed by a delay circuit 828 for a period of time necessary for decoding, and then is supplied to the output terminal of the signal changeover circuit 828. Accordingly, the common terminal e of the switch 813 outputs a quantized representative of the DCT transformation coefficient from the decoding circuit corresponding to the index, and a scan converting circuit 829 effects a scan conversion from zigzag scanning to an order suited to an inverse DCT circuit 830. A rasterization circuit 814 effects a conversion from scanning in block units to the original raster scanning, whereby expanded image pixel data is obtained from the output terminal 25.

In the eighth to tenth embodiments described above, the index outputted by the coding selecting circuit is written in the index memory. However, if the accessing of the index memory is fast enough, an arrangement may be adopted in which each coding circuit applies an override to the same address of the index memory in the order in which the EOB signals are outputted. In other words, a corresponding index is written in the same address of the index memory in the order in which the EOB signals are outputted. Therefore, if the data at the corresponding address of the index memory is read out after a predetermined period of time, the index of the coding circuit for which the EOB signal was outputted last will be obtained within a predetermined period of time. Accordingly, if the coded data is written in the frame memory by the index, or if the coded data is overridden to the frame memory in the order in which the EOB signal is outputted, in the same manner as the index memory, then effects exactly the same as those of the foregoing embodiment can be obtained in the frame memory.

The coding method is not limited to ADCT. It is permissible to adopt another coding method, such as variable-length coding every block.

The eighth and ninth embodiments can be implemented by computer software as well as by a hardware configuration using the various gate circuits.

[11th Embodiment]

Figure 26A:
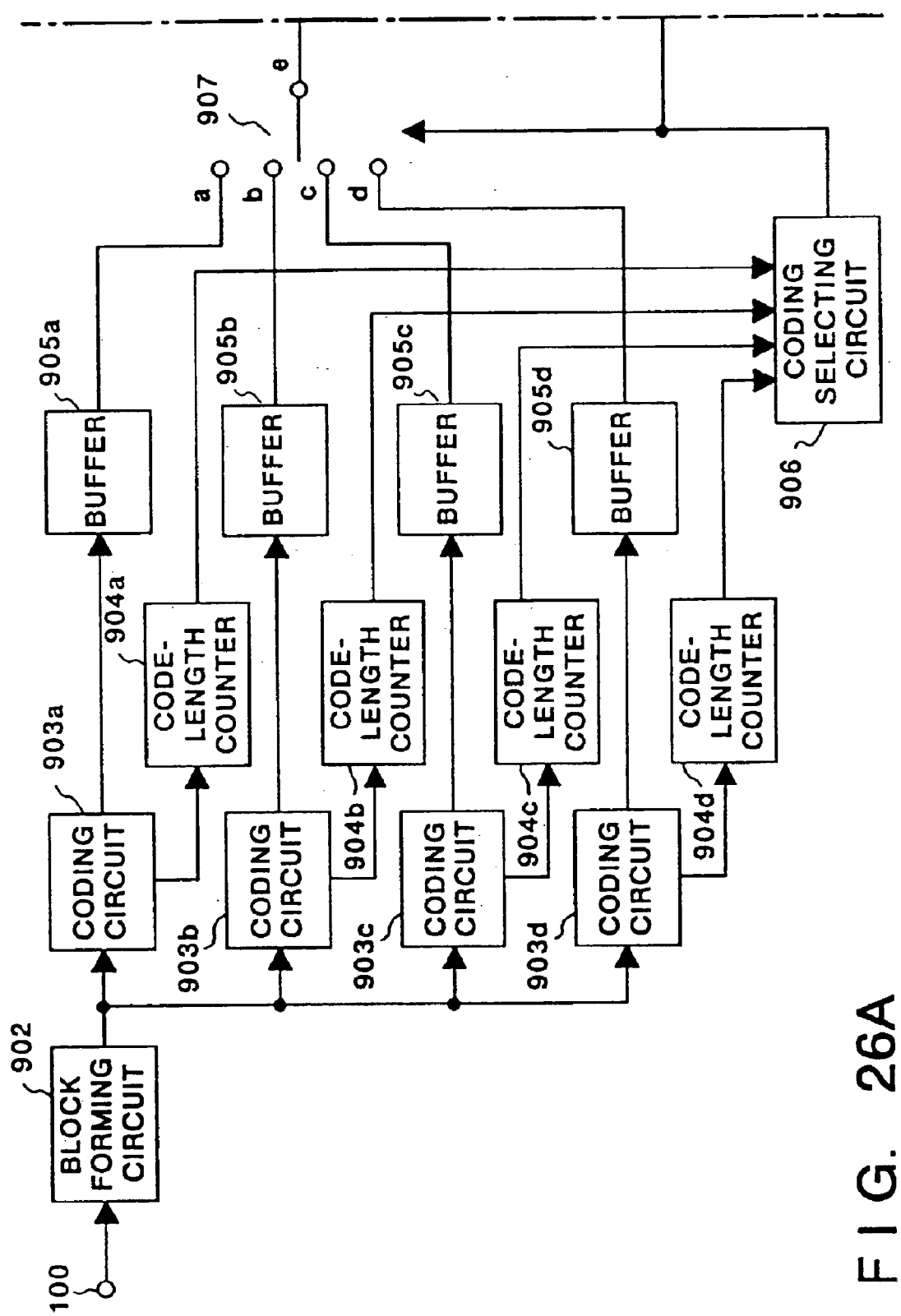

FIG. 26 is a block diagram showing the detailed construction of the image memory unit 11 according to an 11th embodiment of the invention.

In FIG. 26, image pixel data processed according to this embodiment enters from an input terminal 100. Described first will be coding processing of the image pixel data which enters from the input terminal 100, and processing for storing data in a frame memory 908.

The image pixel data which has entered from the input terminal 100 is partitioned into blocks of, say, 8×8 pixels each by a block forming circuit 902 composed of line memories for applying a delay of several lines. The resulting data is supplied to a plurality of coding circuits 903a–903d.

The coding circuits 903a–903d are coding circuits which include variable-length coding set in such a manner that the information quantities differ from one another. The coded words are supplied to buffers 905a–905d, and the code lengths are supplied to code-length counters 904a–904d.

The code-length counters 904a–904d are for obtaining the sum totals of the code lengths of the coded words in one block. Each counter is reset at the beginning of the block, after which the code lengths supplied by the coding circuits 903a–903d are accumulated for one block. The results are supplied to a coding selecting circuit 906. The buffers 905a–905d store one block of data.

The coding selecting circuit 906 compares the code lengths within one block in the coding circuits 903a–903d supplied by the code-length counters 904a–904d with a predetermined value (G), determines which coding circuit provides a value closest to (G) without exceeding (G) and supplies the result of the determination (the index) to the signal changeover switch 907 and an index memory 909.

The signal changeover switch 907 connects, to a common terminal e, the terminal (any one of a–d) connected to the buffer storing the coded word selected by the coding selecting circuit 906, thereby storing one block of data planted in the particular one of the buffers 905a–905d at the corresponding address of a frame memory 908. At this time index is stored in the index memory 909 at a portion corresponding to the address of the frame memory 908.

In this embodiment, the coding circuits are of four types, namely 903a–903d, and therefore the index is composed of two bits per block (in case of a fixed length).

By repeating the foregoing operation, one block of data is accumulated in the frame memory 908.

Control for decoding the coded data in this embodiment constructed as set forth above will now be described.

When a synchronizing signal such as an ITOP signal from an external unit, e.g., the output control unit 13 of FIG. 1, enters from the input terminal 26 to which the external unit is connected, a memory control circuit 910 controls the frame memory 908 in accordance with the synchronizing signal in such a manner that written data stored, coded and compressed as by the control described above is read out from the beginning of the frame memory 908 in G-bit units. At the same time, the memory control circuit 910 controls the index memory 909 in such a manner that the index corresponding to the block rad out of the frame memory 908 is read out of the index memory 909.

The compressed image data read out of the index memory 909 is decoded by decoding circuits 911a–911d corresponding to respective ones of the coding circuits 903a–903d, and the decoded data is supplied to terminals a–d of a signal changeover switch 913.

Meanwhile, the index read out of the index memory 909 is delayed by a delay circuit 912 for a period of time necessary for the decoding circuits 911a–911d to perform decoding, and the delayed index is supplied to the output terminal of the signal changeover circuit 913. Accordingly, a common terminal e of the switch 913 outputs 8×8 pixels of image pixel data expanded by one of the decoding circuits 911a–911d corresponding to whichever of the coding circuits 903a–903d has been selected by the coding selecting circuit 906. The image pixel data in block form is then subjected to a scan conversion by a rasterization circuit 914 to be converted into the original raster scanning data. This data is delivered from the output terminal 25.

In accordance with the present embodiment as described above, an operation between blocks in the coding circuits 903a–903d is eliminated, and it is possible to perform decoding in simple blocks.

At the same time, the plurality of coding circuits 903a–903d having different output information quantities are provided, whichever coding circuit gives a coded length in one block (namely the sum total of the code length in one block after variable-length coding) that is maximum without exceeding the predetermined value G is selected, and the data is stored in the frame memory 908 in units of the predetermined value S. As a result, addressing of overlaid blocks is facilitated and it is possible to combine images in the frame memory 908.

[12th Embodiment]

Figure 27B:
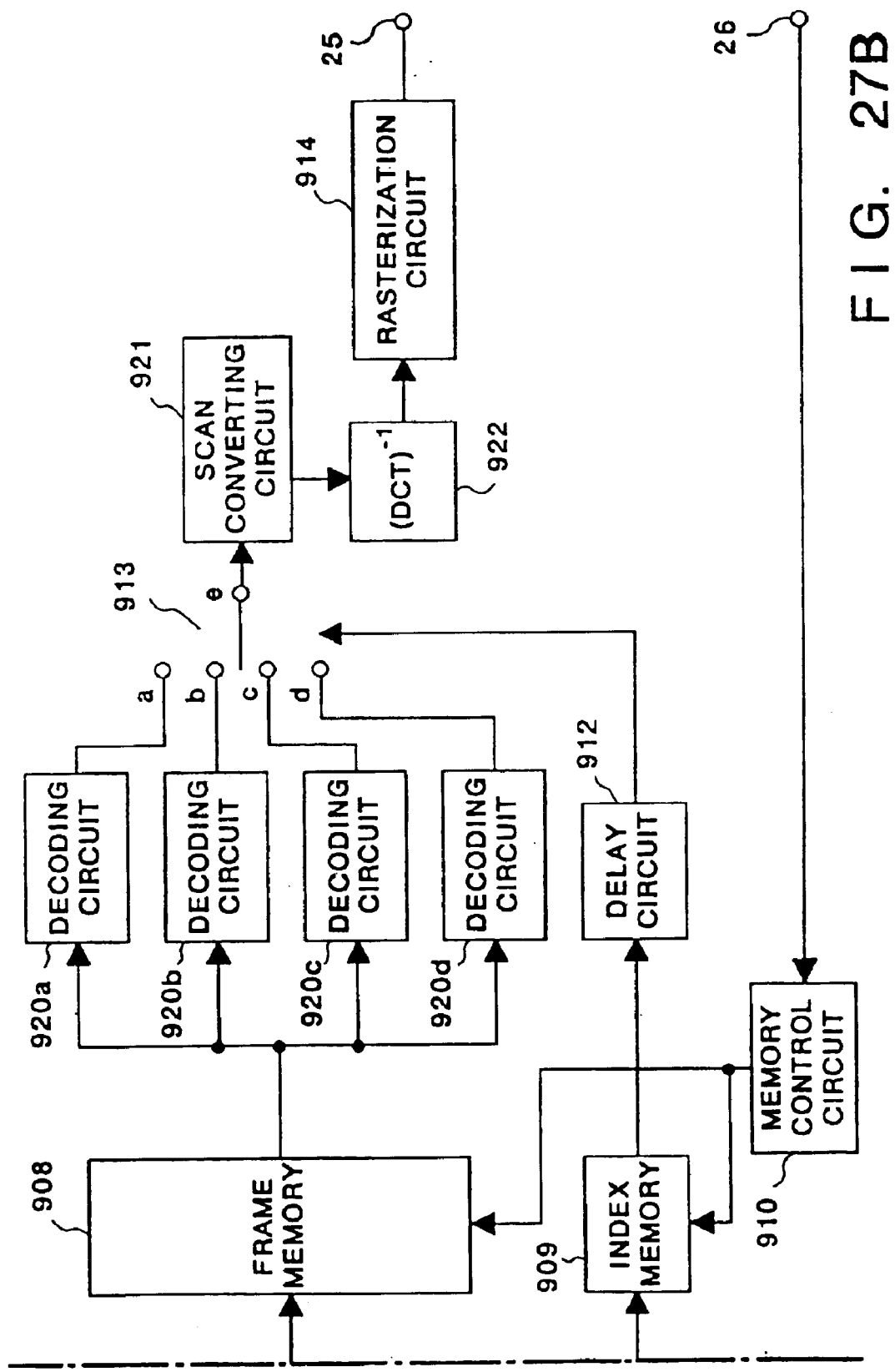

FIG. 27 is a block diagram illustrating the construction of the image memory unit 11 according to a 12th embodiment of the present invention. Blocks having functions identical with those in FIG. 26 are designated by like reference characters and need not be described in detail again.

In the 12th embodiment, portions not related to control of information quantity, such as the orthogonal transformation circuit, etc., are shared by the coding circuits, thereby making it possible to reduce hardware. Only portions that differ from the 11th embodiment shown in FIG. 26 will be described.

In a case where coding processing in which DCT processing and VLC processing are combined as shown in FIG. 34 is applied to the present embodiment, the DCT circuit and the scan converting circuit which performs zigzag scanning are not related to control of information quantity and are capable of being shared by the coding circuits. Therefore, in the embodiment of FIG. 27, a DCT circuit 917 and a scan converting circuit 918 are placed outside the coding circuitry and are shared by the coding circuits, thereby simplifying the hardware.

Figure 28:
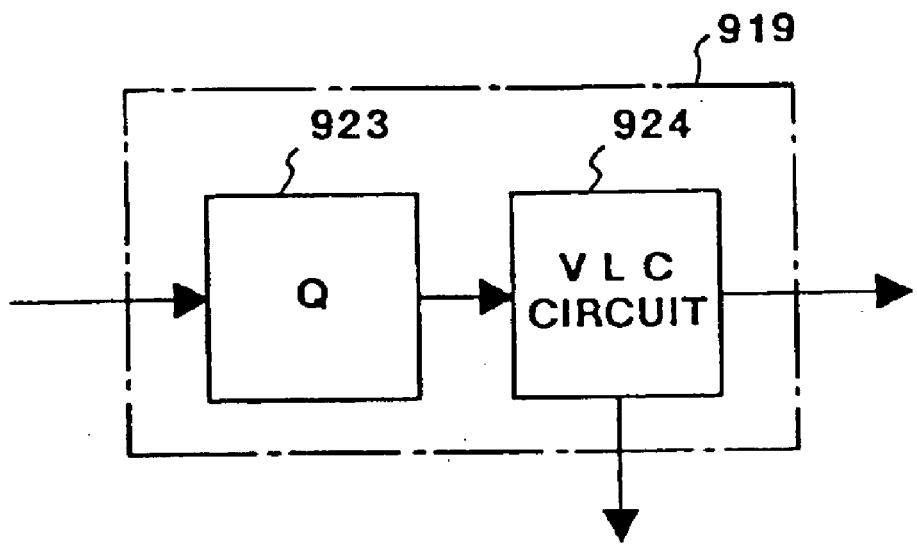
FIG. 28 is a block diagram illustrating the construction of a coding circuit according to the 12th embodiment.
Figure 29:
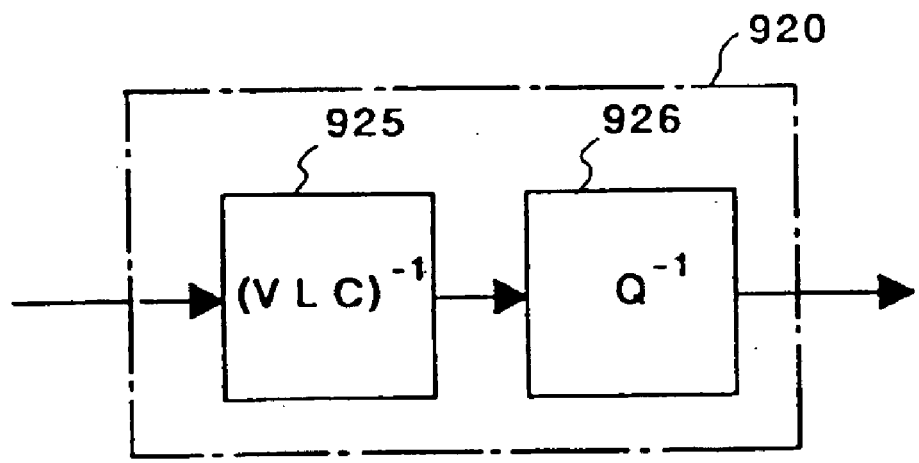
FIG. 29 is a block diagram illustrating the construction of a decoding circuit according to the 12th embodiment.

Accordingly, coding circuits 919a–919d and corresponding decoding circuit 920a–920d are constructed as shown in FIGS. 28 and 29, respectively.

FIG. 28 is a block diagram illustrating the detailed construction of the coding circuits 919a–919d according to the 12th embodiment.

As shown in FIG. 28, the transformation coefficients zigzag-scanned by the scan converting circuit 918 as shown in FIG. 34 are quantized by a quantization unit 923 and then supplied to a VLC circuit 924. The VLC circuit 924 variable-length codes (e.g., Huffman-codes) the quantized transformation coefficients and supplies a coded word to a corresponding one of the buffers 905a–905d. At the same time, the coded word is delivered to a corresponding one of the run-length counters 904a–904d.

FIG. 29 is a block diagram illustrating the detailed construction of the decoding circuits according to the 12th embodiment. The compressed image data of G bits read out of the frame memory 908 is decoded into a quantized transformation coefficient by the variable-length decoding circuit 925, the coefficient is converted into a quantized representative by an inverse quantization unit (representative setting circuit) 926, and the result is supplied to one of the terminals a–d of the signal changeover switch of FIG. 27.

The signal changeover switch 913 selects the transformation coefficient decoded by whichever of the decoding circuits 920a–920d corresponds to the respective one of the coding circuits 919a–919d selected at the time of coding, the zigzag-scanned transformation coefficient are converted into the original order by a scan converting circuit 921, and spatial image pixel data is obtained at a inverse DCT circuit 922. The data is restored to the original raster scanning data by the rasterization circuit 914, and the resulting data is delivered from the output terminal 25.

In accordance with the embodiment described above, the hardware configuration can be simplified over that of the 12th embodiment.

[13th Embodiment]

FIG. 30 is a block diagram illustrating the construction of the image memory unit 11 according to a 13th embodiment of the present invention. Blocks having functions identical with those of the 12th embodiment shown in FIG. 27 are designated by like reference characters and need not be described in detail again. Only portions that differ from those of the 12th embodiment in FIG. 27 will be described.

Transformation coefficients from the scan converting circuit 918 zigzag-scanned as shown in FIG. 34 are quantized by a quantization unit 927, the DC transformation coefficients are supplied to a multiplexing circuit 933, and the AC transformation coefficients are supplied to a hierarchical division circuit 928.

The hierarchical division circuit 928 divides the AC transformation coefficients into an n-layered hierarchy. The division into the n-layered hierarchy is performed by well-known means such as a spectrum (degree) or bit slice of the transformation coefficients. The transformation coefficients so divided are subjected to variable-length coding by variable-length coding (VLC) circuits 930-1 through 930-n, one block of data is accumulated by buffers 931-1 through 931-n, and the data is then supplied to the multiplexer 933 at a predetermined timing.

Variable-length counters 932-1 through 932-n, which are for obtaining the sum totals of the code lengths within one block of each layer, are reset at the beginning of the block, the code lengths supplied by the VLC circuits 930-1 through 930-n are accumulated for one block, and the result is supplied to a layer-count discriminating circuit 935.

The layer-count discriminating circuit 935 successively totals, from the most significant layer, the sum totals of the code lengths of the present block of each layer supplied by the code-length counters 932-1 through 932-n, and determines the number of layers before that at which the information quantity (the sum total of the code length) of the present block exceeds the predetermined value G.

More specifically, letting $f_0$ represent the number of quantized bits of the DC coefficients after quantization, and letting f(i) represent the sum total of the code lengths of the i-th layer, the maximum value of k ($0 \leq k \leq n$) which satisfies $$\sum_{i=1}^{k} f(i) = G - f_0 \qquad (2)$$

is found, and the result of the determination is supplied to the multiplexer 933.

In accordance with the result k of determination performed by the layer-count discriminating circuit 935, the codes of the DC coefficients and the codes of the AC coefficients of layers 1 through k are multiplexed, and the codes are written in the frame memory 908 in G-bit units.

Figure 31:
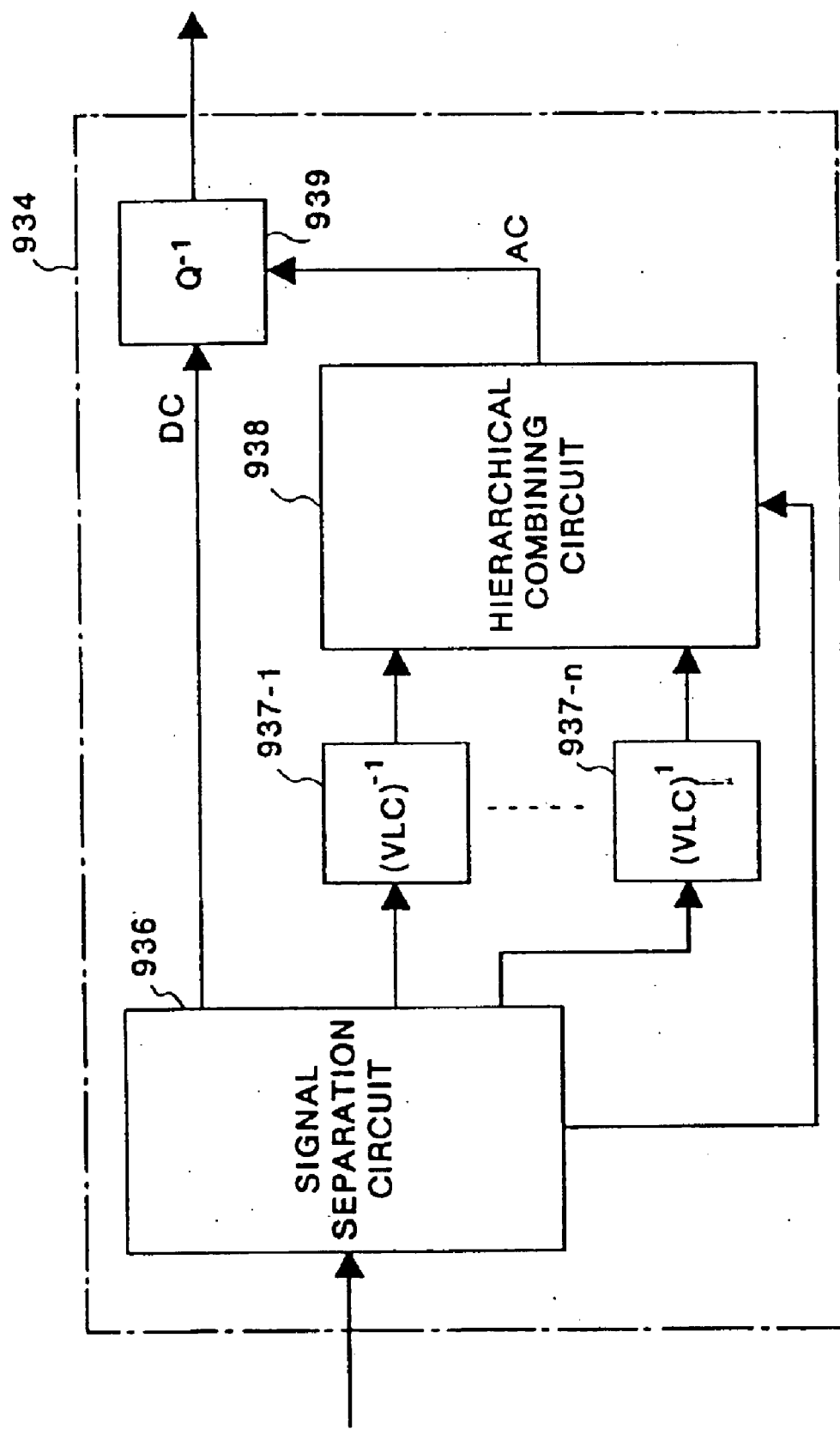
FIG. 31 is a block diagram illustrating the construction of a decoding circuit according to the 13th embodiment.

FIG. 31 is a block diagram showing the detailed construction of a decoding circuit 934 according to the 13th embodiment shown in FIG. 30.

In the decoding circuit 934 of the 13th embodiment shown in FIG. 31, S-bit compressed image data read out of the frame memory 908 is separated into DC coefficients and codes of AC coefficients in each layer by a signal separation circuit 936. The DC coefficients are supplied to an inverse quantization unit 939 and the codes of the AC coefficients are supplied to variable-length decoding circuits 937-1 through 937-k.

The signal separation circuit 936 incorporates an AC-coefficient coding hierarchical counter. The counter is reset by the data at the beginning of a block and is counted up whenever data of one layer of the AC 1 coefficients is outputted to the variable-length decoding circuits 937-1 through 937-n. The counted value is supplied to a hierarchical combining circuit 938.

The variable-length decoding circuits 937-1 through 937-n decode the codes, which are supplied by the signal separation circuit 936, into data of each hierarchical layer, and the result is supplied to the hierarchical combining circuit 938. In accordance with the counted value in the hierarchical counter supplied by the signal separation circuit 936, the hierarchical combining circuit 938 successively combines the decoded hierarchical layer data supplied by the variable-length decoding circuits 937-1 through 937-n.

When the hierarchical layer data of the least significant layer k of the block stored in the frame memory has been decoded and the combining of the hierarchical layer data has been completed, the hierarchical combining circuit 938 supplies the decoded AC transformation coefficients to the inverse quantization unit 939. The inverse quantization unit 939 successively supplies the quantization representatives, which correspond to the decoded quantized DC and AC transformation coefficients, to the scan converting circuit 921 shown in FIG. 30, and image data expanded via the inverse DCT circuit 922 and rasterization circuit 914 is outputted from the output terminal 25.

In order to assure the accuracy of the DC transformation coefficients in this embodiment, they are separated from progressive buildup. However, the invention is not limited to the foregoing example. It goes without saying that an arrangement in which progressive buildup is carried out in a form where the DC transformation coefficients are included also is covered by the scope of the invention.

It is of course permissible to place the quantization unit after the hierarchical division circuit 928.

Furthermore, according to this embodiment, coding after hierarchical division is parallel processed. However, serial processing in which processing is performed successively from the most significant layer also is possible. In this case, a coding circuit 929 of the hierarchical portion and the variable-length coding circuit of each layer of the decoding circuit 934 can be constructed as one system, thereby achieving a further simplification of hardware.

Furthermore, in the 11th and 12th embodiments, the index memory 909 is provided separate from the frame memory 908. However, if an arrangement is adopted in which data is stored in the frame memory after the indices are multiplexed with respect to the compressed image data, it will be possible to dispense with the index memory. In this case, it will suffice if G–d (where d is the number of bits needed to store the index) is used instead of the predetermined value G employed as the criterion in the coding selecting circuit 906.

In accordance with each of the 11th through 13th embodiments, as described above, operations between blocks in the coding unit are eliminated and decoding is possible is simple blocks. At the same time, a plurality of coding circuits having different output information quantities are provided, coding which gives a coded length in one block (namely the sum total of the code length in one block after variable-length coding) that is maximum without exceeding the predetermined value G is selected, and the data is stored in memory in units of a predetermined value. As a result, addressing of overlaid blocks is facilitated and it is possible to combine images in the memory.

In addition, since length is fixed in block units, the time needed for decoding can be rendered constant for every block. Consequently, there is no need for a buffer for rendering constant the transmission rate of data after the decoding necessary for variable-length coding. This makes possible a great simplification in hardware.

Further, the coding method is not limited to ADCT. For example, other forms of variable-length coding, such as arithmetic coding or predictive coding, can be employed.

Further, the plurality of coding circuits can change code length by making the parameters which constitute the quantization tables and the parameters which constitute the Huffman code tables different.

Further, rather than arranging the plurality of coding circuits in parallel, as described above, a desired coding method can be decided by performing operations in serial fashion by means of a computer, by way of example.

The present invention can be applied to a system constituted by a plurality of devices, or to an apparatus comprising a single device. Furthermore, it goes without saying that the invention is applicable also to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. An image coding apparatus comprising:

input means for inputting image data;

a single transformation means for transforming, in block units, the image data input by said input means into frequency component data;

a plurality of coding means for respectively coding the frequency component data by using different quantization parameters; and selection means for selecting coding data whose amount is the closest to a predetermined amount without exceeding the predetermined amount from plural sets of coding data obtained by said plurality of coding means, wherein each of said plurality of coding means inputs identical frequency component data commonly outputted from said single transformation means, and said plurality of coding means performs coding of the commonly outputted and identical frequency component data in parallel.

2. The apparatus according to claim 1, wherein said transformation means performs discrete cosine transform.

3. The apparatus according to claim 1, wherein said plurality of coding means includes variable-length coding means for performing variable-length coding on the quantized frequency component data.

4. An image coding method comprising the steps of:

inputting image data;

transforming, in block units, the inputted image data into frequency component data in a single transforming unit;

coding identical frequency component data commonly outputted from the single transforming unit in parallel in a plurality of coding units, each using different quantization parameters; and selecting coding data whose amount is the closest to a predetermined amount without exceeding the predetermined amount, from plural sets of coding data obtained from the plurality of coding units.

5. An image coding apparatus comprising:

an input unit arranged to input image data;

a single transformation unit arranged to transform, in block units, the image data input by said input unit into frequency component data;

a plurality of coding units, each arranged to code the frequency component data by using different quantization parameters; and a selection unit arranged to select coding data whose amount is the closest to a predetermined amount without exceeding the predetermined amount from plural sets of coding data obtained by said plurality of coding units, wherein each of said plurality of coding units inputs identical frequency component data commonly outputted from said single transformation unit, and said plurality of coding units perform coding of the commonly outputted and identical frequency component data in parallel.

* * * * *